(12) United States Patent
Kamiya et al.

(10) Patent No.: US 6,209,970 B1
(45) Date of Patent: Apr. 3, 2001

(54) ELECTROMAGNETIC VALVE AND BRAKE CONTROL SYSTEM USING THE SAME

(75) Inventors: Masahiko Kamiya, Anjo; Yozo Majima, Kariya, both of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/204,143

(22) Filed: Dec. 3, 1998

(30) Foreign Application Priority Data

| Dec. 5, 1997 | (JP) | 9-336044 |
| Dec. 22, 1997 | (JP) | 9-353527 |
| Jan. 12, 1998 | (JP) | 10-003931 |
| Jan. 30, 1998 | (JP) | 10-020074 |
| Sep. 21, 1998 | (JP) | 10-266708 |

(51) Int. Cl.[7] .................................................. B60T 8/36
(52) U.S. Cl. .................. 303/119.2; 137/596.17; 137/627.5
(58) Field of Search ............... 303/119.2, 119.1, 303/116.1, 116.2; 137/596.17, 627.5

(56) References Cited

U.S. PATENT DOCUMENTS

| 5,163,474 | * | 11/1992 | Rizk | 303/119.2 |
| 5,639,061 | * | 6/1997 | Krauter et al. | 303/119.2 |
| 5,673,980 | * | 10/1997 | Schwarz et al. | 303/119.2 |
| 5,704,587 | * | 1/1998 | Kuromitsu et al. | 303/119.2 |
| 5,711,583 | | 1/1998 | Bareiss et al. | |
| 5,730,509 | | 3/1998 | Eith et al. | |
| 5,735,582 | * | 4/1998 | Eith et al. | 303/119.2 |
| 5,791,747 | * | 8/1998 | Sorensen et al. | 303/119.2 |
| 5,810,330 | * | 9/1998 | Eith et al. | 303/119.2 |
| 5,967,627 | * | 10/1999 | Hosoya et al. | 303/119.2 |
| 5,971,501 | * | 10/1999 | Hosoya | 303/119.2 |
| 6,065,495 | * | 5/2000 | Fong et al. | 303/119.2 |

FOREIGN PATENT DOCUMENTS

| 195 29 363 | 2/1997 | (DE) . |
| 5-246320 | 9/1993 | (JP) . |
| 9-058432 | 3/1997 | (JP) . |
| 9-060756 | 3/1997 | (JP) . |

* cited by examiner

*Primary Examiner*—Robert J. Oberleitner
*Assistant Examiner*—Devon Kramer
(74) *Attorney, Agent, or Firm*—Pillsbury Winthrop LLP

(57) ABSTRACT

An electromagnetic valve is arranged in a conduit between a master cylinder and an intake side of a pump in a brake control system. In the electromagnetic valve, a main communication path and a restricted communication path are formed. The main communication path is alternatively opened and closed by a main valve body. The restricted communication path is formed in the main valve body and alternatively opened and closed by an auxiliary valve body. A solenoid generates electromagnetic force to bias the auxiliary valve body in a direction of opening the restricted communication path. The auxiliary valve body is provided with an engaging portion for engaging with the main valve body to move the main valve body in a direction of opening the main communication path after opening the restricted communication path.

14 Claims, 45 Drawing Sheets

FIG.17A
FIG.17B
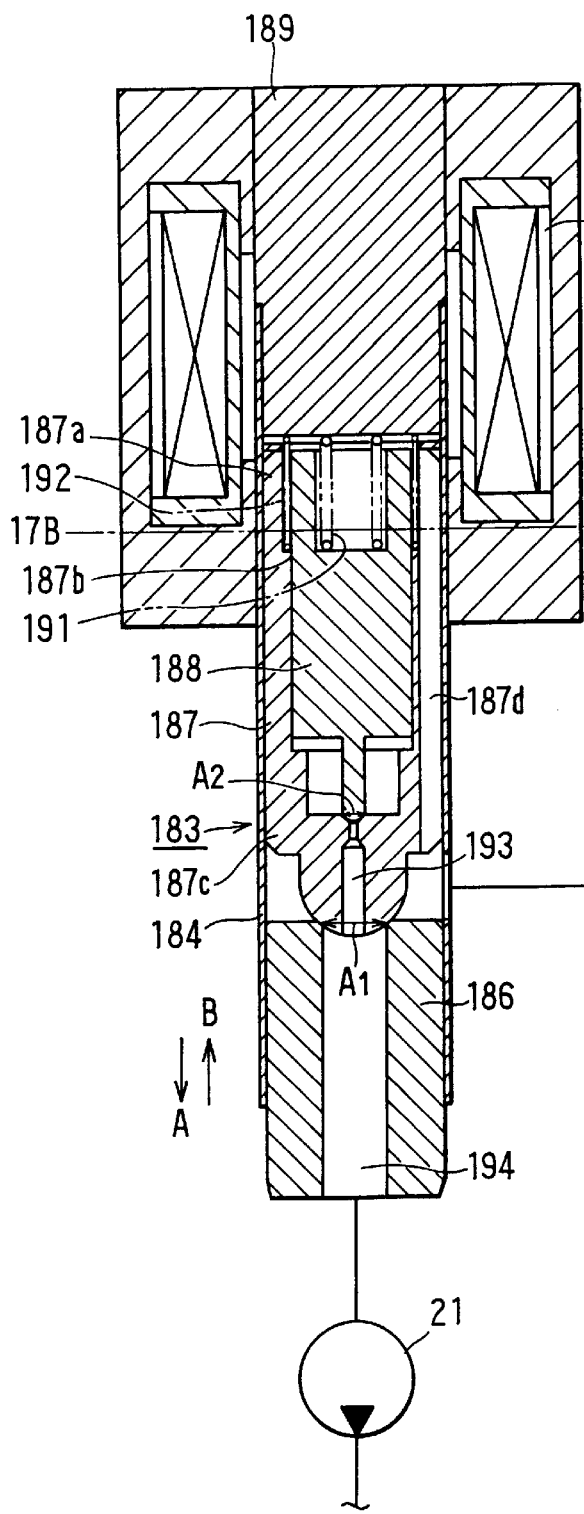
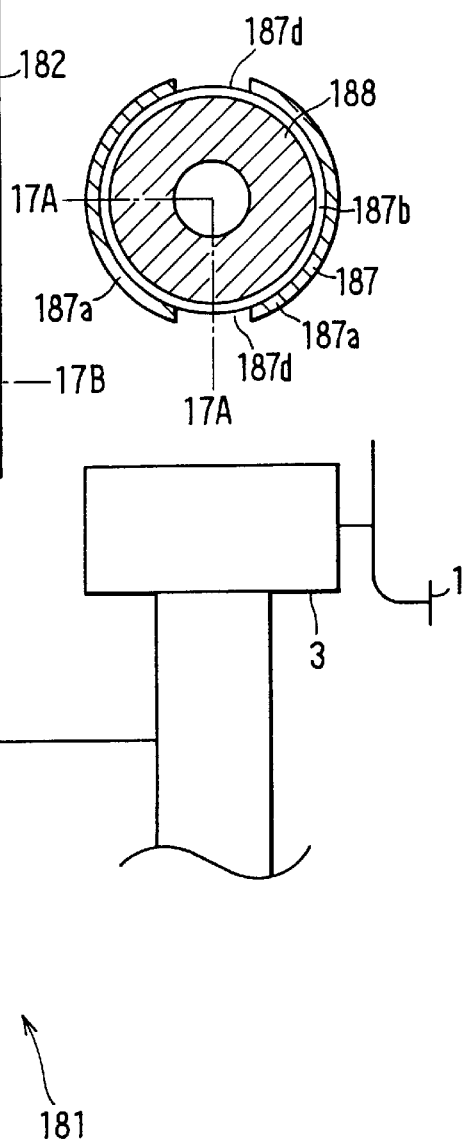

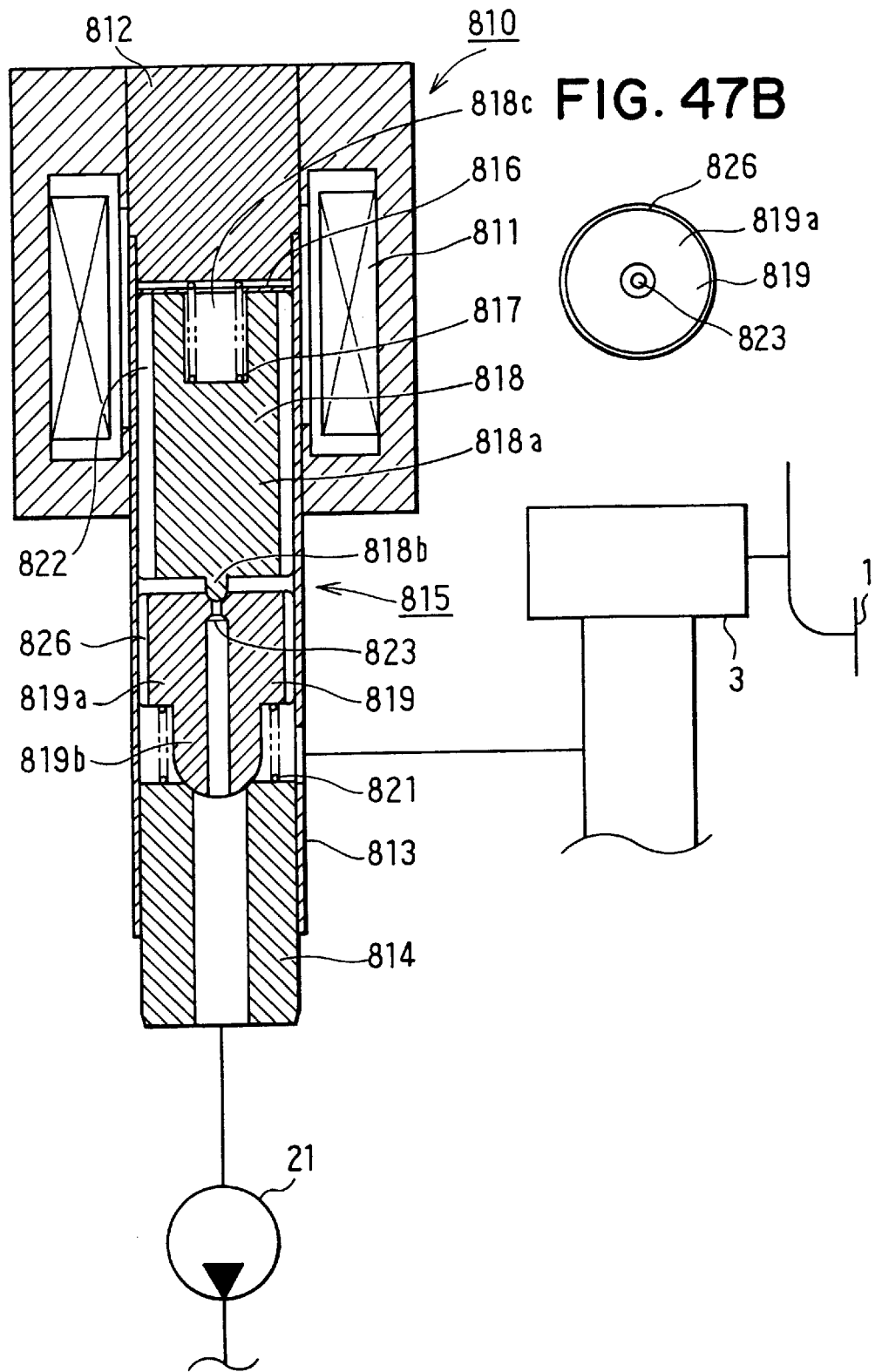

ELECTROMAGNETIC VALVE AND BRAKE CONTROL SYSTEM USING THE SAME

CROSS REFERENCE TO RELATED APPLICATION

This application is based upon and claims the benefit of priority of Japanese Patent Applications No.9-336044 filed Dec. 5, 1997, No.9-353527 filed Dec. 22, 1997, No.10-3931 filed Jan. 12, 1998, No.10-20074 filed Jan. 30, 1998, and No.10-266708 filed Sep. 21, 1998, the contents of which are incorporated herein by reference.

BACKGROUND OF THE INVENTION

1. Field of the Invention

The present invention relates to an electromagnetic valve and a brake control system adopting the electromagnetic valve as a hydraulic pressure control valve for increasing or decreasing brake hydraulic pressure.

2. Description of Related Art

Conventionally, in a brake control device for carrying out traction control or turn trace control (vehicle yaw control), an SR valve which is an electromagnetic valve is provided as a hydraulic pressure control valve for adjusting wheel cylinder pressure by opening and closing a conduit from a master cylinder to a pump. As shown in FIG. 12, the SR valve closes the hydraulic path by a valve body 111 biased in an arrow mark A direction by a spring 112.

However, according to the SR valve having such a structure, in the case where a brake pedal 113 is depressed and hydraulic pressure (master cylinder pressure) on the side of a master cylinder 114 is increased, the master cylinder pressure acts to the valve body 111 so that the valve body 111 is moved in a valve closing direction (arrow mark A direction). Accordingly, even when electricity is supplied to a solenoid 115, attracting force in an arrow mark B direction caused by electromagnetic force of the solenoid 115 may become deficient and the SR valve may not be opened.

Accordingly, when the SR valve is used in, for example, a brake control device for carrying out power assist brake control (PAB control), that is, a brake control device for carrying out pressure increase control in which when the brake pedal 113 is depressed, a pump 116 is operated and the wheel cylinder pressure is increased more than normal to thereby enhance wheel braking force, pressure increase control may not be carried out preferably.

Although as a measure therefor, there is conceivable a method of enlarging the size (performance) of the solenoid, then, the SR valve becomes large-sized. Hence, for example, there has been proposed an SR valve using a main valve and an auxiliary valve.

Such an SR valve has an auxiliary valve comprising a magnetic body for alternatively opening and closing an auxiliary path by supplying electricity to a solenoid. When the auxiliary path is opened in accordance with operation of the auxiliary valve, pressure difference applied on a main valve comprising a nonmagnetic body is alleviated, thereby assisting the main valve to open a main path (refer to DE19529363).

However, according to such an SR valve having the main valve and the auxiliary valve, it is difficult to carry out precise control.

In recent years, there has been intensified a tendency of carrying out power assist brake control for promoting braking performance by increasing wheel cylinder pressure when a brake pedal is depressed in addition to, for example, normal brake operation, antiskid control, traction control and turn trace control (vehicle yaw control) in a single brake control device. Therefore, with the above-described conventional SR valve which only carries out simple opening and closing operation, it is difficult to preferably carry out various control while clearing problems of pedal feeling, operational sound and so on.

Further, even when a constitution capable of carrying out complicated operation is added to the SR valve, with the complicated structure, the device is large-sized and the cost is increased which is not preferable.

The present invention has been carried out in order to solve the above-mentioned problems and it is an object of the present invention to provide an electromagnetic valve capable of preferably carrying out various control and a brake control device adopting the electromagnetic valve.

SUMMARY OF THE INVENTION

In order to achieve such an object, according to the present invention, there is provided an electromagnetic valve which is arranged in a conduit between a brake hydraulic pressure generating device (for example, a master cylinder) for generating brake hydraulic pressure in braking a vehicle and an intake side of a pump for supplying brake fluid to a wheel braking force generating device (for example, a wheel cylinder) for generating wheel braking force. In the electromagnetic valve, a main communication path and a restricted communication path are formed. The electromagnetic valve comprises a main valve having a main valve body capable of opening and closing the main communication path connected to the conduit except the restricted communication path by moving in a predetermined direction (for example, axial direction). In particular, the restricted communication path is formed in the main valve body. The electromagnetic valve further comprises an auxiliary valve having an auxiliary valve body capable of opening and closing the restricted communication path of the main valve body by moving in the predetermined direction the same as the main valve moving direction. A main valve body biasing device (for example, assist spring) biases the main valve body in a direction of closing the main communication path. An auxiliary valve body biasing device (for example, return spring) biases the auxiliary valve body in a direction of closing the restricted communication path. A magnetic force applying device (for example, solenoid) applies electromagnetic force to bias the auxiliary valve body in a direction of opening the restricted communication path against the biasing force of the auxiliary valve body biasing device.

Particularly, the auxiliary valve is provided with an engaging portion for engaging with the main valve body after opening the restricted communication path when moving in the predetermined direction. Therefore, the main valve body is also moved in accordance with further movement of the auxiliary valve body, by which the main valve can be opened. The electromagnetic force applying device can adjust electromagnetic force applied to the auxiliary valve body so that only the auxiliary valve is opened by movement of the auxiliary valve body or both the auxiliary valve and the main valve are opened by movement of the auxiliary valve body and the main valve body.

Here, as means for adjusting the electromagnetic force applied on the auxiliary valve body, for example, there can be used a device for adjusting the magnitude of current conducted to the solenoid (or voltage value thereof) or a device for adjusting the duty ratio of current conducted to the solenoid (or the duty ratio of voltage applied thereto).

BRIEF DESCRIPTION OF THE DRAWINGS

These and other objects, features and characteristics of the present invention will be appreciated from a study of the following detailed description, the appended claims, and drawings, all of which form a part of this application. In the drawings:

FIG. 17A is a cross-sectional view taken along a line 17A—17A in FIG. 17B and illustrating a full-closed state of an electromagnetic valve according to a fourth embodiment and FIG. 17B is a cross-sectional view taken along a line 17B—17B in FIG. 17A;

FIG. 47A is a cross sectional view illustrating a full-closed state of an electromagnetic valve according to a twentieth embodiment; and FIG. 47B is a plane view of a main valve body in the twentieth embodiment.

DETAILED DESCRIPTION OF PREFERRED EMBODIMENTS

An explanation will be given of preferable embodiments according to the present invention in reference to the drawings.

(First Embodiment)

Figure 1:
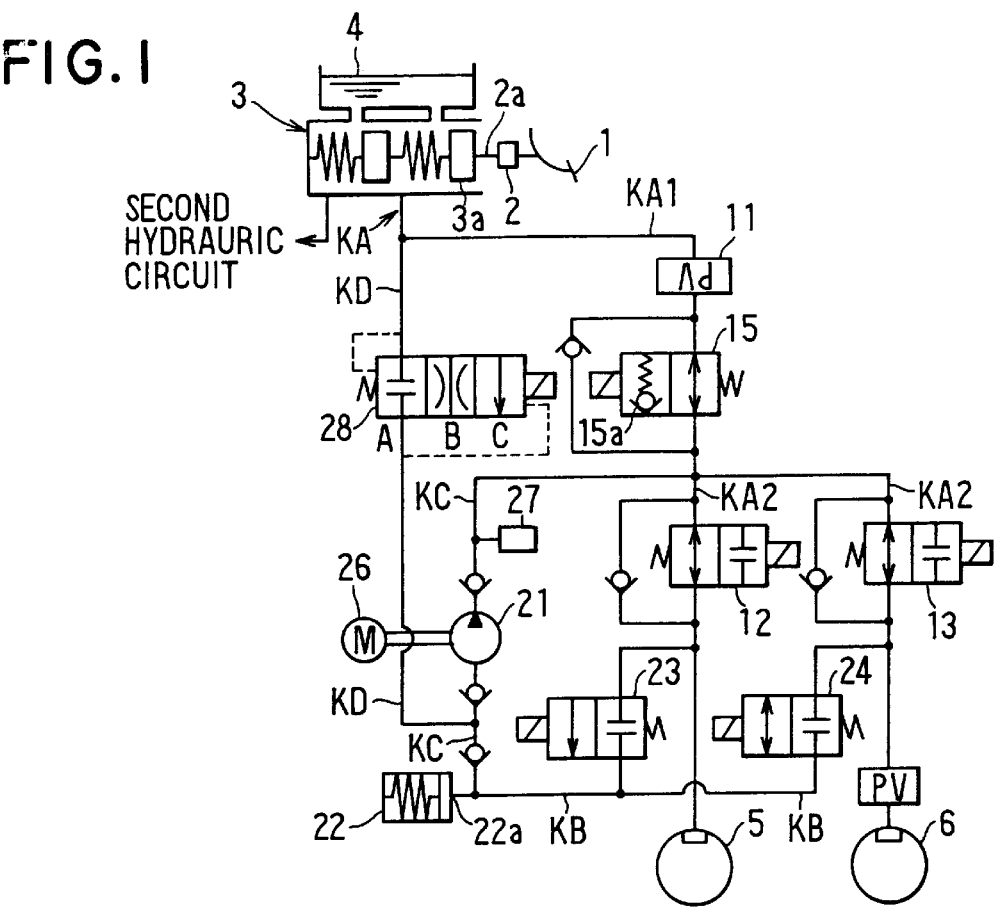
FIG. 1 is a diagram illustrating a hydraulic circuit structure of a brake control device in which an electromagnetic valve according to a first embodiment of the present invention is installed.

FIG. 1 shows a hydraulic circuit diagram of a brake control device in which an electromagnetic valve according to the first embodiment is used. In this first embodiment, an explanation will be given of an example of applying a brake control device to a four wheel vehicle of front wheel drive having a hydraulic pressure circuit of a diagonal conduit system in which wheel cylinders of a right front wheel and left rear wheel are connected and wheel cylinders of a left front wheel and right rear wheel are connected.

The brake control device is provided with a constitution capable of carrying out not only antiskid control (ABS control), turn trace control (vehicle yaw control) and traction control (TRC control) but also power assist brake control (PAB control: pressure increase control) capable of increasing wheel cylinder pressure more than master cylinder pressure when a brake pedal is depressed.

It is to be noted that power assist brake control includes control, performed when the function of a brake booster is in a normal state, such as sudden brake assist control performed in sudden braking action of a driver, normal assist control in which when the brake booster is downsized or the like, a force-boosting ratio of the booster is originally sets small and a driver's braking operation is always assisted by assisting boosting operation of the booster by a pump when a brake pedal is depressed, and failure assist control for increasing wheel cylinder pressure in place of the booster when the booster fails.

As shown in FIG. 1, a brake pedal 1 is connected to a booster 2 and brake depression force is boosted by the booster 2. The booster 2 is provided with a push rod 2a for transmitting the boosted depression force to a master cylinder 3. Master cylinder pressure is generated when the push rod 2a pushes a master piston 3a arranged in the master cylinder 3. The master cylinder pressure is transmitted to a wheel cylinder 5 of a front right wheel FR and a wheel cylinder 6 of a rear left wheel RL.

Further, the master cylinder 3 is connected with a master reservoir 4 for supplying brake fluid into the master cylinder 3 and storing extra brake fluid in the master cylinder 3.

In the following explanation, an explanation will be given of a hydraulic circuit connected to the front right wheel FR and the rear left wheel RL. A hydraulic circuit connected to a front left wheel FL and a rear right wheel RR is constituted quite similarly with the hydraulic circuit for the front right wheel FR and the rear left wheel RL and therefore, an explanation thereof will be omitted.

The brake control device is provided with a conduit KA connected to the master cylinder 3. A proportioning valve (PV) 11 is connected in the conduit KA in a direction opposite to normal. By the proportioning valve 11, the conduit KA is divided into a first conduit KA1 receiving master cylinder pressure between the master cylinder 3 and the proportioning valve 11 and a second conduit KA2 between the proportioning valve 11 and the respective wheel cylinders 5 and 6.

It is to be noted that the proportioning valve 11 is used for power assist brake control when the function of the booster 2 is normal.

The proportioning valve 11 operates to attenuate a reference pressure of brake fluid at an upstream side by a predetermined attenuation ratio and to transmit the attenuated pressure to a downstream side when brake fluid flows from the upstream side to the downstream side. Therefore, by inversely connecting the proportioning valve 11 so that the upstream side of the proportioning valve 11 corresponds to a wheel cylinder side, pressure on the side of the second conduit KA2 becomes the reference pressure and the pressure on the side of the second conduit KA2 can be maintained higher than pressure on the side of the first conduit KA1.

An SM valve 15 is arranged on the side of the wheel cylinders 5 and 6 in respect with the proportioning valve 11. The SM valve 15 is a two-position valve capable of controlling the second conduit KA2 in a flow-through state and a cut-off state.

The SM valve 15 is used in failure brake assist control performed when the booster 2 fails among power assist brake control. That is, when the master cylinder pressure is not increased more than a bending point pressure of FIG. 10, mentioned later, the SM valve 15 completely cuts the master cylinder apart from the wheel cylinders in order to increase the wheel cylinder pressure. Further, the SM valve 15 is also brought into a cut-off state when traction control or turn trace control in a state where the brake pedal 1 is not depressed, is carried out.

The SM valve 15 is provided with a relief valve 15a which is opened when brake hydraulic pressure on the side of the wheel cylinders 5 and 6 becomes higher by a predetermined pressure than master cylinder pressure.

The second conduit KA2 is branched in two conduits from the SM valve 15 toward the wheel cylinders 5 and 6, one of the branched conduits is provided with a pressure increase valve 12 for increasing the brake hydraulic pressure applied to the wheel cylinder 5 and the other thereof is provided with a pressure increase valve 13 for increasing the brake hydraulic pressure applied to the wheel cylinder 6.

Figure 2:
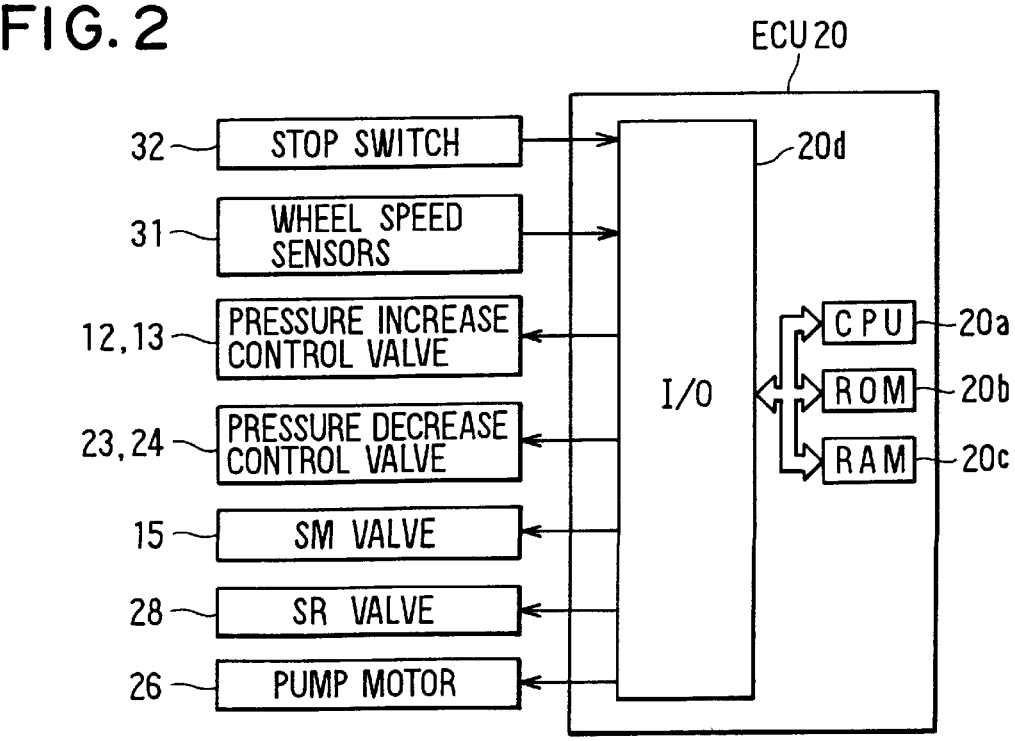
FIG. 2 is a block diagram illustrating a control system of the brake control device.

The pressure increase control valves 12 and 13 are two-position valves capable of being switched between a flow-through state and a cut-off state by an electronic control unit (ECU 20: refer to FIG. 2). When the two-position valves are controlled to be brought into a flow-through state, high pressure brake fluid can be applied on the respective wheel cylinders 5 and 6 using brake fluid delivered from the master cylinder 3 or a pump 21.

Pressure decrease control valves 23 and 24 capable of being switched between a flow-through state and a cut-off state by the ECU 20 are respectively arranged at conduits KB connecting the second conduits KA2 between the pressure increase control valves 12 and 13 and the wheel cylinders 5 and 6 to a reservoir hole 22a of a reservoir 22.

Further, the pump 21 of, for example, a rotary type is arranged at a conduit KC connecting the reservoir hole 22a of the reservoir 22 to the second conduit KA2 between the SM valve 15 and the pressure increase control valves 12 and 13. A motor 26 is connected to the pump 21 and the pump 21 is driven by the motor 26. Further, in order to alleviate a pulsation of the brake fluid delivered from the pump 21, an accumulator (damper) 27 is arranged on the delivery side of the pump 21 in the conduit KC.

Further, a conduit KD is provided to connect the master cylinder 3 to the conduit KC between the reservoir 22 and the pump 21. The pump 21 is supplied with the brake fluid on the side of the first conduit KA1 via the conduit KD when driven by the motor 26 and delivers it to the side of the second conduit KA2. Thereby, the wheel cylinder pressure in the wheel cylinders 5 and 6 can be made higher than the master cylinder pressure, by which wheel braking force is increased.

Figure 10:
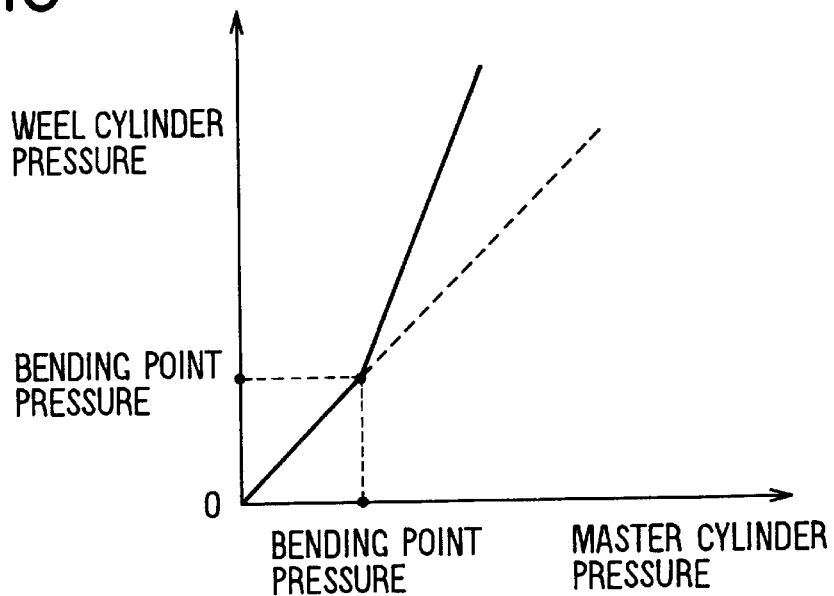
FIG. 10 is a graph illustrating a relation between master cylinder pressure and wheel cylinder pressure.

The proportioning valve 11 maintains pressure difference between the master cylinder pressure and the wheel cylinder pressure as shown in FIG. 10 when the wheel cylinder pressure is made higher than the master cylinder pressure. That is, in the case where both the master cylinder pressure and the wheel cylinder pressure are higher than the bending point pressure preset at the proportioning valve 11, when the brake fluid flows from the side of the wheel cylinder to the side of the master cylinder through the proportioning valve 11, the brake hydraulic pressure is attenuated. As a result, the wheel cylinder pressure is maintained higher than the master cylinder pressure.

An SR valve 28 of an electromagnetic valve functioning as a hydraulic pressure control valve is provided in the conduit KD. The SR valve 28 is a normally-closed valve which is normally closed and is opened when electricity is supplied thereto. When the SR valve 28 is opened, the conduit KD is put in a flow-through state, as mentioned later in details. However, the SR valve 28 is switched into a fully-open state or a half-open (throttled) state in accordance with the magnitude of the master cylinder pressure, in other words, a degree of depressing the brake pedal or the magnitude of pressure difference between the master cylinder pressure and the wheel cylinder.

As shown in FIG. 2, ECU 20 is formed by a microcomputer comprising well known CPU 20a, ROM 20b, RAM 20c, an input and output unit 20d and so on.

ECU 20 is supplied with electric power by turning on an ignition switch of the vehicle (not illustrated), receives signals from wheel speed sensors 31, a stop switch 32 which is turned on during depression of the brake pedal 1 and so on, carries out calculation for estimating slip states of the wheels 5 and 6, carries out calculation for controlling braking force and feeds control signals to the pressure increase control valves 12 and 13, the pressure decrease control valves 23 and 24, the SM valve 15, the SR valve 28 and the motor 26.

Next, a detailed explanation will be given of the structure and the operation of the SR valve 28 which is an essential portion of the first embodiment in reference to FIGS. 3 through 6.

Figure 3:
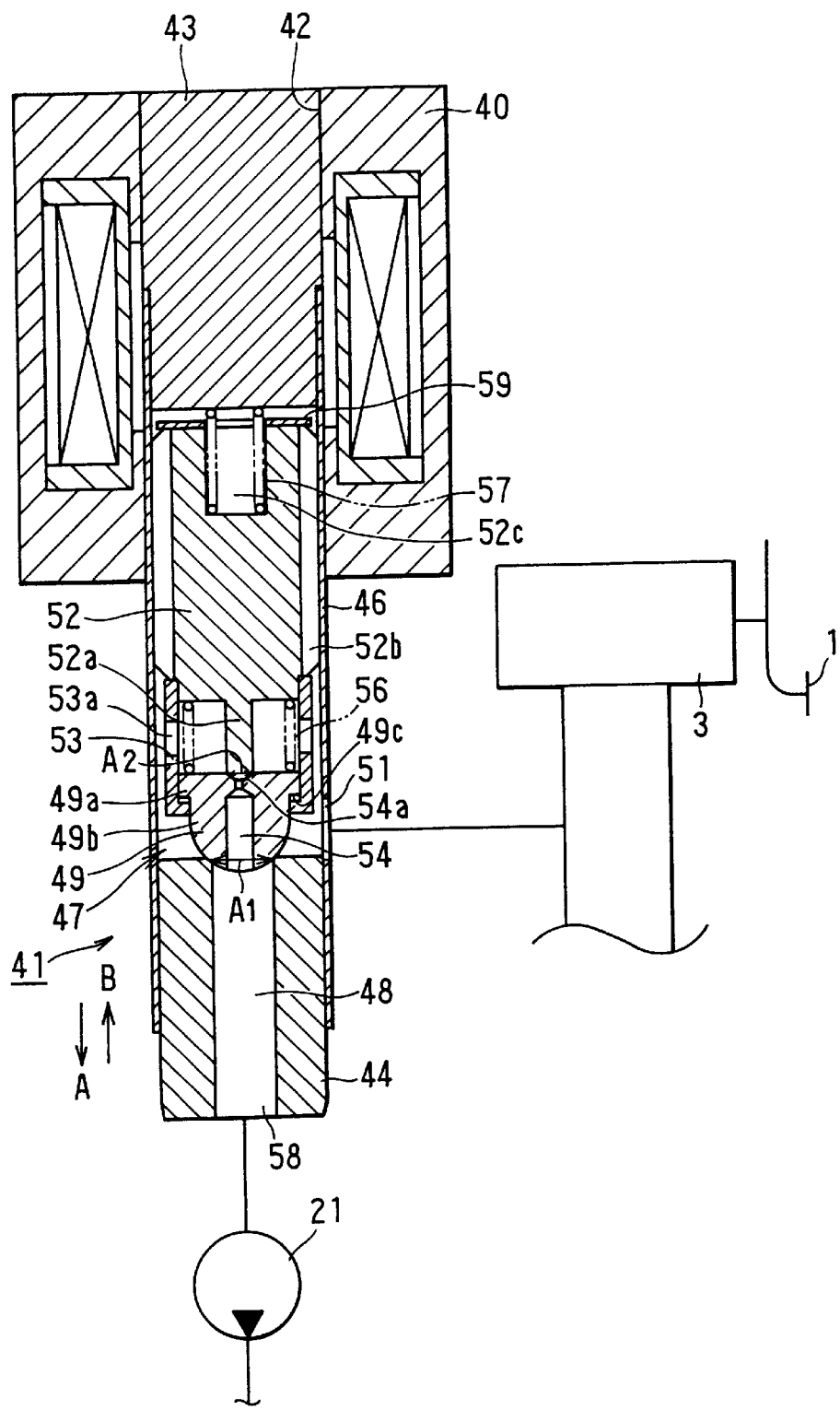
FIG. 3 is a cross-sectional view illustrating a full-closed state of the electromagnetic valve.
Figure 4:
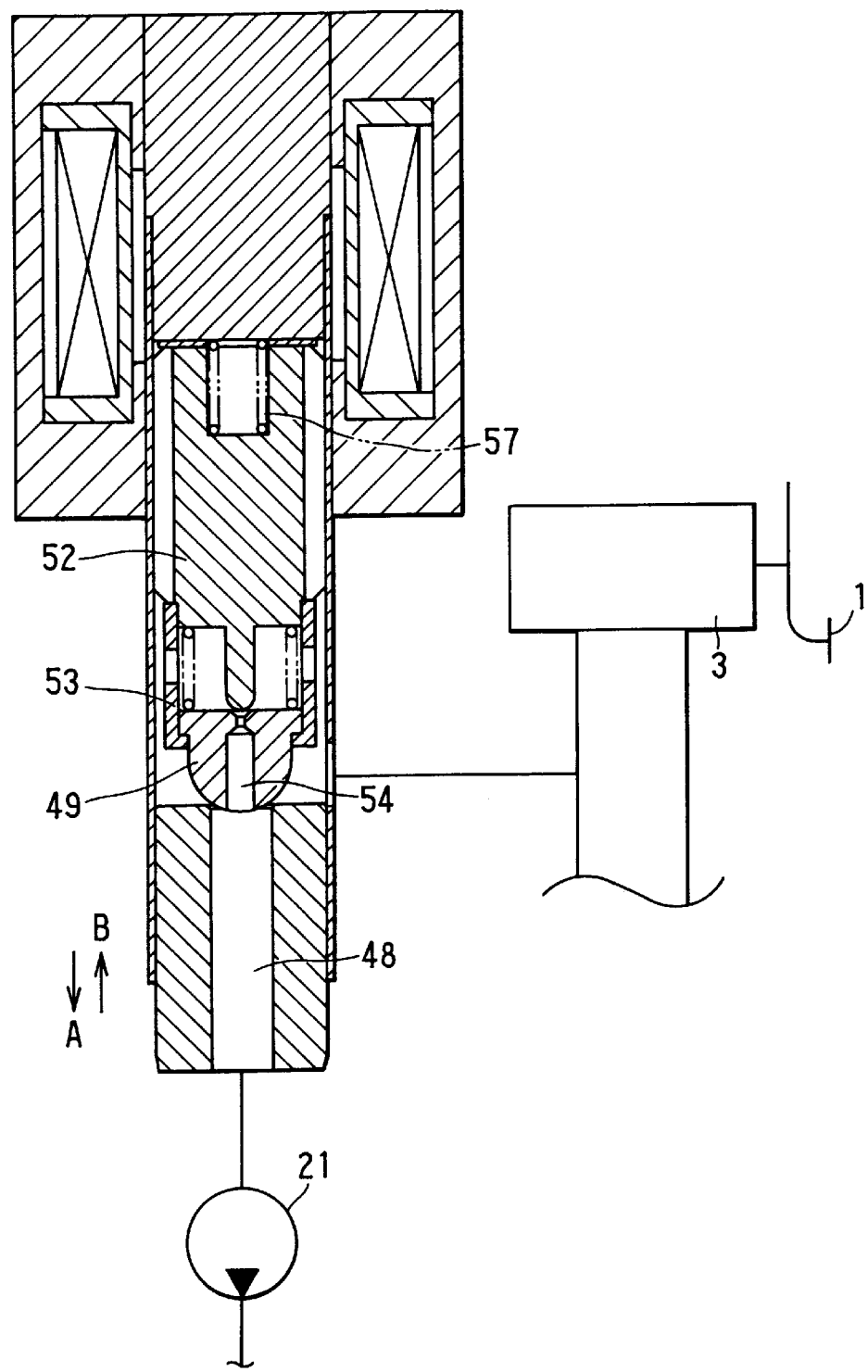
FIG. 4 is a cross-sectional view illustrating a full-open state of the electromagnetic valve.
Figure 5:
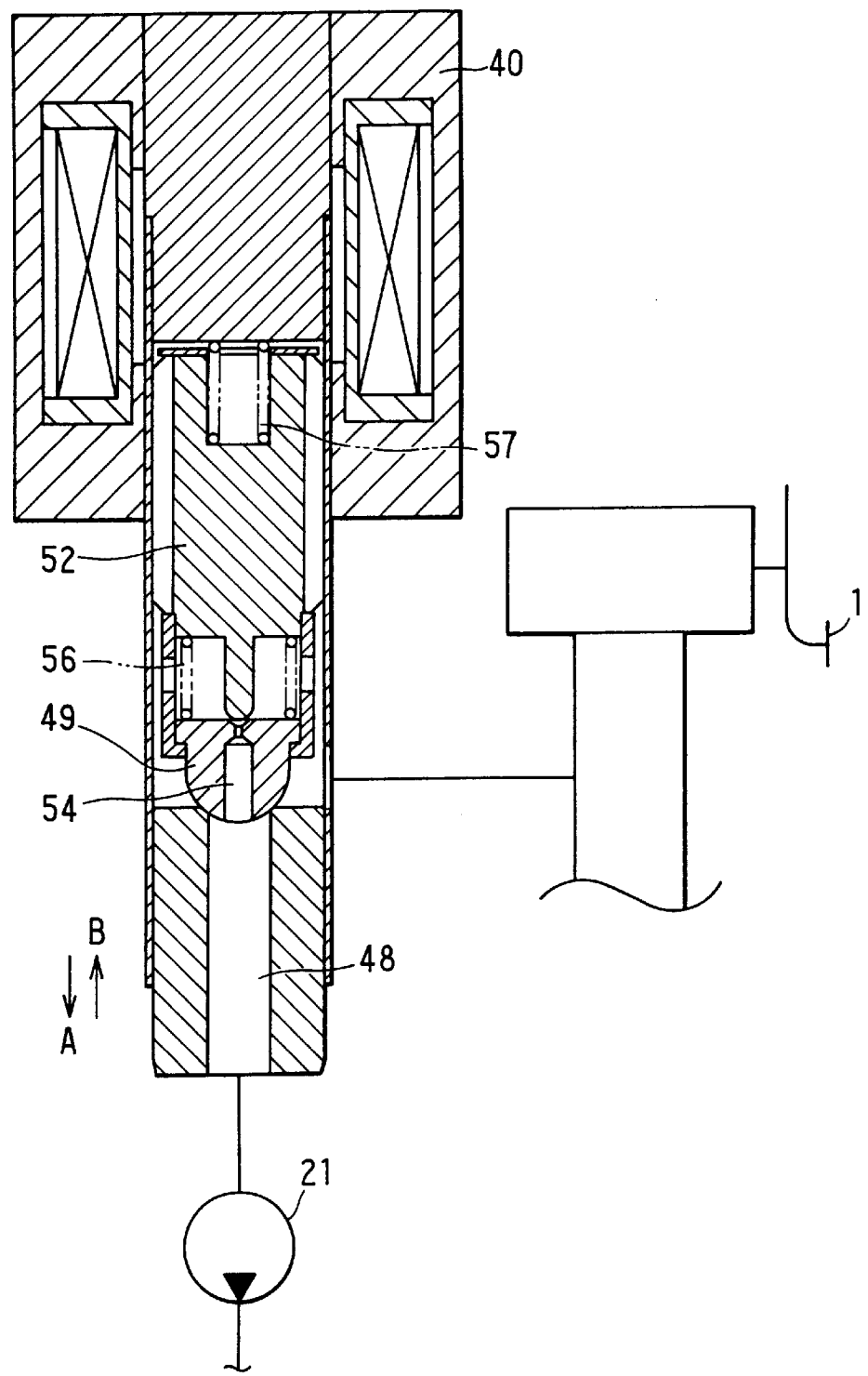
FIG. 5 is a cross-sectional view illustrating a half-open state of the electromagnetic valve.

It is to be noted that FIG. 3 shows "a fully-closed state" in correspondence with a position A in FIG. 1, FIG. 4 shows "a fully-open state" in correspondence with a position C in FIG. 1 and FIG. 5 shows "a half-open state" in correspondence with a position B in FIG. 1.

In this first embodiment, the SR valve 28 is driven to the fully-open state or the half-open state by, for example, switching the duty ratio of drive current fed to a solenoid of the SR valve 28 between 100% and 50%.

First, an explanation will be given of the structure of the SR valve 28.

As shown in FIG. 3, the SR valve 28 is provided with a solenoid 40 and a valve mechanism 41 arranged in the solenoid 40 and a housing (not illustrated).

A hollow portion 42 in a cylindrical shape is formed at a center of the solenoid 40 and the upper end of the hollow portion 42 is closed by a stopper 43.

The valve mechanism 41 is formed by a valve seat (main valve seat) 44 in a cylindrical shape, a sleeve 46 made of a nonmagnetic body constituting an outer periphery of the valve mechanism 41 which extends from the valve seat 44 to the stopper 43 and a valve composite body 47 arranged in the sleeve 46 and movable in the upper and down direction in the drawing.

In respect of the sleeve 46, the lower end thereof is fixedly fitted to the upper portion of the valve seat 44 and the upper end thereof is fixedly fitted to the lower portion of the stopper 43. A first opening 51 communicating with the master cylinder 3 is formed in the sleeve 46.

A nonmagnetic plate 59 for preventing magnetic short-circuit is installed between the valve composite body 47 and the stopper 43.

A main communication path 48 is formed in the valve seat 44 along the axial direction thereof. The main communication path 48 is alternatively opened and closed by a main valve body 49 of the valve composite body 47.

A second opening 58 communicating with the main communication path 48 is formed in the valve seat 44. The second opening 58 communicates with the intake side of the pump 21. Thereby, the brake fluid which is supplied from the master cylinder 3 and flows from the first opening 51 of the sleeve 46 into the second opening 58 via the main communication path 48 or a restricted communication path 54, is supplied to the wheel cylinders 5 and 6 via the pump 21.

In the valve composite body 47, an auxiliary valve body 52 is arranged on the side of the stopper 43, is movable in the up and down direction of the drawing and is made of a magnetic body. An engaging member 53 extends downwardly from the outer periphery of the lower end portion of the auxiliary valve body 52 and engages with the main valve body 49. The main valve body 49 is arranged on the side of the valve seat 44, is movable in the up and down direction of the drawing and is made of a nonmagnetic body.

The main valve body 49 is formed by a base 49a having a flat upper face and a front end portion 49b which projects downwardly (arrow mark A direction) from the base 49a, and is formed substantially in a hemispherical shape. The front end portion 49b is seated on the valve seat 44 so that the main communication path 48 is closed. The outer periphery portion of the base 49a is a circumferentially-projected portion 49c spread in the outer peripheral direction such that the engaging member 53 can engage therewith.

Further, an assist spring 56 for biasing the main valve body 49 in a direction of closing the main communication path 48 (arrow mark A direction) is arranged between the main valve body 49 and the auxiliary valve body 52.

The restricted communication path 54 is formed in the main valve body 49 along the axial direction of valve composite body 47. The restricted communication path 54 is alternatively opened and closed by the auxiliary valve body 52.

The engaging member 53 is formed in a cylindrical shape and is bonded integrally to the lower end portion of the auxiliary valve body 52. A front end side of the engaging member 53 is extended toward the inner side so as to be engaged by the circumferentially projected portion 49c of the main valve body 49. An opening 53a is formed in a side face of the engaging member 53.

The auxiliary valve body 52 is formed substantially in a rod-like shape and has a front end portion 52a projecting downwardly from the lower face thereof. The assist spring 56 is arranged at the surrounding of the front end portion 52a. A side opening portion 52b is formed on the side face of the auxiliary valve body 52 for upper and lower faces of the auxiliary valve body 52 to communicate with each other.

The auxiliary valve body 52 is biased in a direction of closing the restricted communication path 54 formed in the main valve body 49 (arrow mark A direction) by a return spring 57 arranged between the auxiliary valve body 52 and the stopper 43. Specifically, the return spring 57 is interposed between the stopper 43 and the bottom of a recess 52c formed in an upper portion of the auxiliary valve body 52 in a compressed state. As a result, the auxiliary valve body 52 is biased in the direction of closing the restricted communication path 54 in the main valve body 49.

In this way, the front end portion 52a of the auxiliary valve body 52 is brought into contact with a valve seat 54a formed at the upper portion of the restricted communication path 54 and closes the restricted communication path 54.

It is to be noted that an auxiliary valve is formed by the auxiliary valve body 52, the return spring 57 and the valve seat 54a of the restricted communication path 54, and a main valve is formed by the main valve body 49, the assist spring 56 and the valve seat 44. The restricted communication path 54 is made considerably narrower than the main communication path 48.

Because the restricted communication path 54 is formed in the axial direction of the main valve body 49, even when the main valve body 49 is seated on the valve seat 44, the main communication path 48 is not completely closed unless the auxiliary valve body 52 is seated on the valve seat 54a. Therefore, a state in which the main valve body 49 is separated from the valve seat 44 and the main communication path 48 is opened, is referred to as "a fully-open state", a state in which the main valve and the auxiliary valve close the main communication path 48 and the restricted communication path 54, respectively, is referred to as "a fully-closed state" and a state in which the auxiliary valve opens the restricted communication path 54 and the brake fluid flows into the main communication path 48 via the restricted communication path 54, is referred to as "a half-open state".

Next, an explanation will be given of relationship among forces applied on respective structural elements in the SR valve 28.

In this first embodiment, as shown in FIG. 3, a cross sectional area of a portion where the main valve body 49 closes the main communication path 48 (main seat cross sectional area A1) is set to be larger than a cross sectional area of a portion where the auxiliary valve body 52 closes the restricted communication path 54 (auxiliary seat cross sectional area A2). For example, a ratio of A2/A1 is set to a value of 1/50.

Further, biasing force (Fsp1) of the return spring 57 is set to be larger than biasing force (Fsp2) of the assist spring 56.

Also, attracting force acts only in respect of the auxiliary valve body 52 when the solenoid 40 generates electromagnetic force in response to electricity supplied thereto. Particularly, according to the first embodiment, in order to realize the fully-open state, large attracting force (Fcoil100) in respect of the auxiliary valve body 52 is caused by setting the duty ratio of current supplied to the solenoid 40 to 100%, for example. Further, in order to realize the half-open state, small attraction force (Fcoil50) in respect of the auxiliary valve body 52 is caused by setting the duty ratio of current supplied to the solenoid 40 to 50%.

An explanation will be given of conditions for maintaining the fully-open state, the fully-closed state and the half-open state by using equations.

[Fully-Closed State (Refer to FIG. 3)]

In the case of the fully-closed state, biasing force (Fsp1) of the return spring 57 and biasing force (Fsp2) of the assist spring 56 are applied on the auxiliary valve body 52 and the main valve body 49. Therefore, a condition required for maintaining the fully-closed state is as follows.

$$Fsp1 > Fsp2 > 0$$

[Fully-Open State (Refer to FIG. 4)]

Forces to be considered in the case of the fully-open state (however, the brake pedal is not depressed), are the biasing force (Fsp1) of the return spring 57 and the attracting force (Fcoil100) applied on the auxiliary valve body 52 when the duty ratio of current is, for example, 100%. A condition required for maintaining the fully-open state in respect of these forces is as follows.

$$Fcoil100 > Fsp1$$

[Half-Open State (Refer to FIG. 5)]

Forces to be considered in the case of the half-open state (however, irrespective of whether or not the brake pedal 1 is depressed) are the biasing force (Fsp1) of the return spring 57, the biasing force (Fsp2) of the assist spring 56 and pressure difference biasing force (A2·ΔPa) applied on the auxiliary valve body 52 by pressure difference (ΔPa) and the attracting force (Fcoil50) applied on the auxiliary valve body 52 when the duty ratio of current is, for example, 50%. Conditions required for maintaining the half-open state in respect of these forces are as follows.

$$Fsp1 > Fsp2 > 0$$

$$Fcoil50 + Fsp2 > Fsp1 + A2 \cdot \Delta Pa$$

$$Fcoil50 < Fsp1$$

Figure 6:
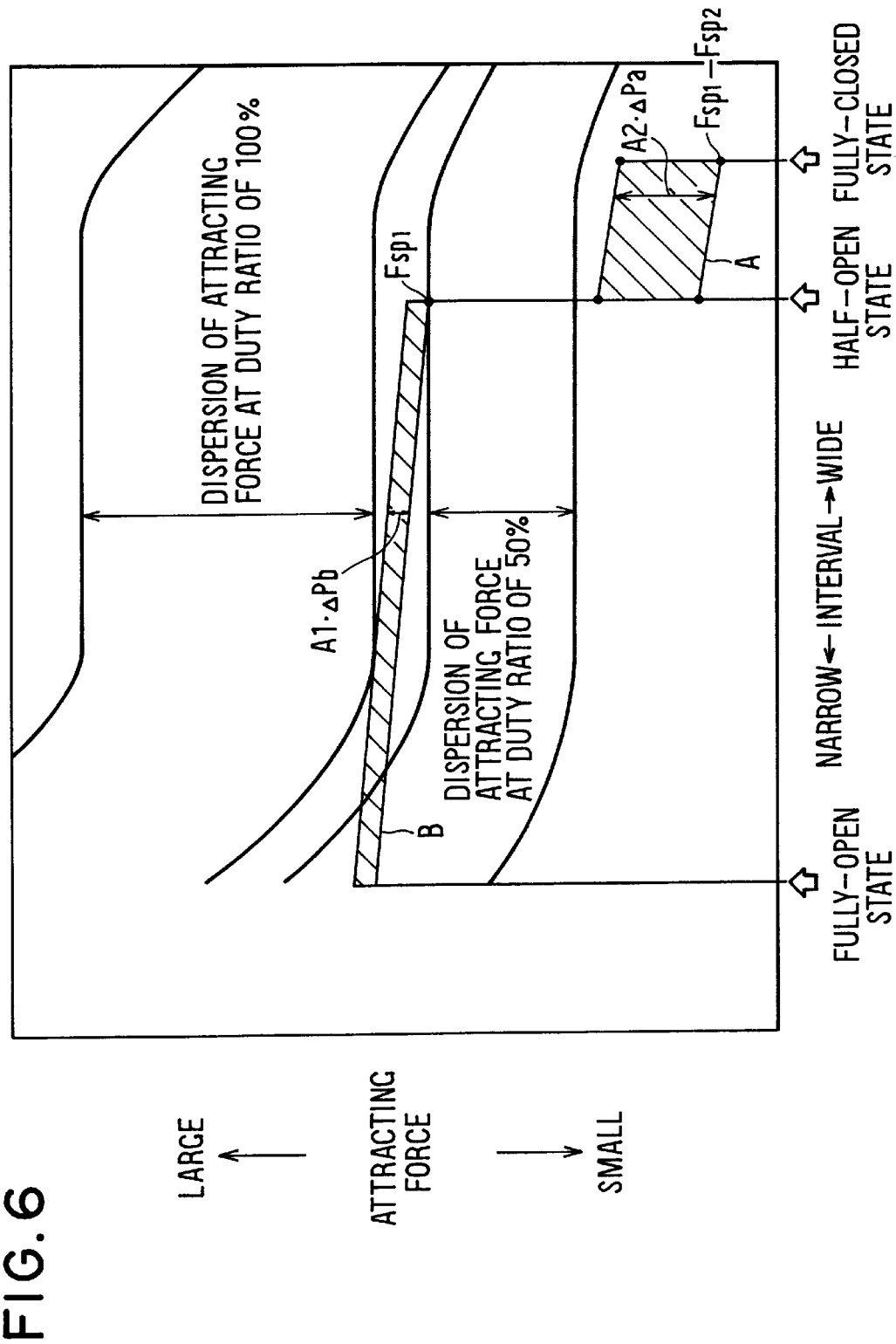
FIG. 6 is an explanation view for explaining relationship among attracting force of the electromagnetic valve and set loads of respective springs.

As shown in FIG. 6, in consideration of a dispersion of the attracting force caused by individual difference of the electromagnetic valve (particularly, influence of temperature and drive voltage), the set load (Fsp1) of the return spring 57 and the set load (Fsp2) of the assist spring 56 are determined.

Specifically, the set load (Fsp1) of the return spring 57 is set to become higher than an upper limit value caused by a dispersion of the attracting force (Fcoil50) at, for example, the duty ratio of 50% and lower than a lower limit value caused by a dispersion of the attracting force (Fcoil100) at, for example, the duty ratio of 100%. Thereby, in the case of the attracting force (Fcoil100) of the duty ratio of 100%, the fully-open state can be reliably maintained and in the case of the attracting force (Fcoil50) at the duty ratio of 50%, the half-open state can be reliably maintained.

Further, when the pump 21 is operated beforehand (so-to-speak, early drive), the set load (Fsp1) of the return spring is set in such a manner that a range B (designated by hatching in the drawing) produced by adding the set load (Fsp1) and pressure difference biasing force (A1·ΔPb) applied on the main valve body 49 based on negative pressure (ΔPb; for example, 1 kgf/cm² at maximum) caused by operating the pump 21, becomes lower than the lower limit value caused by a dispersion of the attracting force (Fcoil100) at, for example, the duty ratio of 100%. Thereby, the main valve can be opened even in the case where negative pressure is caused by operating the pump 21 when the attracting force (Fcoil100) at the duty ratio of 100% is at the lower limit of the dispersion.

Further, a range A (designated by hatching in the drawing) produced by subtracting the set load (Fsp2) of the assist spring 56 from the set load (Fsp1) of the return spring 57 and adding, to the subtracted result, pressure difference biasing force (A2·ΔPa) applied on the auxiliary valve body 52 by pressure difference (ΔPa; for example, 100 kgf/cm$^2$) caused when the brake pedal 1 is depressed, is set to become lower than a lower limit value by a dispersion in the attracting force (Fcoil50) at, for example, a duty ratio of 50%. Thereby, even in the case in which the brake pedal 1 is maximally depressed when the attracting force (Fcoil50) at the duty ratio of 50% is at a lower limit value of a dispersion, the attracting force (Fcoil50) overcomes force for closing the auxiliary valve body 56 (set load Fsp1−set load Fsp2+ pressure difference biasing force A2·ΔPa) and therefore the auxiliary valve can be opened.

Next, an explanation will be given of operation at the inside of the SR valve 28 accompanied by operation of brake control.

[Normal Brake Operation and Antiskid Control (Fully Closed State; FIG. 3)]

In this first embodiment, in the case of a normal brake operation or antiskid control, as shown in FIG. 3, since the return spring 57 biases the auxiliary valve body 52 in the arrow mark A direction, the restricted communication path 54 is cut off, and the assist spring 56 biases the main valve body 49 so that the main communication path 48 is cut off. Thereby, the fully-closed state of the SR valve 28 is maintained.

Under the fully-closed state, the conduit KD from the master cylinder 3 to the pump 21 is cut and therefore, the normal brake operation or a pressure decreasing operation or the like in antiskid control is carried out via the other conduits KA1 and KA2.

For example, in the case in which the conduit KD is cut off by the SR valve 28, when the brake pedal 1 is depressed, since the conduits KA1 and KA2 are communicated with each other the wheel cylinder pressure is increased by the master cylinder pressure caused by depressing the brake pedal 1. As a result, brake force by the normal brake operation is caused.

Further, consider a case in which when the conduit KD is cut off by the SR valve 28, the brake pedal 1 is depressed and the slip state becomes excessive by which the antiskid control is carried out.

In the case of a pressure decrease mode in antiskid control, under a state in which the pressure increase control valve 12, 13 is turned on (into a closed state) and thereby the conduit KA2 is cut off, the pressure decrease control valve 23, 24 is also turned on (into an open state). As a result, the conduit KB to the reservoir 22 is opened and brake pressure of the wheel cylinder 5, 6 is decreased.

[Traction Control and Turn Trace Control (Fully-Open State; FIG. 4)]

In carrying out traction control or turn trace control (vehicle yaw control), the SR valve 28 is turned on and opened (for example, at a duty ratio of 100%) in order to supply the brake fluid to the intake side of the pump 21. At this moment, because the brake pedal 1 is not depressed, both the main valve body 49 and the auxiliary valve body 52 are brought into a state where they are not applied with hydraulic pressure load (brake fluid pressure difference ΔPa).

When the SR valve 28 is turned on, the attracting force (Fcoil100) at the duty ratio of 100% is applied on the auxiliary valve body 52. Therefore, as shown in FIG. 4, the attracting force (Fcoil100) overcomes the biasing force of the return spring 57 and the auxiliary valve body 52 is moved in the attracting direction (arrow mark B direction) along with the main valve body 49 as a result that the auxiliary valve body 52 is engaged with the main valve body 49 via the engaging member 53. As a result, the main valve body 49 opens the main communication path 48 and the fully-open state is brought about. It is to be noted that, although in this case, the restricted communication path 54 is also opened, the fully-open state is invariably brought about since the main communication path 48 is opened by the main valve body 49.

Under the fully-open state, the conduit KD from the master cylinder 3 to the pump 21 is maximally opened and therefore, a sufficient flow rate can be ensured. Accordingly, by operating the pump 21, the operation of increasing the wheel cylinder pressure can be carried out swiftly and sufficiently.

[Power Assist Brake Control (Half Opened State, FIG. 5)]

When pressure increase control for increasing the wheel cylinder pressure more than the master cylinder pressure to enhance wheel braking force is carried out upon depression of the brake pedal 1, since the brake pedal 1 is depressed, both the main valve body 49 and the auxiliary valve body 52 are being brought into a state in which they are applied with hydraulic pressure load (brake fluid pressure difference ΔPa).

In this first embodiment, under such a state, when the solenoid 40 of the SR valve 28 is supplied with current (for example, at a duty ratio of 50%), the set load (Fsp1) of the return spring 57, the set load (Fsp2) of the assist spring 56, the auxiliary valve seat cross sectional area (A2) for determining the pressure difference biasing force (A2·ΔPa) applied on the auxiliary valve body 52 and the attracting force (Fcoil50) at the duty ratio of 50% applied on the auxiliary valve body 52 are set as mentioned above to maintain a state in which only the auxiliary valve is opened and the main valve is closed,.

Accordingly, even in the case where a pressure difference (ΔPa) between upstream pressure and downstream pressure of the SR valve 28 is caused upon depression of the brake pedal 1, when the solenoid 40 is turned on (for example, at a duty ratio of 50%), since the pressure difference biasing force (A2·ΔPa) in the arrow mark A direction caused by the pressure difference (ΔPa) applied on the auxiliary valve body 52 is small and the attracting force (Fcoil50) at the duty ratio of 50% is sufficiently larger than a value obtained by subtracting the set load (Fsp2) of the assist spring 56 from the set load (Fsp1) of the return spring 57, only the auxiliary valve body 52 is moved in the arrow mark B direction and thereby the restricted communication path 54 is opened (auxiliary valve is opened).

At this moment, in respect of the valve main body 49, it is biased in the arrow mark A direction by the assist spring 56. Therefore, the main valve body 49 cannot move and stays seated (main valve stays closed).

That is, by closing the main valve and opening the auxiliary valve, the half-open state is realized.

By operating the pump 21 in the half-open state, intake and delivery amounts of the pump is decreased since the flow resistance of the conduit KD is large. Therefore, the wheel cylinder pressure can be increased smoothly since pressure variation in increasing the wheel cylinder pressure is restrained.

Further, transmission of pulsation which is caused in intake operation of the pump 21 into the master cylinder 3 can be restrained by the throttling effect of the SR valve 28 and thereby excellent brake pedal feeling can be achieved.

(Second Embodiment)

An explanation will be given of a second embodiment of the present invention.

Figure 7:
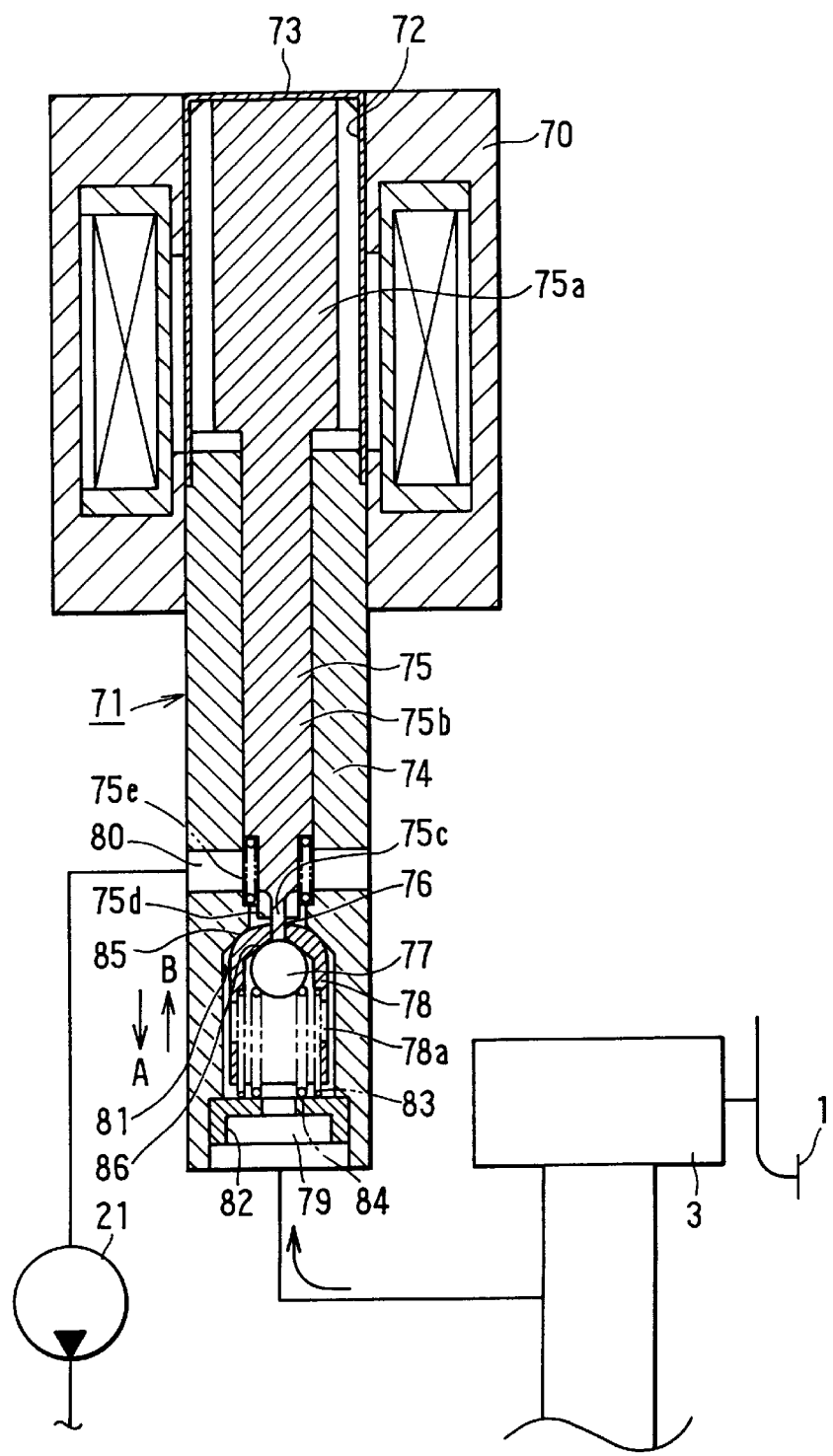
FIG. 7 is a cross-sectional view illustrating a full-closed state of an electromagnetic valve according to a second embodiment.
Figure 8:
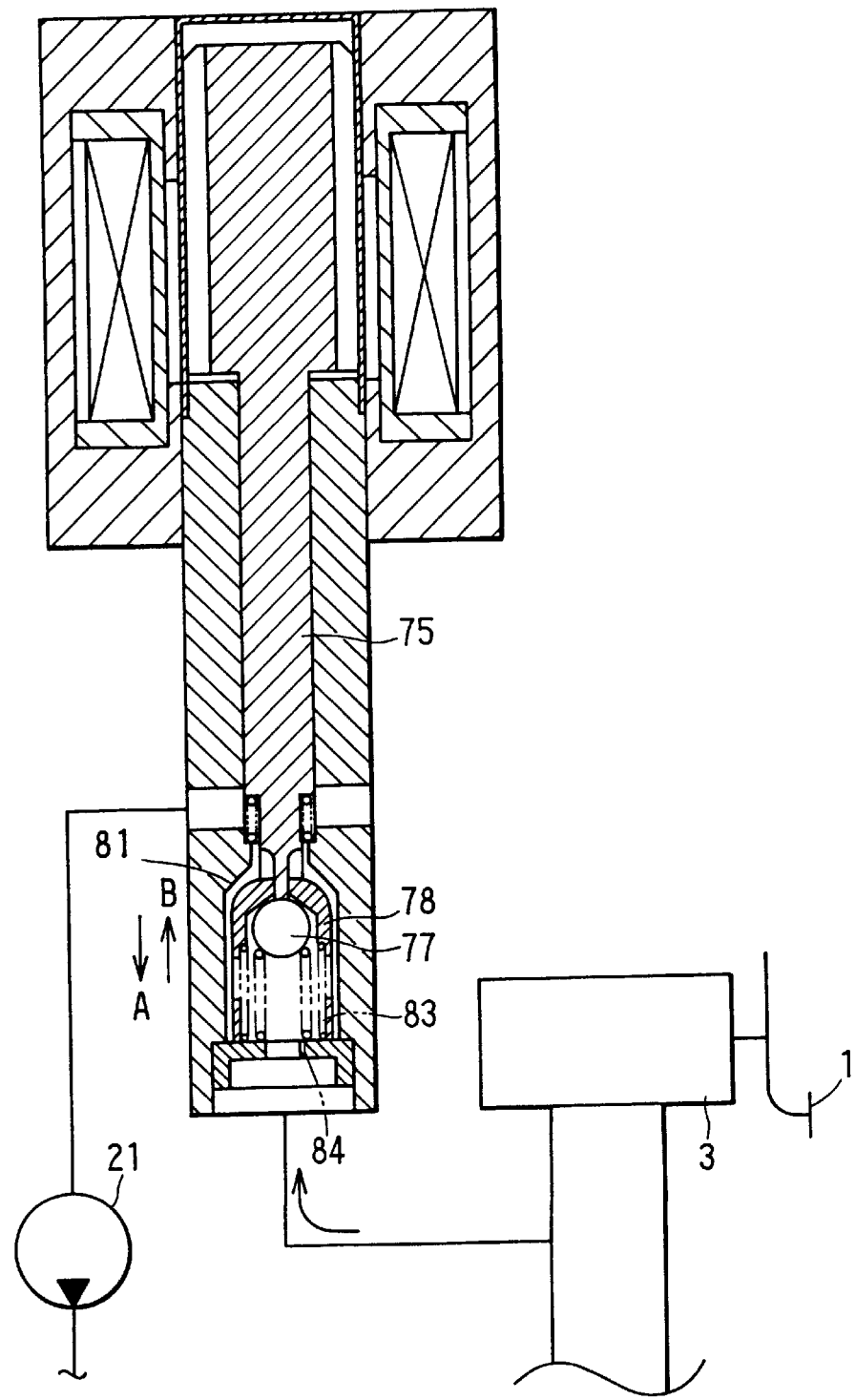
FIG. 8 is a cross-sectional view illustrating a full-open state of the electromagnetic valve according to the second embodiment.
Figure 9:
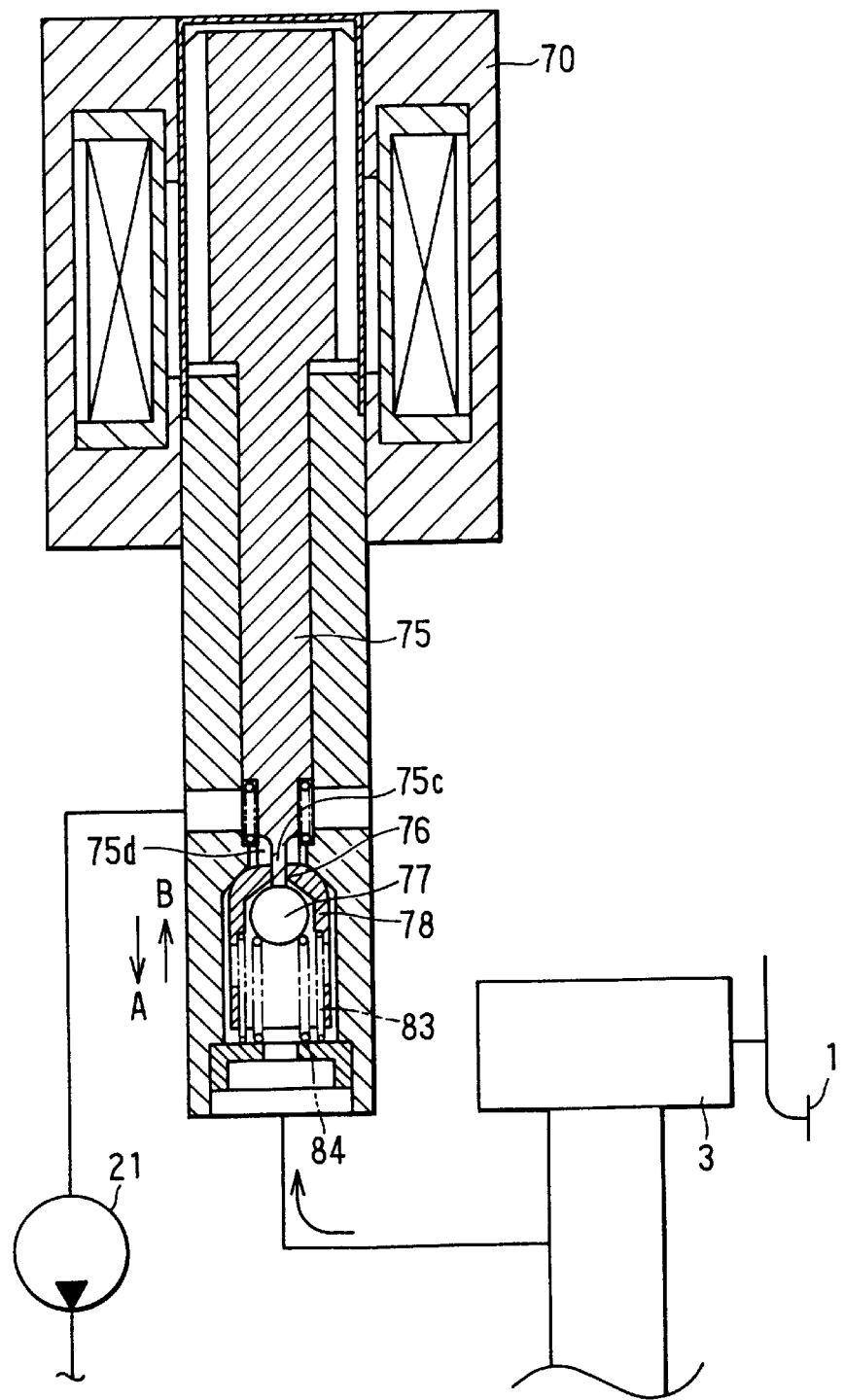
FIG. 9 is a cross-sectional view illustrating a half-open state of the electromagnetic valve according to the second embodiment.

FIGS. 7 through 9 are sectional views showing an SR valve which is an electromagnetic valve according to the second embodiment, FIG. 7 shows a fully-closed state of the SR valve, FIG. 8 shows a fully-open state of the SR valve and FIG. 9 shows a half-open state of the SR valve.

First, an explanation will be given of the structure of the SR valve.

As shown in FIG. 7, the SR valve is provided with a solenoid 70, and a valve mechanism 71 arranged in the solenoid 70 and a housing (not illustrated).

A hollow portion 72 in a cylindrical shape is formed at a center of the solenoid 70 and a sleeve 73 one end of which is closed is provided in the hollow portion 72.

The valve mechanism 71 is formed by a cylinder 74 constituting an outer periphery thereof and a valve opening member 75 movable in the up and down direction of the drawing and disposed at the inside of the sleeve 73 and the cylinder 74.

The valve opening member 75 is composed of a large diameter portion 75a at an upper portion thereof and a rod 75b having a small diameter at a lower portion thereof. The large diameter portion 75a is a magnetic body and receives magnetic attracting force caused by supplying electricity to the solenoid 70, by which the valve opening member 75 is moved in an arrow mark A direction. The rod 75b is a member for opening a main valve and an auxiliary valve. An auxiliary valve body pushing portion 75c which is inserted into a restricted communication path 76, for pushing an auxiliary valve body 77 in the arrow mark A direction, is formed to project from the lower end of the rod 75b. Further, a main valve body pushing portion 75d for pushing an upper face of a main valve body 78 in the arrow mark A direction is formed on the lower end of the rod 75b.

A first opening 79 communicating with the master cylinder 3 is formed on the lower end side of the cylinder 74. A second opening 80 communicating with the intake side of the pump 21 is formed on the side face of the cylinder 74. A flow path from the first opening 79 to the second opening 80 is formed in the cylinder 74.

The flow path on the side of the first opening 79 is provided with a large diameter and the main valve body 78 in a bell-like shape for alternatively opening and closing a main communication path 81 is arranged at inside thereof. The restricted communication path 76 (having a diameter smaller than that of the main communication path 81) is formed at an axis center of the main valve body 78. An opening 78a is formed at a side portion of the main valve body 78.

Further, the auxiliary valve body 77 in a spherical shape for alternatively opening and closing the restricted communication path 76 which is formed at the axis center of the main valve body 78 is arranged at the inside of the main valve body 78.

Further, an assist spring 83 for biasing the main valve body 78 in a valve closing direction (arrow mark B direction) is arranged between the main valve body 78 and a base 82 fitted into the first opening 79. A return spring 84 for biasing the auxiliary valve body 77 in the valve closing direction (arrow mark B direction) is arranged between the auxiliary valve body 77 and the base 82.

Because the restricted communication path 76 is formed in the axial direction of the main valve body 78, the main communication path 81 is not completely closed even when the main valve body 78 is seated on a valve seat 85 thereof unless the auxiliary valve body 77 is seated on a valve seat 86 thereof. That is, in this case, the brake fluid flows between the first and second openings 79, 80 via the restricted communication path 76.

Accordingly, similar to the first embodiment, as the operational state of the SR valve, there are three states of "a fully-open state" in which the main valve body 78 is separated from the valve seat 85 and the main communication path 81 is opened, "a fully-closed state" in which both of the main valve and the auxiliary valve close the main communication path 81 and the restricted communication path 76, respectively, and "a half-open state" in which the auxiliary valve opens the restricted communication path 76 and the brake fluid flows into the main communication path 81 via the restricted communication path 76.

Next, an explanation will be given of a relationship among forces applied on respective structural elements in the SR valve.

In this second embodiment, as shown in FIG. 7, a cross sectional area of a portion where the main valve body 78 is seated on the valve seat 85 in the main communication path 81 (main seat cross sectional area A1) is set to be larger than a cross sectional area of a portion where the auxiliary valve body 77 is seated on the valve seat 86 in the restricted communication path 76 (auxiliary seat cross sectional area A2). For example, a ratio of A2/A1 is set to a value of 1/50.

Further, attracting force is operated only in respect with the valve opening member 75 when the solenoid 70 generates electromagnetic force in response to electricity supplied thereto. Particularly, in this second embodiment, to realize the fully-open state, large attracting force (Fcoil100) in respect with the valve opening member 75 is caused by setting the duty ratio of current supplied to the solenoid 70 to 100%, for example. Further, to realize the half-open state, small attracting force (Fcoil50) is caused in respect with the valve opening member 75 by setting the duty ratio to 50%, for example.

Conditions for maintaining the above-described fully-open state, fully-closed state and half-open state will be explained by using equations.

[Fully-Closed State (Refer to FIG. 7)]

In the case of the fully-closed state, only biasing force (Fsp1) of the return spring 84 and biasing force (Fsp2) of the assist spring 83 are applied on the main valve body 78 and the auxiliary valve body 77. Accordingly, conditions required for maintaining the fully-closed state are as follows.

$Fsp1>0$ $Fsp2>0$

[Fully-Open State (Refer to FIG. 8)]

Forces to be considered in the case of the fully-opened state (however, the brake pedal 1 is not depressed), are the biasing force (Fsp1) of the return spring 84, the biasing force (Fsp2) of the assist spring 83 and the attracting force (Fcoil100) applied on the valve opening member 75 when, for example, the duty ratio of current is 100%. A condition required for these forces to maintain the fully-open state is as follows.

$Fcoil100>Fsp1+Fsp2$

[Half-Open State (Refer to FIG. 9)]

Forces to be considered in the case of the half-open state (however, irrespective of whether or not the brake pedal; 1 is depressed) are the biasing force (Fsp1) of the return spring 84, pressure difference biasing force (A2·ΔPa) in respect with the auxiliary valve body 77 caused by pressure difference ΔPa and the attracting force (Fcoil50) applied on the valve opening member 75 when the duty ratio of current is, for example, 50%. Conditions required for these forces to maintain the half-open state are as follows.

$$Fcoil50 > Fsp1 + A2 \cdot \Delta Pa$$

$$Fcoil50 < Fsp1 + Fsp2$$

Next, an explanation will be given of operation at the inside of the SR valve accompanied by operation of brake control.

[Normal Brake Operation and Antiskid Control (Fully-Closed State; FIG. 7)]

In this second embodiment, in the case of a normal brake operation or antiskid control, as shown in FIG. 7, the return spring 84 and the assist spring 83 bias the auxiliary valve body 77 and the main valve body 78 in an arrow mark B direction, respectively. Therefore, the restricted communication path 76 and the main communication path 81 are cut off. Thereby, the fully-closed state in the SR valve is maintained.

In the fully-closed state, the conduit KD from the master cylinder 3 to the pump 21 is cut and accordingly, the normal brake operation or a pressure decreasing operation or the like of antiskid control is carried out via the other conduits KA1 and KA2.

[Traction Control and Turn Trace Control (Fully-Open State; FIG. 8)]

When traction control or turn trace control (vehicle yaw control) is carried out, the SR valve is turned on and fully opened to supply the brake fluid to the intake side of the pump 21 (for example, by supplying current of duty ratio of 100%). At this moment, because the brake pedal 1 is not depressed, both the main valve body 78 and the auxiliary valve body 77 are brought into a state where they are not applied with hydraulic pressure load (brake fluid pressure difference ΔPa).

Accordingly, because the attracting force (Fcoil100) generated by current having the duty ratio of 100% is applied on the valve opening member 75, as shown in FIG. 8, it overcomes the biasing forces of the assist spring 83 and the return spring 84. As a result, the main valve body 78 and the auxiliary valve body 77 are respectively moved in the valve opening direction (arrow mark A direction). The main valve body 78 opens the main communication path 81 to thereby bring about the fully-open state.

Under the fully-open state, the conduit KD from the master cylinder 3 to the pump 21 is maximally opened and therefore, a state of capable of ensuring a sufficient flow rate of brake fluid is brought about. Accordingly, by operating the pump 21, the operation of increasing the wheel cylinder pressure can be carried out swiftly and sufficiently.

[Power Assist Brake Control (Half-Open State, FIG. 9)]

When pressure increase control for increasing the wheel cylinder pressure more than the master cylinder pressure to enhance wheel braking force is carried out upon depression of the brake pedal 1, since the brake pedal 1 is depressed, the hydraulic load (ΔPa) is applied on the main valve body 78 and the auxiliary valve body 77.

In this second embodiment, when the solenoid 70 of the SR valve is supplied with current (for example, at a duty ratio of 50%) under such a situation, to open only the auxiliary valve and close the main valve, the set load (Fsp1) of the return spring 84, the auxiliary seat cross sectional area (A2) for determining the pressure difference biasing force (A2·ΔPa) in respect of the auxiliary valve body 77 and the attracting force (Fcoil50) generated by current of the duty ratio of 50% and applied on the valve opening member 75 are set as mentioned above.

Accordingly, even in the case where the pressure difference (ΔPa) is caused between upstream pressure and downstream pressure of the SR valve upon depression of the brake pedal 1, when the solenoid 70 is supplied with current (of duty ratio of 50%), since the pressure difference biasing force (A2·ΔPa) in the arrow mark B direction caused by the pressure difference (ΔPa) is small and the attracting force (Fcoil50) at the duty ratio of 50% is sufficiently larger than the set load Fsp1 of the return spring 84, by which the valve opening member 75 is moved in the arrow mark A direction. Therefore, only the auxiliary valve body 77 is pushed to move in the arrow mark A direction by the auxiliary valve pushing portion 75c and the restricted communication path 76 is opened (auxiliary valve is opened).

In this case, the valve opening member 75 is not applied with attracting force enough to open the main valve so that the main valve body 78 is moved by the main valve body pushing portion 75d. Accordingly, by the biasing force of the assist spring 83 in the arrow mark B direction, the main valve body 78 cannot be moved and stays seated (main valve stays closed).

Accordingly, by closing the main valve and opening the auxiliary valve, the half-open state is realized.

By operating the pump 21 in the half-open state, the wheel cylinder pressure can be increased smoothly without variation in pressure and the brake force can be enhanced while ensuring excellent brake pedal feeling.

Therefore, also in the second embodiment, not only effects similar to those in the first embodiment are achieved but also there is provided an advantage of capable of simplifying the structure of the SR valve since the assist spring 83 does not need to be arranged between the main valve body 78 and the auxiliary valve body 77.

Next, an explanation will be given of control operation for the SR valve 28 in reference to a flowchart shown in FIG. 11. It is to be noted that the flowchart shows relationship between operating states of the SR valve 28 and various kinds of control. In the following explanation, in respect of ABS control, traction control, turn trace control and power assist control, general control methods can be adopted and therefore, a detailed description will not be given of specific control methods thereof.

Figure 11:
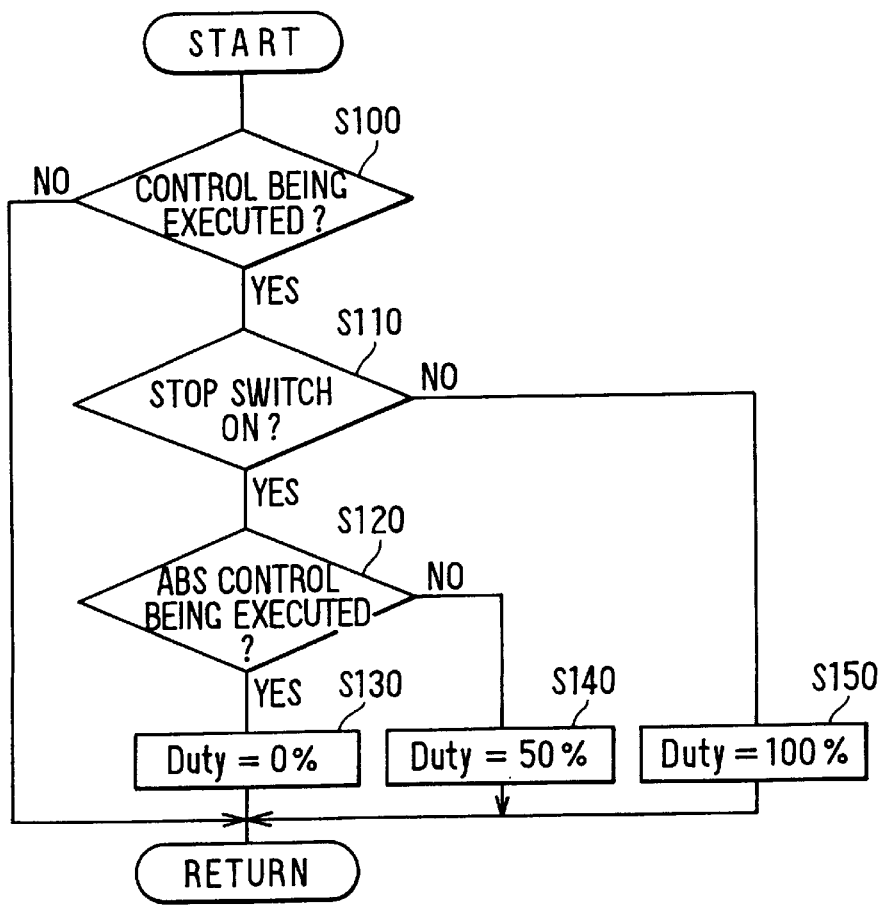
FIG. 11 is a flow diagram illustrating a control process for an SR valve in the first and second embodiments.
Figure 12:
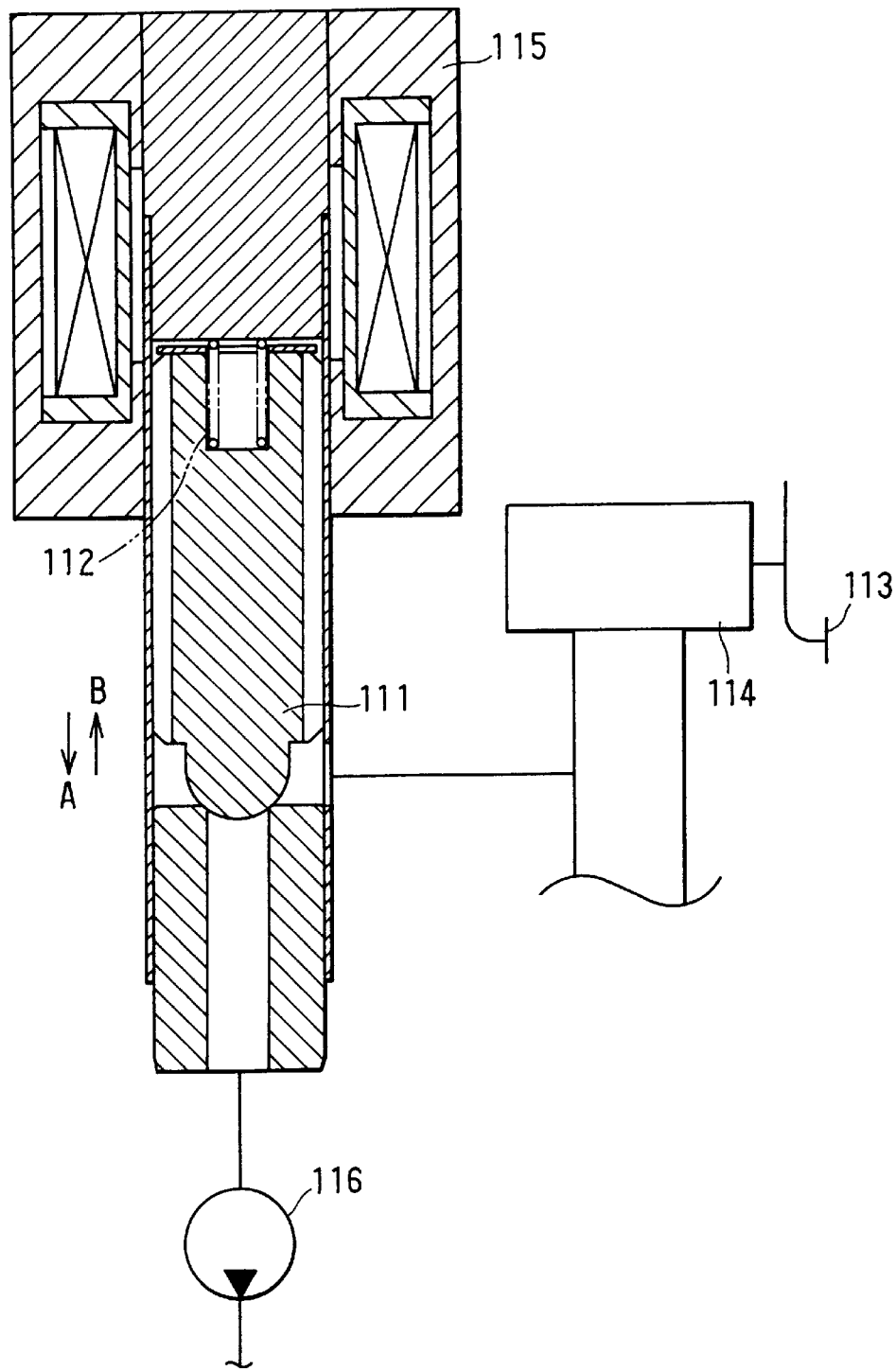
FIG. 12 is a cross-sectional view illustrating a conventional electromagnetic valve.

A flowchart shown in FIG. 11 is started when an ignition switch (not illustrated) is turned on. First, at step 100, whether various kinds of control, that is, at least one of ABS control, turn trace control and so on is being executed is determined.

In the case of negative determination, the valve position (fully-closed position) shown in FIG. 1 is maintained as it is. That is, current is not supplied to the SR valve 28.

In the case of affirmative determination at step 100, that is, when it is determined that at least one of ABS control, traction control, turn trace control and power assist brake control is carried out, the processing proceeds to step 110 and it is determined whether the stop switch 32 is turned on. In the case of affirmative determination, it is determined at step 120 whether ABS control is being carried out currently.

In other words, at step 120, it is determined whether the brake fluid needs to be drawn from the side of the master cylinder 3 and deliver it to the wheel cylinders 5 and 6 by the pump 21, that is, control of maintaining the wheel cylinder pressure higher than the master cylinder pressure is being carried out.

In the case of affirmative determination, that is, in the case where it is determined that ABS control is being carried out, drive current is not supplied to the SR valve 28 to prevent the pump 21 from drawing the brake fluid from the side of the master cylinder 3. Therefore, the SR valve 28 is maintained at the fully-closed position (step 130). If the SR valve 28 is brought into the fully-open or the half-open state in the case of ABS control, the brake fluid stored in the reservoir 22 is not drawn off by the pump and therefore pressure decreasing operation of the wheel cylinder pressure may not be carried out.

In the case of negative determination at step 120, there is a situation where the brake pedal 1 is depressed and ABS control is not being carried out. In this case, it is considered that, for example, power assist brake control is being carried out or turn trace control is being carried out. Therefore, in order to make pulsation caused by pump operation difficult to be transmitted to the brake pedal 1, the duty ratio of current supplied to the SR valve 28 is set to 50%. Thereby, the SR valve 28 is brought into the half-open state (step 140). It is to be noted that, when the brake pedal 1 is depressed and the master cylinder pressure is caused to some degree, flow resistance in the pump 21 drawing the brake fluid in the master cylinder 3 is small. Therefore, the pump 21 can take in the brake fluid from the master cylinder 3 and deliver it to the side of the wheel cylinders 5, 6 to increase the wheel cylinder pressure.

In the case of negative determination at step 110, that is, in the case where it is determined that any one of control is being carried out while the brake pedal 1 is not depressed, as shown by step 150, the duty ratio of drive current supplied to the SR valve 28 is set to 100%, whereby the fully-open state is achieved. It is to be noted that, as control which is being carried out at this occasion, traction control or turn trace control executed in a state in which the brake pedal 1 is not depressed is conceivable.

The present invention is not limited to the above-described first and second embodiments at all but can be constituted in various modes so far as they are within the scope of the present invention.

For example, various shapes of the main valve body and the auxiliary valve body can be adopted so far as they can realize the same functions as described above.

There may be adopted an elastic body such as a rubber in place of the return spring and/or the assist spring, and it may be used in a compressed state to generate biasing force.

In control of supplying drive current to the SR valve 28 described in reference to FIG. 11, for example, the determination at step 110 may be made as follows. That is, in place of ON/OFF determination of the stop switch 32, a pressure sensor for detecting the master cylinder pressure may be provided and it may be determined based on an output signal of the pressure sensor whether master cylinder pressure is equal to or higher than a predetermined value.

The predetermined value as a threshold value in this case may be determined so that, in view of the viscosity of the brake fluid, brake fluid drawing properties of the pump or the like, a pressure increase gradient of the wheel cylinder pressure produced by delivery of the pump is equivalent to a pressure increase gradient of the wheel cylinder pressure produced by delivery of the pump in the case where the SR valve 28 is fully opened when the brake pedal 1 is not depressed.

Further, for example, at step 110, it may be determined whether pressure difference between the wheel cylinder pressure and the master cylinder is equal to or higher than a predetermined value. In this case, a sensor for detecting the master cylinder pressure and a sensor for detecting the wheel cylinder pressure may be installed or the wheel cylinder pressures may be estimated by calculation from time periods of opening and closing of the pressure increase control valves 12 and 13 and the pressure decrease control valves 23 and 24.

Although in the above-described embodiments, an explanation has been given on the premise that all of ABS control, traction control, turn trace control and power assist brake control are carried out in a brake control system, an arbitrary plurality of control functions may be provided to the brake control system.

For example, the brake control system may only carry out ABS control and power assist brake control. In this case, when ABS control is carried out while power assist brake control is being executed, so far as all of the wheels are not brought under ABS control, the SR valve 28 may be maintained at the half-open state during power assist brake control. The reason is that when wheels to which ABS control is not being carried out while power assist brake control is being carried out are present, the wheel cylinder pressure can be increased in respect of the wheels under power assist brake control, whereby braking distance can be shortened.

Turn trace control is carried out both in a brake pedal depressing state and in a brake pedal non-depressing state while the SR valve 28 is driven into different valve opening states. Therefore, control of the SR valve 28 is carried out based on the stop switch 32 indicating an operational state of the brake pedal 1 or a detection signal of the master cylinder pressure or the like in the embodiment shown by FIG. 11. However, when the turn trace control is not carried out, for example, when functions for carrying out ABS control, traction control and power assist brake control are provided in a brake control system, the detection signal of the stop switch 32 or the like may not be used. In this case, it is recognized which control is being carried out and the fully-open, half-open or fully-closed state may be selected in accordance with a kind of control currently being carried out. That is, by detecting that no control is being carried out or that ABS control is being carried out, the SR valve 28 is maintained to the fully-closed state. In the case of traction control, the brake pedal 1 is not depressed. Therefore, when performance of traction control is detected, the SR valve 28 is brought into the fully-open state.

Further, in the power assist brake state, at least, the brake pedal 1 is depressed. Accordingly, the SR valve 28 is brought into the half-open state when execution of power assist brake is detected, because the master cylinder pressure is caused to some degree and the brake fluid flow resistance in passing through the SR valve 28 toward the intake port of the pump is considered to be small. Further, the master cylinder pressure is present even in the case of failure assist control in power assist brake control. Therefore, the SR valve 28 is brought into the half-open state, as the result of being considered that the flow resistance at the SR valve 28 is not large.

Although according to the above-described embodiments, power assist brake control includes control functions both in the case in which the booster 2 is normal and in the case in which it is abnormal, at least either of these may be provided. When only the control function for the case in which the booster 2 is normal is provided, the SM valve 15 can be omitted. Conversely, when only the failure assist control function is provided, the proportioning valve 11 can be omitted.

(Third Embodiment)

Next, a detailed explanation will be given of the structure and operation of an SR valve 120 according to a third embodiment in reference to FIGS. 13A, 13B, 14, 15 and 16.

Figures 13A, 13B:
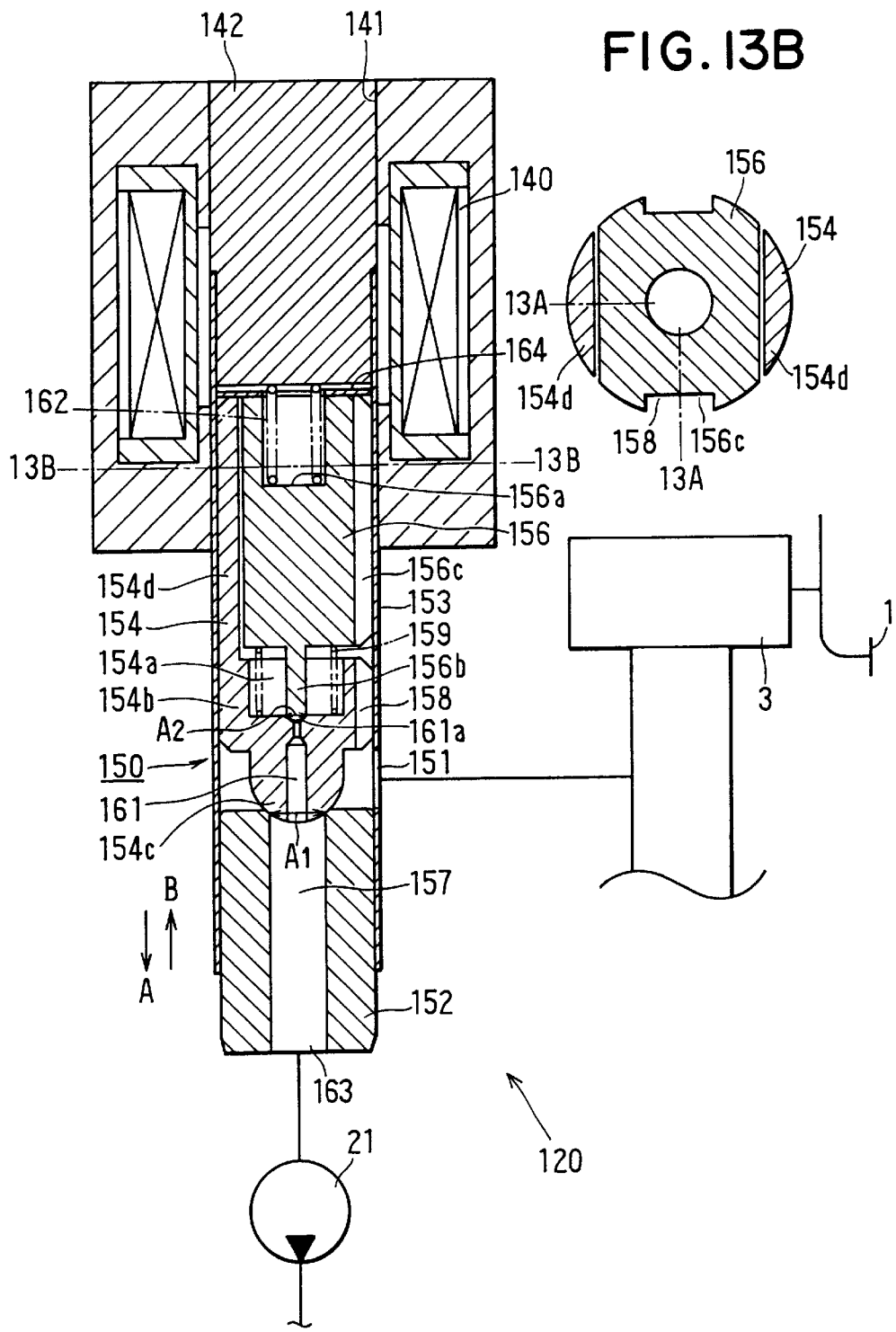
FIG. 13A is a cross-sectional view taken along a line 13A—13A in FIG. 13B and illustrating a full-closed state of an electromagnetic valve according to a third embodiment.
FIG. 13b is a cross-sectional view taken along a line 13B—13B in FIG. 13A.
Figure 14:
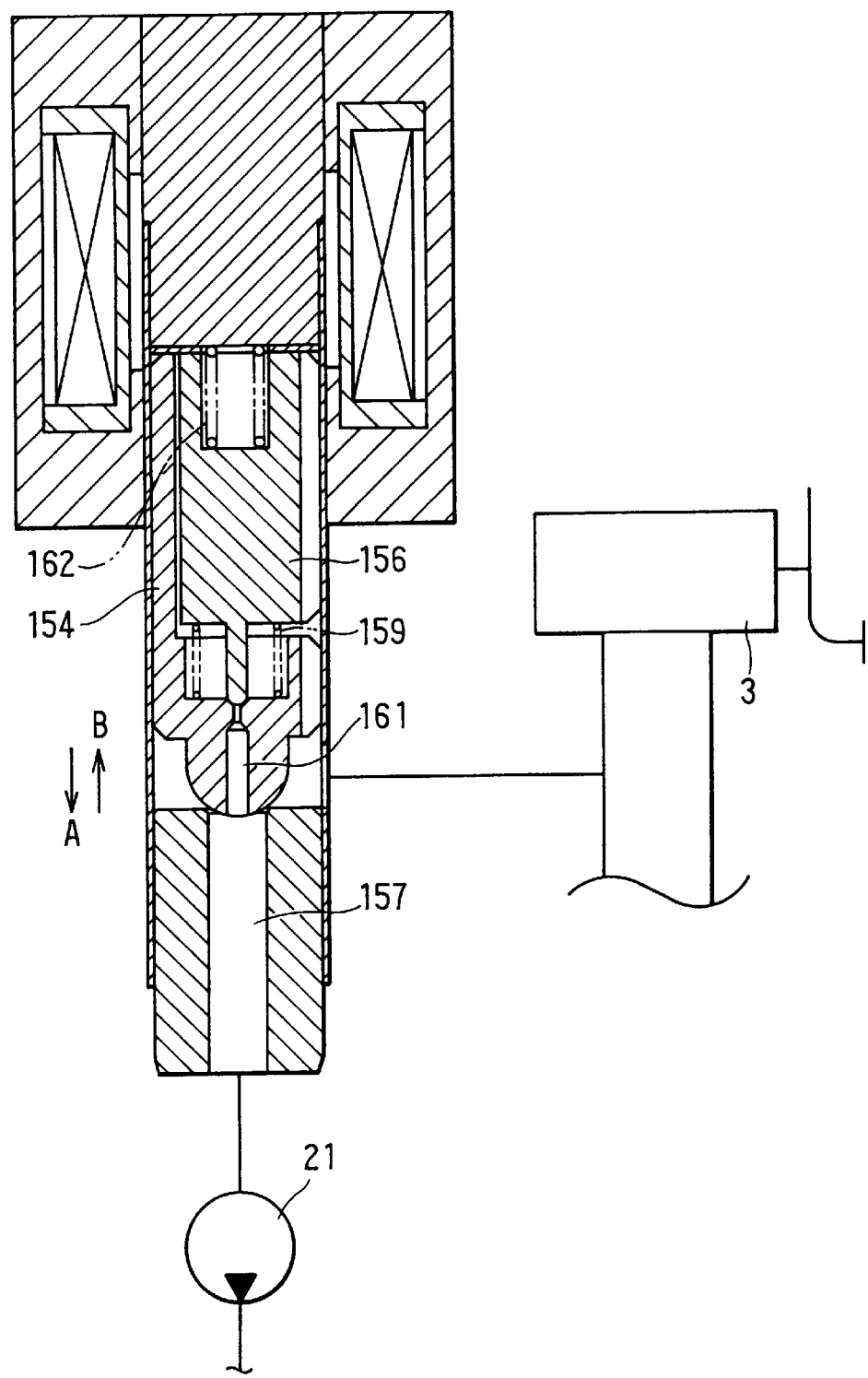
FIG. 14 is a cross-sectional view illustrating a full-open state of the electromagnetic valve according to the third embodiment.
Figure 15:
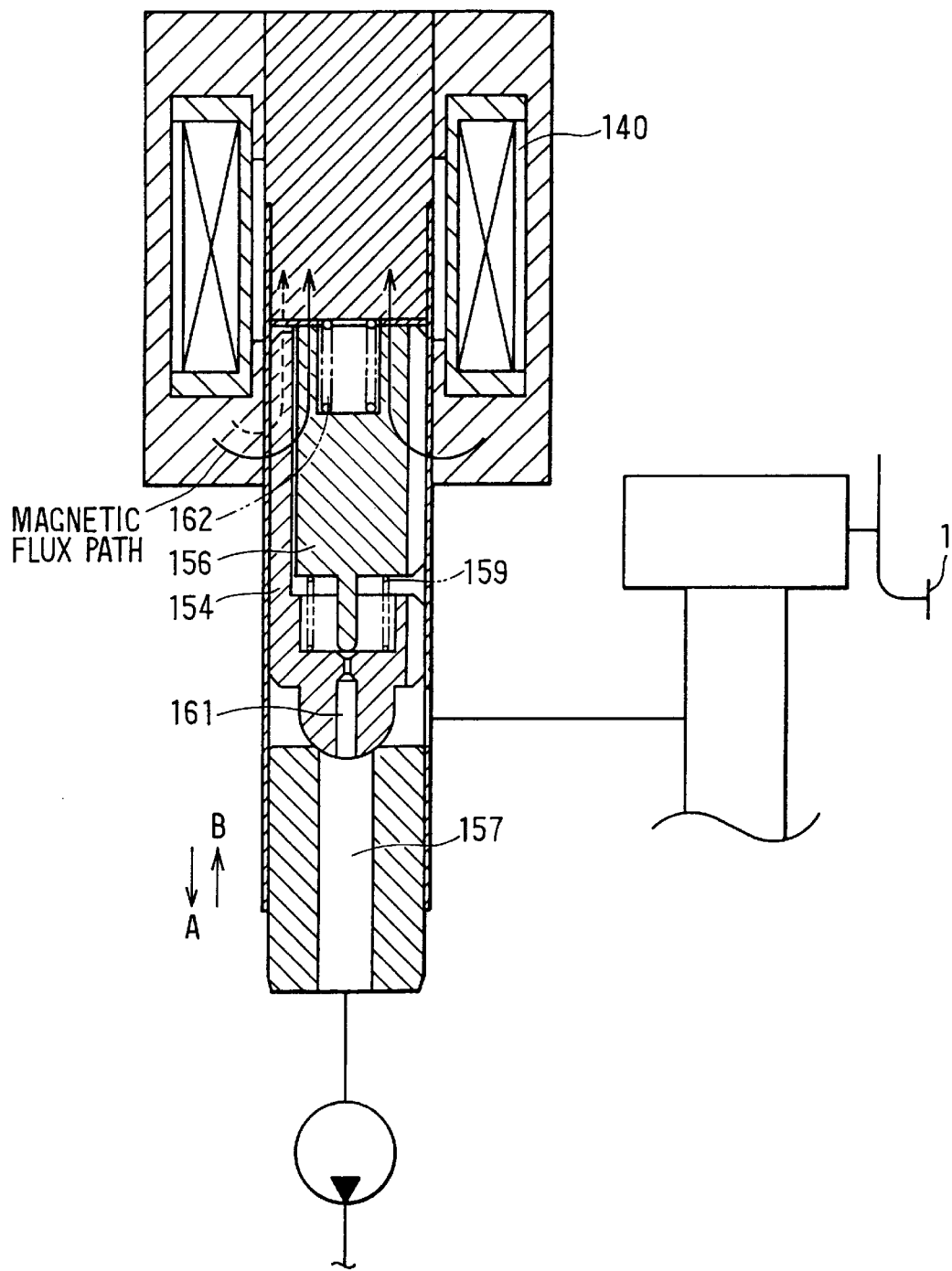
FIG. 15 is a cross-sectional view illustrating a half-open state of the electromagnetic valve according to the third embodiment.

FIGS. 13A and 13B show "a fully-closed state" of the SR valve 120, FIG. 14 shows "a fully-open state" thereof and FIG. 15 shows "a half-open state" thereof. Further, FIG. 13A shows a sectional view taken along a line 13A—13A in FIG. 13B and FIG. 13B shows a sectional view taken along a line 13B—13B in FIG. 13A.

First, an explanation will be given of the structure of the SR valve 120. As shown in FIG. 13A, the SR valve 120 is provided with a solenoid 140 and a valve mechanism 150 arranged in the solenoid 140 and a housing (not illustrated).

A hollow portion 141 in a cylindrical shape is formed at a center of the solenoid 140 and the upper end of the hollow portion 141 is closed by a stopper 142.

The valve mechanism 150 is formed by a valve seat (main valve seat) 152 in a cylindrical shape, a sleeve 153 made of a nonmagnetic body constituting an outer periphery of the valve mechanism 150 which extends from the valve seat 152, a main valve body 154 movable in the up and down direction in the drawing, which is arranged at an inside of the sleeve 153, and an auxiliary valve body 156 arranged at an inside of the main valve body 154.

A main communication path 157 is formed in the valve seat 152 in the axial direction thereof. The main communication path 157 is alternatively opened and closed by the main valve body 154. That is, a main valve is formed by the main valve body 154 and the valve seat 152 on which the main valve body 154 is seated.

A second opening 163 communicating with the main communication path 157 is formed in the valve seat 152. The second opening 163 also communicates with the intake side of the pump 21. Thereby, the brake fluid which is supplied from the master cylinder 3 and flows from a first opening 151 of the sleeve 153 via the main communication path 157 or a restricted communication path 161, is supplied to the wheel cylinders 5 and 6 via the pump 21.

The lower end of the sleeve 153 is fixedly fitted to an upper portion of the valve seat 152 and the upper end thereof is fixedly fitted to a lower portion of the stopper 142.

A (nonmagnetic) plate 164 for preventing magnetic short-circuit is installed between the auxiliary valve body 156 as well as the main valve body 154 and the stopper 142.

The main valve body 154 comprises a central portion 154b having a recess portion 154a opened upwardly (arrow mark B direction), a front end portion 154c which projects downwardly (arrow mark A direction) from the central portion 154b, is formed substantially in a hemispherical shape and is seated on the valve seat 152, and a pair of left and right rear end portions 154d in a plate-like shape (outer peripheral sides of which are round in a shape of a circular arc) extending upwardly from the central portion 154b (FIG. 3B). Side openings 158 are formed on side faces of the central portion 154b for spaces on upper and lower face sides of the main valve body 154 to communicate with each other.

Further, an assist spring 159 which makes contact with the lower face of the auxiliary valve body 156 for biasing the main valve body 154 in a direction of closing the main communication path 157 (arrow mark A direction) is arranged in the recess portion 154a of the central portion 154b.

The restricted communication path 161 is formed in the main valve body 154 in the axial direction of the valve composite body 150. The restricted communication path 161 is alternatively opened and closed by the auxiliary valve body 156. That is, an auxiliary valve is formed by the auxiliary valve body 156 and a valve seat 161a at a vicinity of an upper portion of the restricted communication path 161 on which the auxiliary valve body 156 is seated.

The auxiliary valve body 156 is formed substantially in a rod-like shape and has a front end portion 156b projecting downwardly from the lower face thereof. The assist spring 159 is arranged at the surrounding of the front end portion 156b. Side openings 156c are formed on a side face of the auxiliary valve body 156 for upper and lower faces of the auxiliary valve body 156 to communicate with each other.

The auxiliary valve body 156 is biased in a direction of closing the restricted communication path 161 formed in the main valve body 154 (arrow mark A direction) by a return spring 162 arranged between the auxiliary valve body 156 and the stopper 142. Specifically, the return spring 162 is interposed between the stopper 142 and the bottom of a recess portion 156a formed in an upper portion of the auxiliary valve body 156 in a compressed state. As a result, the auxiliary valve body 156 is biased in a direction of closing the restricted communication path 161 in the main valve body 154.

In this way, the front end portion 156b of the auxiliary valve body 156 is brought into contact with the valve seat 161a formed at the upper portion of the restricted communication path 161 and closes the restricted communication path 161. The restricted communication path 161 is made considerably narrower than the main communication path 157.

Because the restricted communication path 161 is formed in the axial direction of the main valve body 154, even when the main valve body 154 is seated on the valve seat 152, the main communication path 157 is not completely closed and the brake fluid is allowed to flow via the restricted communication path 161 unless the auxiliary valve body 156 is seated on the seat valve 161a. Accordingly, the SR valve 120 has three operational states of "a fully-open state" in which the main communication path 157 is completely opened, "a fully-closed state" in which both of the main communication path 157 and the restricted communication path 161 are closed and "a half-open state" in which brake fluid flows in the main communication path 157 via the restricted communication path 161.

Next, an explanation will be given of relationship among forces applied on respective structural elements in the SR valve 120.

In this third embodiment, as shown in FIG. 13A, a cross sectional area of a portion where the main valve body 154 closes the main communication path 157 (main seat cross sectional area A1) is set to be larger than a cross sectional area of a portion where the auxiliary valve body 156 closes the restricted communication path 161 (auxiliary seat cross sectional area A2). For example, a ratio of A2/A1 is set to a value of 1/50.

Further, the auxiliary valve body 156 is biased in a direction of separating from the stopper 142 (arrow mark A direction) by the return spring 162. Biasing force (Fsp1) of the return spring 162 is set to be larger than biasing force (Fsp2) of the assist spring 159.

Also, attracting force is applied on the main valve body 154 and the auxiliary valve body 156 when the solenoid 140 generates electromagnetic force in response to electricity supplied thereto. The main valve body 154 and the auxiliary valve body 156 are formed so that attracting force (Fcoil1) acting on the auxiliary valve body 156 corresponds to 75% of the total attracting force, and attracting force (Fcoil2) acting on the main valve body 154 corresponding to 25% of the total attracting force. This is realized by setting mainly a ratio of areas of end faces of the main valve body 154 and the auxiliary valve body 156 on the side of the stopper 142 as shown in FIG. 13B such that the total attracting force is distributed as described above.

Next, an explanation will be given of conditions for maintaining the above-described fully-open state, fully-closed state and half-open state.

[Fully Closed State (Refer to FIGS. 13A and 13B)]

In the case of the fully-closed state, only the biasing force (Fsp1) of the return spring 162 and the biasing force (Fsp2) of the assist spring 159 are applied on the main valve body 154 and the auxiliary valve body 156. A condition required for maintaining the fully-closed state in respect of these forces are as follows.

$$Fsp1 > Fsp2 > 0$$

[Fully-Open State (Refer to FIG. 14)]

Forces to be considered in the case of the fully-open state (however, the brake pedal is not depressed) are the biasing force (Fsp1) of the return spring 162, the biasing force (Fsp2) of the assist spring 159, the attracting force (Fcoil2) in respect with the main valve body 154 and the attracting force (Fcoil1) in respect with the auxiliary valve body 156. Conditions for maintaining the fully-open state in respect with these forces are as follows.

$$Fsp1 > Fsp2 > 0$$

$$Fcoil1 > Fsp1$$

$$Fcoil1 + Fcoil2 > Fsp1 + Fsp2$$

(incidentally, Fcoil2>Fsp2)

[Half-Open State (Refer to FIG. 15)]

Forces to be considered in the case of the half-open state (however, the brake pedal is depressed) are the biasing force (Fsp1) of the return spring 162, the biasing force (Fsp2) of the assist spring 159, pressure difference biasing force (A1·ΔPa) applied on the main valve body 154 by pressure difference ΔPa, pressure difference biasing force (A2·ΔPa) applied on the auxiliary valve body 156 by the pressure difference ΔPa, the attracting force (Fcoil2) in respect with the main valve body 154 and the attracting force (Fcoil1) in respect with the auxiliary valve body 156.

A condition required in respect with the main valve body 154 is as follows.

$$Fsp2 + A1 \cdot \Delta Pa > Fcoil2$$

Meanwhile, a condition required in respect with the auxiliary valve body 156 is as follows.

$$Fcoil1 + Fsp2 > Fsp1 + A2 \cdot \Delta Pa$$

Figure 16:
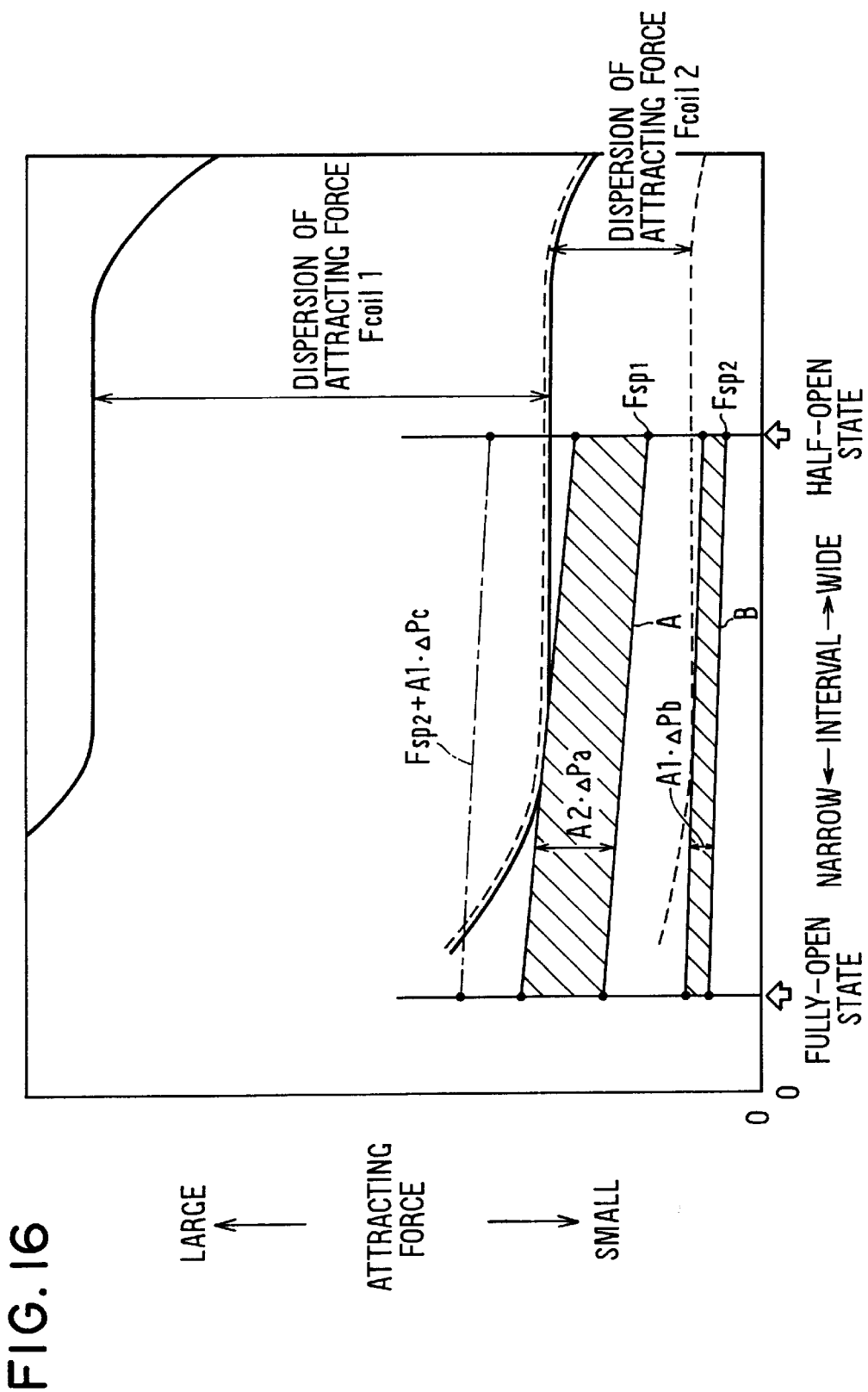
FIG. 16 is an explanation view for explaining relationship among attracting force of the electromagnetic valve and set loads of respective springs in the third embodiment.

As shown in FIG. 16, in consideration of a dispersion in the attracting force caused by individual difference and environmental condition of the electromagnetic valve, a variation in the drive voltage and so on, the set load (Fsp1) of the return spring 162 and the set load (Fsp2) of the assist spring 159 are determined.

Specifically, a range A (designated by hatching in the drawing) produced by adding the set load (Fsp1) of the return spring 162 and pressure difference biasing force by pressure difference (ΔPa: for example, 100 kgf/cm$^2$) caused when the brake pedal is depressed, is set to be lower than a lower limit value caused by a dispersion in the attracting force (Fcoil1) in respect with the auxiliary valve body 156. Thereby, even in the case in which the solenoid 140 generating a small attracting force in respect with the auxiliary valve body 156 is used and the brake pedal is maximally depressed, when the solenoid 140 is supplied with drive current, the attracting force (Fcoil1) overcomes force for closing the auxiliary valve body 156 (set load Fsp1+ A2·ΔPa), whereby the auxiliary valve can be opened.

Similarly, the set load (Fsp2) of the assist spring 159 is set in consideration of a dispersion in the attracting force. Specifically, a range B (designated by hatching in the drawing) produced by adding the set load (Fsp2) and negative pressure biasing force (A1·ΔPb) by negative pressure (ΔPb; for example, 1 kgf/cm$^2$ at maximum) caused when the pump 21 is operated (so-to-speak early drive of pump 21), is set to be lower than a lower limit caused by a dispersion in the attracting force (Fcoil2) in respect with the main valve body 154. Thereby, even in the case in which negative pressure is caused by operating the pump 21, when the solenoid 140 is supplied with drive current, the attracting force (Fcoil2) overcomes force for closing the main valve body 154 (set load Fsp2+A1·ΔPb), whereby the main valve can be opened.

Further, when the set load (Fsp2) of the assist spring 159 is set, a consideration is given such that the main valve is not opened unexpectedly even in a state where the brake pedal 1 is lightly depressed. That is, the set load (Fsp2) is set such that {set load Fsp2+A1·ΔPc (ΔPc: a few kgf/cm$^2$ in lightly depressing brake pedal 1)} exceeds an upper limit value caused by the dispersion in the attracting force (Fcoil2) applied on the main valve body 154.

Next, an explanation will be given of operation in the SR valve 120 accompanied by operation of brake control.

[Normal Brake Operation and Antiskid Control (Fully-Closed State; FIGS. 13A and 13B)]

According to the third embodiment, in the case of a normal brake operation or antiskid control, as shown in FIGS. 13A and 13B, since the return spring 162 biases the auxiliary valve body 156 in the arrow mark A direction, the restricted communication path 161 is cutoff, and the assist spring 159 biases the main valve body 154 so that the main communication path 157 is cut off. Thereby, the fully-closed state of the SR valve 120 is maintained.

Under the fully-closed state, the conduit KD from the master cylinder 3 to the pump 21 is cut by the SR valve 120. Therefore, the normal brake operation or a pressure decreasing operation or the like in antiskid control is carried out via the other conduits KA1 and KA2.

[Traction Control and Turn Trace Control (Fully-Open State; FIG. 14)]

When traction control or turn trace control (vehicle yaw control) is carried out, the SR valve 120 is turned on and opened to supply brake fluid to the intake side of the pump 21. At this time, because the brake pedal 1 is not depressed, both the main valve body 154 and the auxiliary valve body 156 are brought into a state where they are not applied with hydraulic pressure load (brake fluid pressure difference ΔPa).

Therefore, by applying electromagnetic forces (attracting forces; Fcoil2, Fcoil1) on the main valve body 154 and the auxiliary valve body 156 at a predetermined ratio, as shown in FIG. 14, the respective attracting forces (Fcoil2, Fcoil1) applied on the main valve body 154 and the auxiliary valve body 156 overcome the biasing forces of the assist spring 159 and the return spring 162, respectively. Thereby, the main valve body 154 and the auxiliary valve body 156 are both moved in a valve opening direction (arrow mark B direction). As a result, the main valve body 154 opens the main communication path 157 and the fully-open state is brought about.

Under the fully-open state, the conduit KD from the master cylinder 3 to the pump 21 is maximally opened. Therefore, a sufficient flow rate of brake fluid can be ensured. By operating the pump 21 in this state, operation of increasing the wheel cylinder pressure can be carried out swiftly and sufficiently.

[Power Assist Brake Control (Half-Open State, FIG. 15)]

When pressure increase control for increasing the wheel cylinder pressure more than the master cylinder pressure to enhance wheel braking force is carried out upon depression of the brake pedal 1, since the brake pedal 1 is depressed, both the main valve body 154 and the auxiliary valve body 156 are brought into a state in which they are applied with hydraulic pressure load ($\Delta Pa$).

In this third embodiment, under such a state, when the solenoid 140 of the SR valve 120 is supplied with drive current, in order to open only the auxiliary valve and close the main valve, the set load (Fsp1) of the return spring 162, the set load (Fsp2) of the assist spring 159, the main seat cross sectional area (A1) for determining pressure difference biasing force (A1·$\Delta Pa$) in respect with the main valve body 154 and the auxiliary seat cross sectional area (A2) for determining pressure difference biasing force (A2·$\Delta Pa$) in respect with the auxiliary valve body 156, and the distribution of the attracting force (Fcoil2) applied on the main valve body 154 and the attracting force (Fcoil1) applied on the auxiliary valve body 156 are set as described above.

Therefore, even in the case in which a pressure difference ($\Delta Pa$) is caused between upstream pressure and downstream pressure of the SR valve 120 in response to depression of the brake pedal 1, when the solenoid 140 is turned on, since the pressure difference biasing force (A2·$\Delta Pa$) in the arrow mark A direction caused by the pressure difference ($\Delta Pa$) applied on the auxiliary valve body 156 is smaller than the pressure difference biasing force (A1·$\Delta Pa$) applied on the main valve body 154 and the attracting force (Fcoil1) applied on the auxiliary valve body 156 is larger than the attracting force (Fcoil2) applied on the main valve body 154 and is sufficiently larger than the set load (Fsp1) of the return spring 162, only the auxiliary valve body 156 is moved in the arrow mark B direction. As a result, the restricted communication path 161 is opened (auxiliary valve is opened).

In this case, with regard to the main valve body 154, the pressure difference biasing force (A1·$\Delta Pa$) in the arrow mark A direction caused by the pressure difference ($\Delta Pa$) is smaller than the attracting force (Fcoil2) applied on the main valve body 154. Therefore, the main valve body 154 cannot be moved and stays seated (main valve stays closed).

By operating the pump 21 under the half-open state of the SR valve 120, the wheel cylinder pressure can be smoothly increased with reduced variation in pressure and the brake force can be enhanced while ensuring excellent brake pedal feeling.

Further, once the half-open state is brought about, a density of magnetic fluxes generated by the solenoid 140 of the SR valve 120 becomes dense at the auxiliary valve body 156 having small resistance (narrow gap) (indicated by bold lines of FIG. 15) and becomes coarse at the main valve body 154 having large resistance (wide gap) (indicated by broken lines of FIG. 15). Accordingly, the electromagnetic force (attracting force) applied on the main valve body 154 is considerably lowered. As a result, even in the case in which the pressure difference applied to the main valve is instantaneously nullified by pulsation of brake fluid discharged from the pump or the like, the main valve is not erroneously opened. Thereby, occurrence of brake pedal vibration, noise or the like can be restrained. Therefore, deterioration in the brake feeling can be prevented.

Further, according to the third embodiment, as described above, the main seat cross sectional area A1 and the auxiliary seat cross sectional area A2 which are pressure receiving areas, respectively depend on a diameter D1 of a seat portion of the main valve seat 152 and a diameter D2 of a seat portion of the auxiliary valve seat 161a. Therefore, the diameters D1 and D2 are set so that the pressure difference biasing forces (A1·$\Delta Pa$, A2·$\Delta Pa$) become desired values.

(Fourth Embodiment)

An explanation will be given of an SR valve according to a fourth embodiment in reference to FIGS. 17A and 17B.

Although the basic constitution of the SR valve according to the fourth embodiment is the same as that of the third embodiment, the position of an assist spring mainly differs. A detailed explanation of the difference will be given below.

As shown in FIG. 17A, similar to the third embodiment, an SR valve 181 is provided with a solenoid 182 and a valve mechanism 183. The valve mechanism 183 is provided with a sleeve 184, a valve seat 186, a main valve body 187, an auxiliary valve body 188, a return spring 191 and an assist spring 192.

Among these, the auxiliary valve body 188 is not provided with a side opening. Therefore, the auxiliary valve body 188 is substantially in a shape of a circular column (refer to FIG. 17B). Meanwhile, in the main valve body 187 disposed around the auxiliary valve body 188, an inner peripheral faces of upper end portions 187a thereof are notched and a lower level portion 187b are formed. The assist spring 192 for biasing the main valve body 187 in an arrow mark A direction is arranged between the lower level portion 187b and a stopper 189. Further, portions of the main valve body 187 from a central portion 187c to the left and right upper portions 187a, are roundly bent along the outer periphery of the auxiliary valve body 188. Side openings 187d are provided respectively between the two upper portions 187a.

Also in this fourth embodiment, similar to the third embodiment, the pressure difference biasing force (A1·$\Delta Pa$) applied on the main valve body 187 by the pressure difference $\Delta Pa$, the pressure difference biasing force (A2·$\Delta Pa$) applied on the auxiliary valve body 188, the set load (Fsp1) of the return spring 191, the set load (Fsp2) of the assist spring 192, the attracting force (Fcoil2) applied on the main valve body 187 by the solenoid 182, and the attracting force (Fcoil1) force applied on the auxiliary valve body 188 by the solenoid 182, are set such that when the solenoid does not generate the electromagnetic force, the fully-closed state in which the main valve and the auxiliary valve are both closed is brought about, when the pressure difference ($\Delta Pa$) between upstream pressure and down stream pressure in the SR valve 181 is not present, the fully-open state in which the main valve is fully opened is brought about by the electromagnetic force generated by the solenoid 182, and when the pressure difference ($\Delta Pa$) between the upstream pressure and the downstream pressure is present, the half-open state in which the auxiliary valve is opened whereas the main valve is closed is brought about by the electromagnetic force generated by the solenoid 182.

Therefore, also in this fourth embodiment, not only an effect similar to that in the third embodiment is achieved but also, there is achieved an advantage of capable of simplifying the constitution of the SR valve 181 since the assist spring 192 needs not to be arranged between the main valve body 187 and the auxiliary valve body 188.

(Fifth Embodiment)

Next, an explanation will be given of an SR valve according to a fifth embodiment in reference to FIG. 18.

In this fifth embodiment, although the basic constitution of the SR valve is the same as that of the third embodiment, shapes of magnetic flux path in a main valve body and an auxiliary valve body, that is, a characteristic of distributing electromagnetic force thereto mainly differs. A detailed explanation will be given centering on points of difference from the third embodiment.

Figure 18:
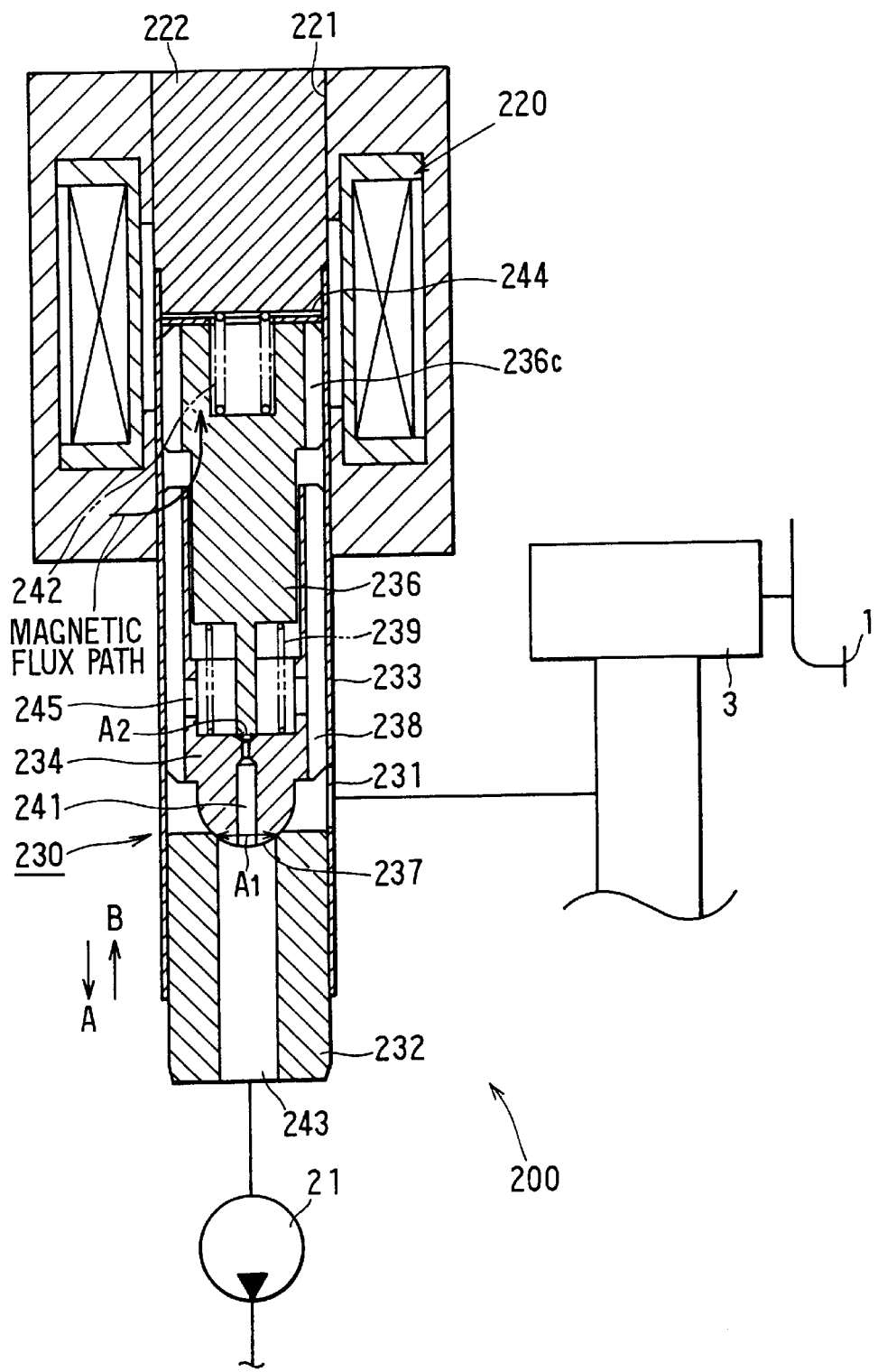
FIG. 18 is a cross-sectional view illustrating a full-closed state of an electromagnetic valve according to a fifth embodiment.

As shown in FIG. 18, similar to the third embodiment, the SR valve 200 according to the fifth embodiment is provided with a solenoid 220 and a valve mechanism 230. The valve mechanism 230 is formed by a sleeve 233, a valve seat 232, a main valve body 234, an auxiliary valve body 236, a return spring 242 and an assist spring 239.

Among them, an upper portion of the auxiliary valve body 236 has a shape of a circular column with a certain clearance from the inner wall of the sleeve 233. At the upper portion of the auxiliary valve body 236, magnetic flux paths are formed substantially in the axial direction of the SR valve 200. Side openings 236c are formed at the upper portion of the auxiliary valve body 236. Further, a lower portion of the auxiliary valve body 236 has a shape of a circular column which is inserted into the main valve body 234 in which a hollow portion is formed. At the lower portion of the auxiliary valve body 236, magnetic flux paths are formed in a radius direction from a yoke of the solenoid 220.

An upper portion of the main valve body 234 is formed substantially in a ring-like shape, into which the lower portion of the auxiliary valve body 236 is inserted and of which outer peripheral surface has a certain clearance with the inner wall of the sleeve 233. At the upper portion of the main valve body 234, magnetic flux paths are formed in the radius direction from the yoke of the solenoid 220. Side openings 238 are formed on the side face of the main valve body 234. Further, a space is formed at an inside of the main valve body 234 between the main valve body 234 and the auxiliary valve body 236. Communication holes 245 for communicating the space with the side openings 238 are formed in the main valve body 234.

Also in this fifth embodiment, the pressure difference biasing force (A1·ΔPa) applied on the main valve body 234 by the pressure difference ΔPa, the pressure difference biasing force (A2·ΔPa) applied on the auxiliary valve body 236 by the pressure difference ΔPa, the set load (Fsp1) of the return spring 242, the set load (Fsp2) of the assist spring 239 are set in a similar manner with the third embodiment.

However, according to the third embodiment, the magnetic flux paths formed in the main valve body 154 and the auxiliary valve body 156 are in parallel with each other and distribution of the electromagnetic force is set by the ratio of the cross sectional areas at the upper ends thereof. To contrary, according to the fifth embodiment, magnetic flux paths are formed in the main valve body 234 and the auxiliary valve body 236 are in series as shown in FIG. 18. Thereby, in the auxiliary valve body 236, maximum attracting force (Fcoil1) in respect with the cross sectional area thereof can be utilized. In the main valve body 234, attracting force (Fcoil2) corresponding to a vector component in parallel to the axial direction of magnetic fluxes which are caused between the main valve body 234 and the auxiliary valve body 236, is applied. Thereby, the distribution of the electromagnetic force in respect with the auxiliary valve body 236 and the main valve body 234 is made.

That is, the attracting force (Fcoil1) in respect with the auxiliary valve body 236 and the attracting force (Fcoil2) in respect with the main valve body 234 are set such that when the solenoid 220 does not generate the electromagnetic force, the fully-closed state in which the main valve and the auxiliary valve are closed is brought about, when the pressure difference (ΔPa) between upstream pressure and downstream pressure in the SR valve 200 is not present, the fully-open state in which the main valve is fully opened is brought about by the electromagnetic force, and when the pressure difference (ΔPa) between the upstream pressure and the downstream pressure of the SR valve 200 is present, the half-open state in which the auxiliary valve is opened while the main valve is closed is brought about by the electromagnetic force.

Therefore, also in this fifth embodiment, not only an effect similar to that in the third embodiment is achieved but also, particularly, large attracting force can be ensured in respect to the auxiliary valve body 236 (further, a variation in the attracting force in respect of the stroke of the main valve body 234 can be limited to be small on the side of the main valve body 234). Accordingly, there is achieved an advantage in which large design margin is obtained and the constitution can be simplified since a two face width structure is not needed as in the third embodiment.

(Sixth Embodiment)

Next, an explanation will be given of an SR valve according to a sixth embodiment in reference to FIG. 19.

According to the sixth embodiment, although the basic constitution of the SR valve 250 is the same as that of the fifth embodiment shown in FIG. 18, only shapes of portions of a main valve body and an auxiliary valve body in which magnetic flux paths are formed differ therefrom. A detailed explanation will be given centering on points of difference from the fifth embodiment.

Figure 19:
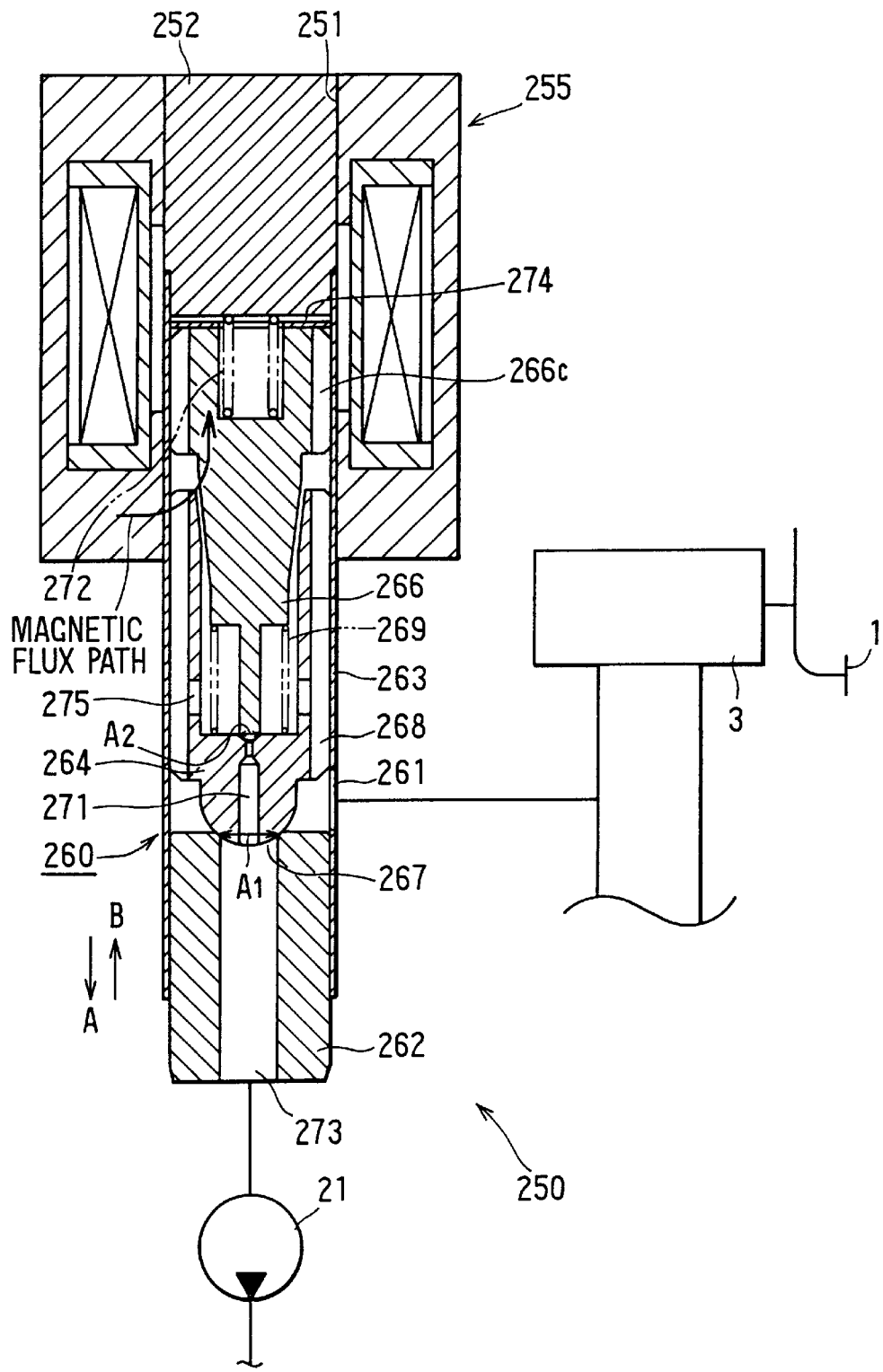
FIG. 19 is a cross-sectional view illustrating a full-closed state of an electromagnetic valve according to a sixth embodiment.

As shown in FIG. 19, similar to the fifth embodiment, the SR valve 250 according to the sixth embodiment is provided with a solenoid 255 and a valve mechanism 260. The valve mechanism 260 is formed by a sleeve 263, a valve seat 262, a main valve body 264, an auxiliary valve body 266, a return spring 272 and an assist spring 269.

Among them, outline constitutions of the auxiliary valve body 266 and the main valve body 264 are the same as those of the fifth embodiment. However, while according to the third embodiment, at the portions where magnetic flux paths are formed in the radius direction from the yoke of the solenoid 255, the auxiliary valve body 236 and the main valve body 234 are respectively formed in shapes of a circular column and a circular cylinder between which a clearance is provided in parallel with an axis of the SR valve 200, in this sixth embodiment, both of the auxiliary valve body 266 and the main valve body 264 have tapered shapes at faces which oppose to each other with a certain clearance.

Also in this sixth embodiment, the pressure difference biasing force (A1·ΔPa) applied on the main valve body 264 by the pressure difference ΔPa, the pressure difference biasing force (A2·ΔPa) applied on the auxiliary valve body 266, the set load (Fsp1) of the return spring 272, the set load (Fsp2) of the assist spring 269 are set in a similar manner with the fifth embodiment.

However, while according to the third embodiment, the space (clearance) between the main valve body 234 and the auxiliary valve body 236 extends in parallel with the axis of the SR valve 200, in this sixth embodiment, the space between the main valve body 264 and the auxiliary valve body 266 is formed in an oblique direction relative to the axis of the SR valve 250. As a result, a direction of magnetic flux applied on the main valve body 264 can be changed by which the attracting force (Fcoil2) applied on the main valve body 264 can be adjusted.

Accordingly, also in this sixth embodiment, not only effects similar to those of the fifth embodiment can be achieved but also, particularly, the attracting force (Fcoil1) applied on the auxiliary valve body 266 can be set larger and the attracting force (Fcoil2) applied on the main valve body 264 can be adjusted widely. Therefore, design margin and flexibility can be obtained.

(Seventh Embodiment)

Next, an explanation will be given of an SR valve according to a seventh embodiment in reference to FIG. 20.

In this seventh embodiment, although the basic constitution of the SR valve is the same as that of the third embodiment, a shape of an auxiliary valve body at a portion through which the magnetic flux passes, the magnetic material properties of a main valve body and the like mainly differ therefrom. A detailed explanation will be given centering on points of difference from the third embodiment.

Figure 20:
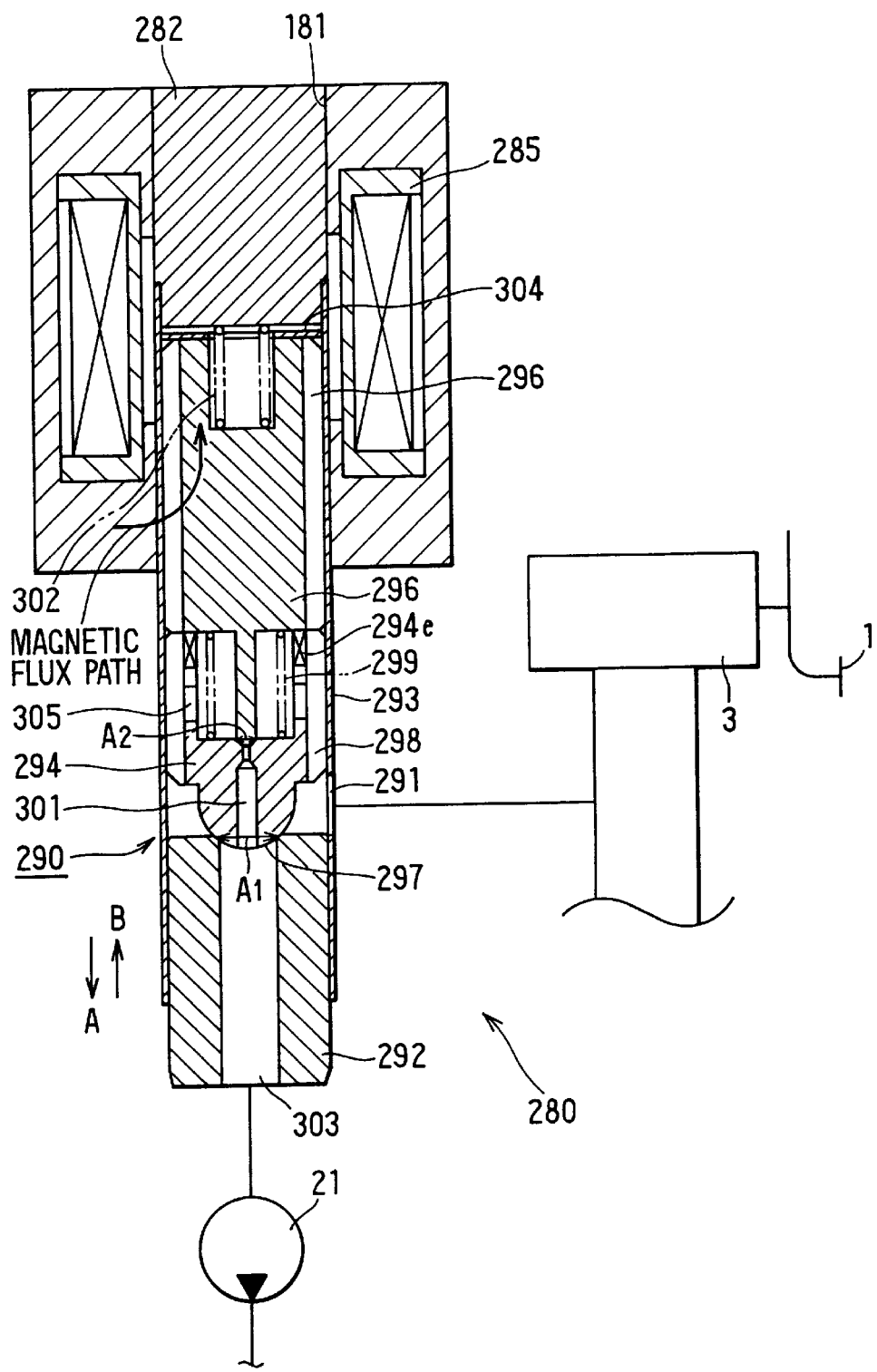
FIG. 20 is a cross-sectional view illustrating a full-closed state of an electromagnetic valve according to a seventh embodiment.

As shown in FIG. 20, similar to the third embodiment, the SR valve 280 according to the seventh embodiment is provided with a solenoid 285 and a valve mechanism 290. The valve mechanism 290 is formed by a sleeve 293, a valve seat 292, a main valve body 294, an auxiliary valve body 296, a return spring 302 and an assist spring 299.

Among them, a portion of the auxiliary valve body 296 through which magnetic flux passes is formed in a shape of a circular column with a clearance from an inner wall of the sleeve 293. Side openings 296c are formed in a side face of the auxiliary valve body 296.

The main valve body 294 is provided with a permanent magnet portion 294e substantially in a ring-like shape. One end of the permanent magnet portion 294e makes contact with the auxiliary valve body 296. A space is formed between the main valve body 294 and the auxiliary valve body 296 at an inside of a cylindrical portion of the main valve body 294. The cylindrical portion of the main valve body 294 has a sectional shape of a substantially ring-like shape. Side openings 298 are formed on the side face of the main valve body 294. Communication holes 305 are formed in the cylindrical portion of the main valve body 294 to communicate the space between the main valve body 294 and the auxiliary valve body 296 and the side openings 298.

Also in this seventh embodiment, the pressure difference biasing force (A1·ΔPa) applied on the main valve body 294 by the pressure difference ΔPa, the pressure difference biasing force (A2·ΔPa) applied on the auxiliary valve body 296 by the pressure difference ΔPa, the set load (Fsp1) of the return spring 302, the set load (Fsp2) of the assist spring 299 are set in a similar manner with the third embodiment.

However, while according to the third embodiment, magnetic flux paths formed in the main valve body 154 and the auxiliary valve body 156 are in parallel to each other and the electromagnetic force generated by the solenoid 140 is distributed in accordance with a ratio of sectional areas of upper ends thereof, in this seventh embodiment, magnetic flux passes through only the auxiliary valve body 296 and thereby the magnetic attracting force (Fcoil1) is applied on only the auxiliary valve body 296. The permanent magnet 294e in a ring-like shape having weak magnetic force is provided integrally with the cylindrical portion of the main valve body 294. Thereby, distribution of electromagnetic force is achieved by always operating weak magnetic attracting force (Fmagnet: corresponding to Fcoil2) between the main valve body 294 and the auxiliary valve body 296.

Therefore, also in this seventh embodiment, not only effects similar to those of the third embodiment are achieved but also, particularly, the large attracting force applied on the auxiliary valve body 296 can be ensured, the attracting force applied on the main valve body 294 can be adjusted widely and therefore, design margin and flexibility can be obtained. Further, there is provided an advantage of capable of simplifying the constitution of the SR valve 280 since the two face width structure as in the third embodiment needs not to be used.

(Eighth Embodiment)

Next, an explanation will be given of constitution and operation of an SR valve according to an eighth embodiment in reference to FIG. 21 through FIG. 23.

Figure 21:
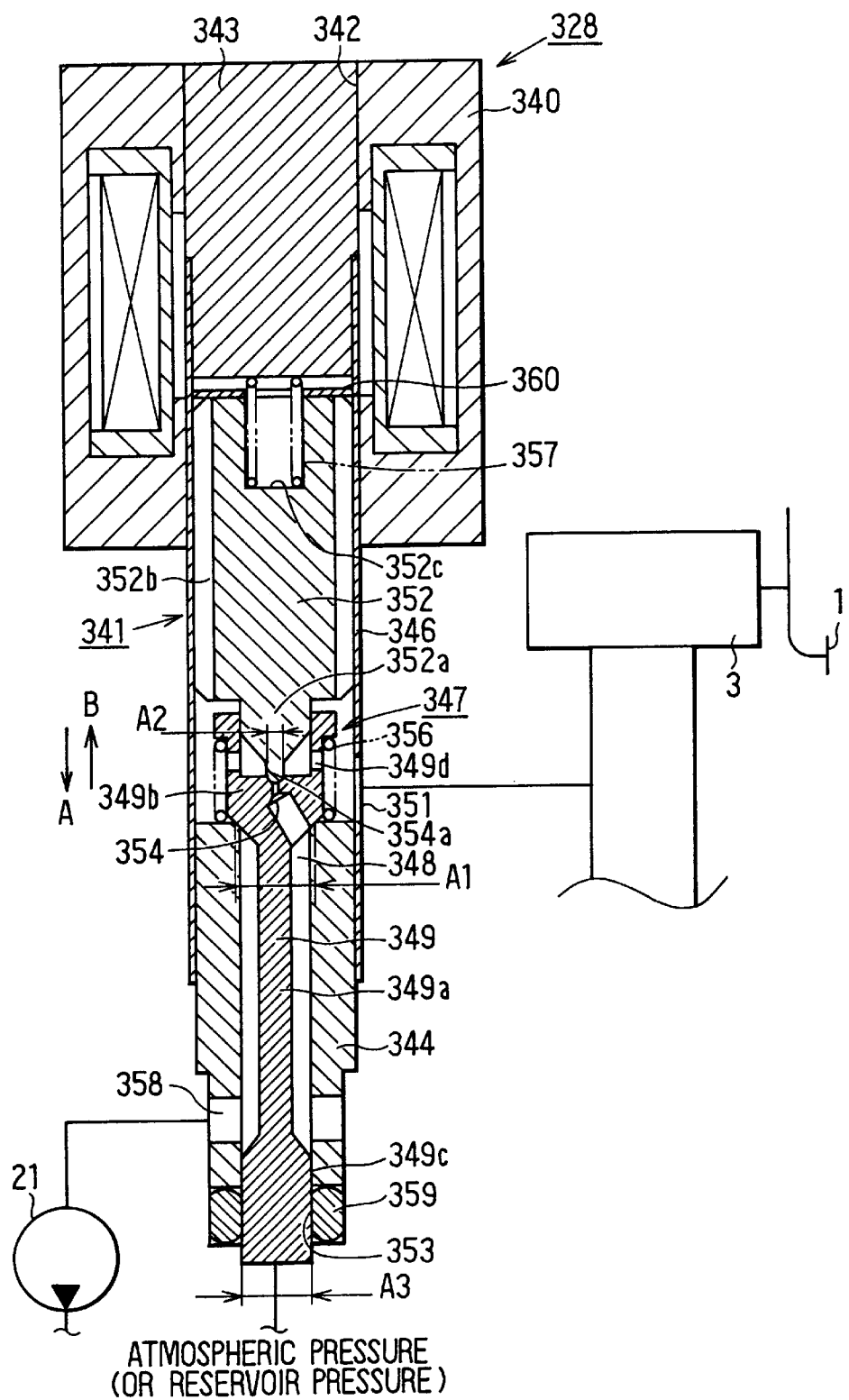
FIG. 21 is a cross-sectional view illustrating a full-closed state of an electromagnetic valve according to an eighth embodiment.
Figure 22:
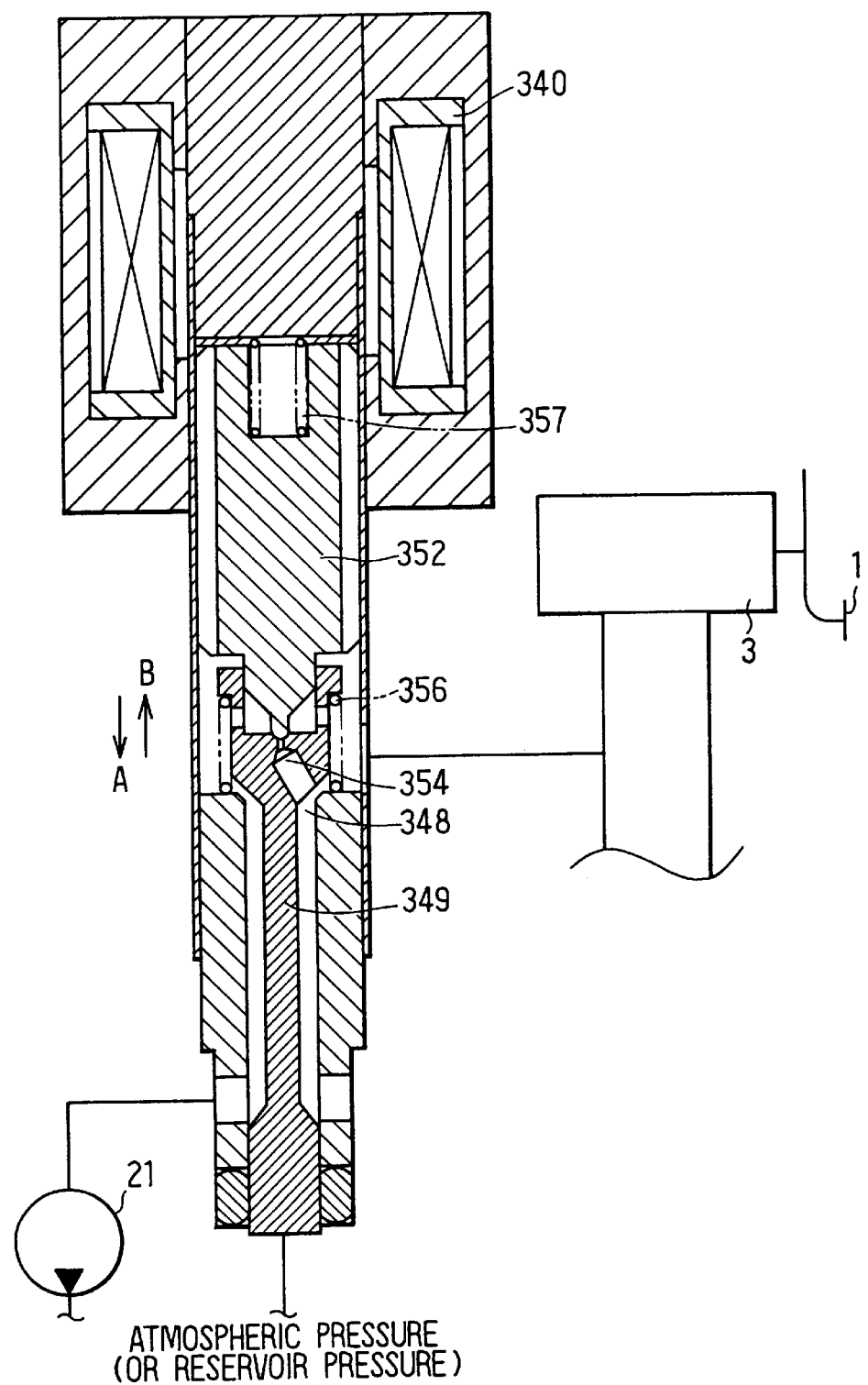
FIG. 22 is a cross-sectional view illustrating a full-open state of the electromagnetic valve according to the eighth embodiment.
Figure 23:
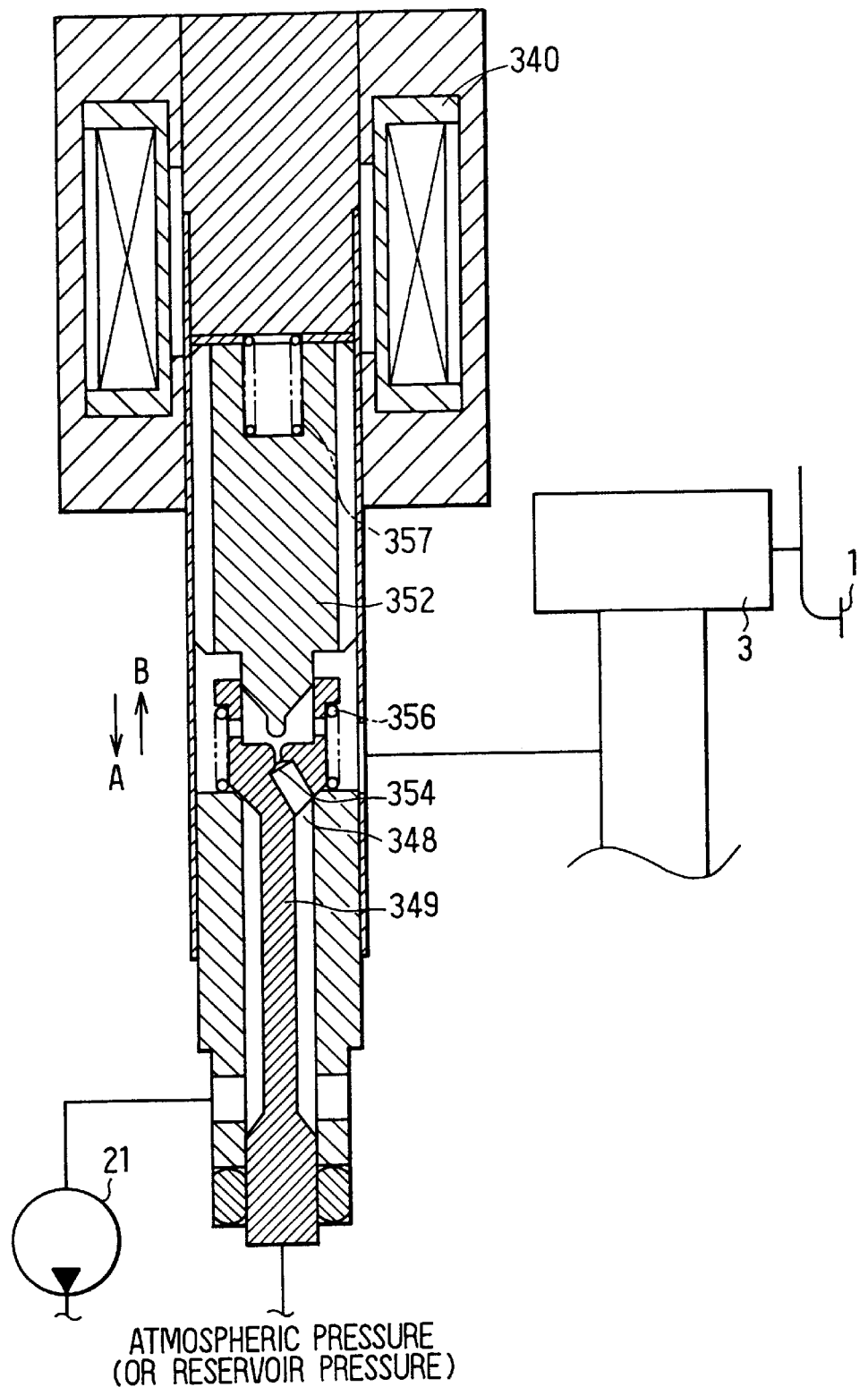
FIG. 23 is a cross-sectional view illustrating a half-open state of the electromagnetic valve according to the eighth embodiment.

FIG. 21 shows "a fully-closed state" of the SR valve 328, FIG. 22 shows "a fully-open state" thereof and FIG. 23 shows "a half-open state" thereof.

First, an explanation will be given of the structure of the SR valve 328.

As shown in FIG. 21, the SR valve 328 is provided with a solenoid 340 and a valve mechanism 341 arranged in the solenoid 340 and a housing (not illustrated).

A hollow portion 342 in a cylindrical shape is formed at a center of the solenoid 340 and the upper end of the hollow portion 342 is closed by a stopper 343.

The valve mechanism 341 is formed by a valve seat 344 in a cylindrical shape, a sleeve 346 extending from the valve seat 344 and constituting an outer periphery of the valve mechanism 341 and a valve composite body 347 arranged in the sleeve 346 and movable in the up and down direction in the drawing.

The sleeve 346 is made of a nonmagnetic body, the lower end of the sleeve 346 is fixedly fitted to an upper portion of the valve seat 344 and the upper portion thereof is fixedly fitted to a lower portion of the stopper 343. A first opening 351 communicating with the master cylinder 3 is formed in the sleeve 346.

A main communication path 348 is formed in the valve seat 344 along an axial direction thereof. The main communication path 348 is alternatively opened and closed by a main valve body 349.

At a lower end of the valve seat 344, a second opening 353 into which a lower portion (other end portion) 349c of the main valve body 349 is fitted is formed. Further, a third opening 358 communicating with the main communication path 348 as well as a pump 21 is formed in a side wall of the valve seat 344.

When the second opening 353 is exposed to an atmospheric pressure, the atmospheric pressure is applied on the lower portion 349c of the main valve body 349. However, when it is connected to the reservoir 22, the reservoir pressure is applied on the lower portion 349c of the main valve body 349. Hereinafter, a description will be given of a case of the atmospheric pressure being applied on the lower portion 349c.

The third opening 358 communicates with the intake side of the pump 21. Thereby, the brake fluid which is supplied from the master cylinder 3 and flows from the first opening 351 of the sleeve 346 via the main communication path 348 (and a restricted communication path 354), is supplied to the wheel cylinders 5 and 6 via the pump 21.

In the valve composite body 347, an auxiliary valve body 352 is arranged on the side of the stopper 343, is movable in the up and down direction in the drawing and is made of a magnetic body. The main valve body 349 is arranged on the side of the valve seat 344, is movable in the up and down direction of the drawing and is made of a nonmagnetic body.

The main valve body 349 is formed by an upper portion (one end portion) 349b having a large diameter and seated on the upper end of the valve seat 344, a lower portion 349c slidably fitted into the second opening 353 of the valve seat 344, and a central portion 349a having a slender diameter and connecting the upper portion 349b and the lower portion 349c.

The lower portion 349c of the main valve body 349 is held in liquid tight (oil tight) by a seal portion 359. Therefore, the atmospheric pressure is applied to a lower face of the lower portion 349c as a back pressure of the main valve body 349. Meanwhile, an assist spring 356 is disposed between the upper end of the valve seat 344 and a flange formed on the upper portion 349b of the main valve body 349 and biases the main valve body 349 in a direction of opening the main communication path 348 (arrow mark B direction).

Further, a restricted communication path 354 is formed in the main valve body 349 so that it has a shape bending from an axis center of the main valve body 349 with a predetermined angle and the bent portion is connected to the main communication path 348. The restricted communication path 354 is alternatively opened and closed by the auxiliary valve body 352. Further, communication holes 349d for communicating the first opening portion 351 with the restricted communication path 354 are formed in the upper portion 349b of the main valve body 349.

The auxiliary valve body 352 is formed substantially in a rod-like shape and a front end portion 352a thereof is projected downwardly (in an arrow mark A direction). Side openings 352b are formed on side faces of the auxiliary valve body 352 to connect spaces at upper and lower faces of the auxiliary valve body 352.

The auxiliary valve body 352 is biased in a direction of closing the restricted communication path 354 (arrow mark A direction) by a return spring 357 arranged between the auxiliary valve body 352 and the stopper 343. Specifically, one end of the return spring 357 makes contact with the stopper 343 and the other end thereof makes contact with the bottom of a recess portion 352c formed in the auxiliary valve body 352. That is, the return spring 357 is installed in the recess portion 352c in a compressed state, thereby biasing the auxiliary valve body 352 in the direction of closing the restricted communication path 354.

Thereby, the front end portion 352a of the auxiliary valve body 352 is seated on a valve seat 354a at the upper portion of the restricted communication path 354 and closes the restricted communication path 354.

Further, a plate 360 for preventing magnetic shortcircuit is interposed between the stopper 343 and the auxiliary valve body 352 to evade direct contact therebetween.

Because the restricted communication path 354 formed in the main valve body 349, even when the main valve body 349 is seated on the valve seat 344, the main communication path 354 is not completely closed unless the auxiliary valve body 352 is seated on the valve seat 354a and brake fluid is allowed to flow into the main communication path 348 via the restricted communication path 354. Accordingly, the SR valve has three operational states of "a fully-open state" in which the main communication path 348 is fully opened, "a fully-closed state" in which both of the main communication path 348 and the restricted communication path 354 are closed and "a half-open state" in which the brake fluid flows in the main communication path 348 via the restricted communication path 354.

Next, an explanation will be given of a relationship among forces applied on respective structural elements in the SR valve 328.

In this eighth embodiment, as shown in FIG. 21, a cross sectional area of a portion where the main valve body 349 closes the main communication path 348 (main seat cross sectional area A1) is set to be larger than a cross sectional area of a portion where the auxiliary valve body 352 closes the restricted communication path 354 (auxiliary seat cross sectional area A2). For example, a ratio of A2/A1 is set to a value of 1/30.

Further, an additional pressure receiving area (A3) of the main valve body 349 which is applied with atmospheric pressure is set to be smaller than the main seat cross sectional area (A1).

Biasing force (Fsp1) of the return spring 357 is set to be larger than biasing force (Fsp2) of the assist spring 356.

Attracting force (Fcoil) acts on the auxiliary valve body 352 by electromagnetic force caused when drive current is supplied to the solenoid 340.

It is to be noted that the main valve body 349 always receives substantially constant biasing force (Fa) by the atmospheric pressure at the lower portion 349c thereof. The biasing force (Fa) by the atmospheric pressure is also applied on the brake fluid. Accordingly, brake hydraulic pressure (Pa) caused by depression of the brake pedal 1 and applied on the auxiliary valve body 352 and the main valve body 349 can be regarded not as pressure difference between upstream pressure and downstream pressure of the SR valve 328 but as absolute pressure.

An explanation will be given of conditions for maintaining the above-described fully-open state, fully-closed state and half-open state by using equations.

[Fully Closed State (Refer to FIG. 21)]

In the case of the fully-closed state, the biasing force (Fsp1) of the return spring 357 and the biasing force (Fsp2) of the assist spring 356 are applied on the main valve body 349 and the auxiliary valve body 352. Therefore, a required condition is as follows.

$$Fsp1 > Fsp2 > 0$$

[Fully-Open State (Refer to FIG. 22)]

Forces to be considered in the case of the fully-open state (however, brake pedal 1 is not depressed), are the biasing force (Fsp1) of the return spring 357, the biasing force (Fsp2) of the assist spring 356 and the attracting force (Fcoil) applied on the auxiliary valve body 352 by the solenoid 340. Conditions required in respect with these forces are as follows.

$$Fsp2 > 0$$

$$Fcoil > Fsp1$$

[Half-Open State (Refer to FIG. 23)]

Forces to be considered in the case of the half-open state (when brake pedal 1 is depressed) are the biasing force (Fsp1) of the return spring 357, the biasing force (Fsp2) of the assist spring 356, the biasing force (A2·Pa) applied on the auxiliary valve body 352 by brake hydraulic pressure (Pa; absolute pressure) caused by depressing the brake pedal 1, the biasing force (A3·Pa) applied on the main valve body 349 by brake hydraulic pressure (Pa) and the attracting force (Fcoil) applied on the auxiliary valve body 352 by the solenoid 340. Conditions required for these forces are as follows.

$$Fcoil > Fsp1 + A2·Pa$$

$$A3·Pa > Fsp2$$

It is to be noted that biasing force generated by brake hydraulic pressure (Pa) acting on the seat area A1 is neglected because the magnitude thereof is very small.

Next, an explanation will be given of the operation of the SR valve accompanied by operation of brake control.

[Normal Brake Operation and Antiskid Control (Fully-Closed State; FIG. 21)]

In the case of a normal brake operation or antiskid control, since the drive current is not supplied to the solenoid 340, as shown in FIG. 21, the return spring 357 biases the auxiliary valve body 352 in the arrow mark A direction to thereby cut off the restricted communication path 354. The return spring 357 also presses the main valve body 349 downwardly via the auxiliary valve body 352 to thereby cut off the main communication path 348. As a result, the fully closed state of the SR valve 328 is maintained.

[Traction Control and Turn Trace Control (Fully-Open State; FIG. 22)]

When traction control or turn trace control (vehicle yaw control) is carried out, the SR valve is turned on (i.e., drive current is supplied to the solenoid 340). In this case, because the brake pedal 1 is not depressed, hydraulic pressure load (absolute pressure Pa by brake hydraulic pressure) is applied neither the main valve body 349 nor the auxiliary valve body 352.

Accordingly, when the attracting force (Fcoil) is applied on the auxiliary valve body 352, as shown in FIG. 22, the attracting force (Fcoil1) overcomes the biasing force of the return spring 357. As a result, the auxiliary valve body 352 is moved in the attracting direction (arrow mark B direction). Along with movement of the auxiliary valve body 352, force for compressing the assist spring 356 is removed. Therefore, the main valve body 349 is moved upwardly (arrow mark B direction) by the biasing force of the assist spring 356. At this time, the main communication path 348 is opened and the fully-opened state is maintained.

In this case, although the restricted communication path 354 is closed, since the main communication path 348 is opened, the fully-open state is invariably ensured.

[Power Assist Brake Control (Half Opened State, FIG. 23)]

When pressure increase control for increasing the wheel cylinder pressure more than the master cylinder pressure to enhance wheel braking force is carried out upon depression of the brake pedal, since the brake pedal 1 is depressed, both the main valve body 349 and the auxiliary valve body 352 are brought into a state where they are applied with the hydraulic pressure load (Pa).

In this eighth embodiment, under such a state, when the solenoid 340 of the SR valve is supplied with drive current, the set load (Fsp1) of the return spring 357, the set load (Fsp2) of the assist spring 356, the auxiliary seat cross sectional area (A2) for determining the biasing force (A2·Pa) applied on the auxiliary valve body 352, the cross sectional area (A3) of the additional pressure receiving portion for determining the biasing force (A3·Pa) applied on the main valve body 349 and the attracting force (Fcoil) applied on the auxiliary valve body 352 are set as described above so that only the auxiliary valve is opened and the main valve stays closed.

Therefore, even in the case in which the brake hydraulic pressure (Pa) is caused by depressing the brake pedal 1, when the drive current is supplied to the solenoid 340, the attracting force (Fcoil) applied on the auxiliary valve body 352 is sufficiently larger than a value produced by adding the set load (Fsp1) of the return spring 357 to the biasing force (A2·Pa) which is caused by the brake hydraulic pressure (Pa) applied on the auxiliary valve body 352 in the allow mark A direction. As a result, only the auxiliary valve body 352 is moved in the arrow mark B direction and the restricted communication path 354 is opened (auxiliary valve is opened).

In this case, the biasing force (A3·Pa) in the arrow mark A direction caused by the brake hydraulic pressure (Pa) applied on the main valve body 349 is sufficiently larger than the set load (Fsp2) of the assist spring 356. Accordingly, the main valve body 349 cannot be moved and stays seated (main valve stays closed).

(Ninth Embodiment)

Next, an explanation will be given of a ninth embodiment in reference to FIG. 24 through FIG. 26, however, an explanation of portions the same as those in the eighth embodiment will be omitted or simplified.

Figure 24:
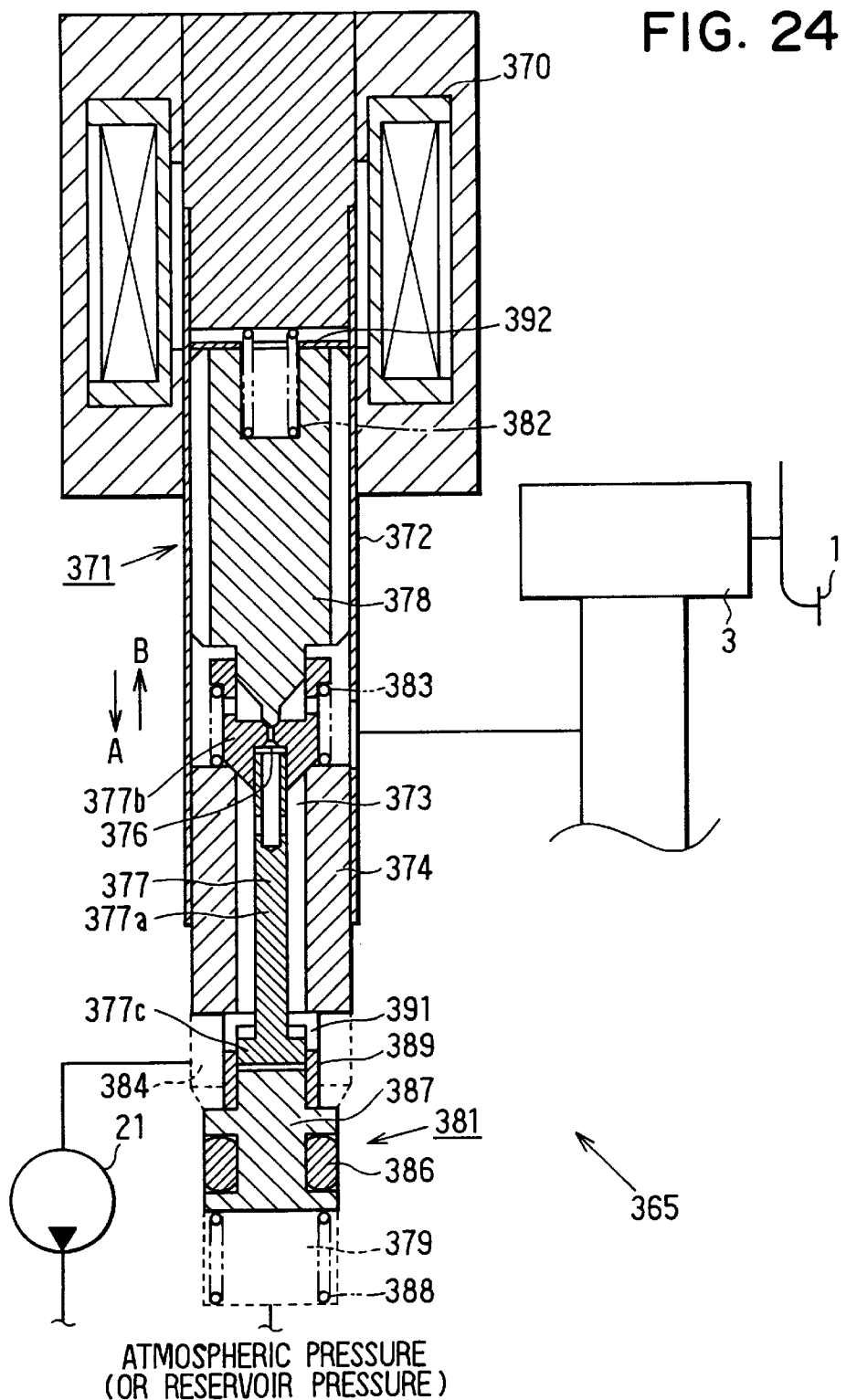
FIG. 24 is a cross-sectional view illustrating a full-closed state of an electromagnetic valve according to a ninth embodiment.
Figure 25:
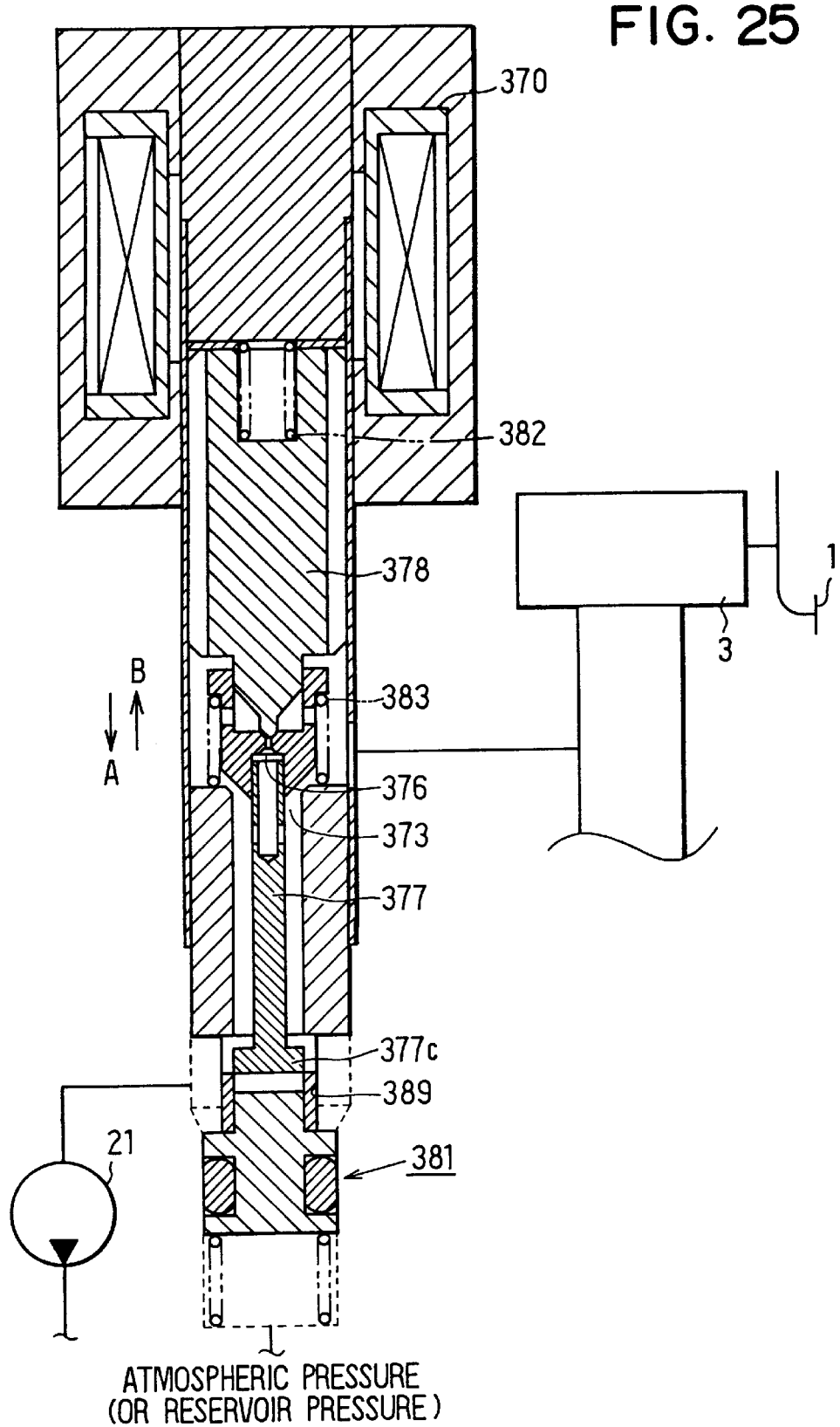
FIG. 25 is a cross-sectional view illustrating a full-open state of the electromagnetic valve according to the ninth embodiment.
Figure 26:
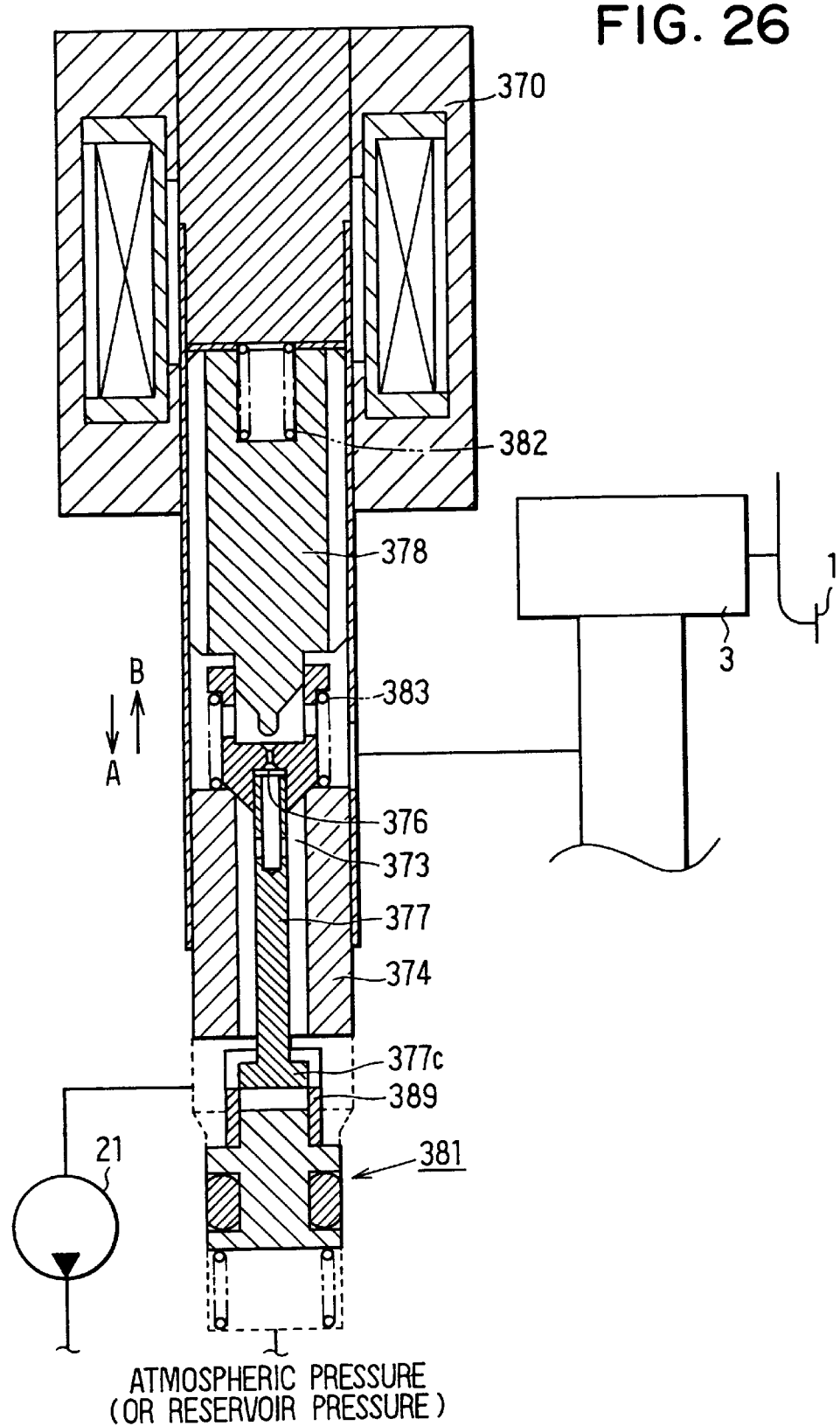
FIG. 26 is a cross-sectional view illustrating a half-open state of the electromagnetic valve according to the ninth embodiment.

FIG. 24 through FIG. 26 are sectional views showing an outline constitution of an electromagnetic valve (SR valve). FIG. 24 shows a fully-closed state of the SR valve 365, FIG. 25 shows a fully-open state thereof and FIG. 26 shows a half-open state thereof.

First, an explanation will be given of the structure of the SR valve 365. According to the SR valve 365 of the ninth embodiment, a constitution on a lower end side of a main valve body 377 is devised to reduce sliding resistance of the main valve body 377.

As shown in FIG. 24, the SR valve 365 is provided with a solenoid 370 and a valve mechanism 371 arranged in the solenoid 370 and a housing (not illustrated).

The valve mechanism 371 is formed by a sleeve 372 constituting an outer periphery portion thereof, a valve seat 374 fitted to the lower end of the sleeve 372 and having a main communication path 373 therein, a main valve body 377 arranged to penetrate the valve seat 374 and having a restricted communication path 376 therein, an auxiliary valve body 378 arranged on an upper side of the main valve body 377 (arrow mark B direction) and an end side operating portion 381 which is slidably inserted in a second opening 379 formed on a lower side of the valve seat 374 (arrow mark A direction).

The auxiliary valve body 378 has a shape similar to that of the eighth embodiment and is biased in a direction of closing the auxiliary valve by a return spring 382.

Meanwhile, the main valve body 377 includes a central portion 377a, an upper portion 377b and a lower portion 377c both having diameters larger than the diameter of the central portion 377a. The main valve body 377 is biased in a direction of opening the main valve (B direction) by an assist spring 383. The restricted communication path 376 is formed in the upper portion 377b along an axis center of the main valve body 377. The lower portion 377c is not sealed and is engaged with the end side operating portion 381 in a flow path from the main communication path 373 to a third opening 384.

The end side operating portion 381 is formed by a movable portion 387 sealed (in oil tight) by a seal portion 386 and slidable in the up and down direction in the drawing, a second assist spring 388 for biasing the movable portion 387 in the upward direction (B direction) and an engaging portion 389 extending upwardly from the movable portion 387 for engaging with the lower portion 377c of the main valve body 377.

The engaging portion 389 is formed in a shape of an inverse cup to cover the lower portion 377c of the main valve body 377 from above. Communication holes 391 for communicating inside and outside of the engaging portion 389 are formed in the engaging portion 389. The engaging portion 389 is fixedly coupled with the upper end of the movable portion 387.

The atmospheric pressure is applied on the lower face of the end side operating portion 381 when the second opening 379 is opened to the atmosphere, and reservoir pressure is applied thereon when it is connected to the reservoir 22. Hereinafter, a description will be given of the case in which the atmospheric pressure is applied on the lower face of the end side operating portion 381.

Next, an explanation will be given of the operation in the SR valve 365 accompanied by operation of brake control.

[Normal Brake Operation and Antiskid Control (Fully Closed State; FIG. 24)]

In the case of a normal brake operation or antiskid control, as shown in FIG. 24, since the drive current is not supplied to the solenoid 370, the auxiliary valve body 378 is biased to move in the downward direction (arrow mark A direction) by the return spring 382. As a result, the restricted communication path 376 is closed. Along with movement of the auxiliary valve body 378, the assist spring 383 is brought into a compressed state and the main valve body 377 is also similarly biased downwardly. As a result, the main communication path 373 is also closed. Thereby, the fully-closed state is maintained.

At this occasion, the end side operating portion 381 is biased upwardly by the second assist spring 388. Therefore, the engaging portion 389 is brought into a state where it does not engage with the lower portion 377c of the main valve body 377. Further, although the atmospheric pressure is applied on the lower face of the end side operating portion 381, the atmospheric pressure is also applied on the brake fluid. Therefore, at the end side operating portion 381, a balance is maintained in respect with the atmospheric pressure (same as follows).

In the fully-closed state, the conduit KD from the master cylinder 3 to the pump 21 is cut off. Accordingly, the normal brake operation or pressure decreasing operation or the like in antiskid control is carried out through the other conduits KA1 and KA2.

[Traction Control and Turn Trace Control (Fully-Open State; FIG. 25)]

When traction control or turn trace control (vehicle yaw control) is carried out, the SR valve 365 is supplied with the drive current. At this occasion, since the brake pedal 1 is not depressed, both the main valve body 377 and the auxiliary valve body 378 are brought into a state where they are not applied with hydraulic pressure load (absolute pressure Pa by brake hydraulic pressure).

Accordingly, when the attracting force (Fcoil) is applied on the auxiliary valve body 378 by the solenoid 370, as shown in FIG. 25, it overcomes the biasing force of the return spring 382 so that the auxiliary valve body 378 is moved in the arrow mark B direction. Thereby, the force for compressing the assist spring 383 is removed and accordingly, the main valve body 377 is also moved in the valve opening direction (arrow mark B direction) by the biasing force of the assist spring 383. As a result, the main communication path 373 is opened and the fully-open state is brought about.

At this occasion, in the end side operating portion 381, the second assist spring 388 biases the movable portion 387 to move in the upward direction (B direction). That is, the engaging portion 389 is brought into a state where it does not engage with the lower portion 377c of the main valve body 377. Therefore, under this state, the main valve body 377 can smoothly be moved in the upward direction only by the weak biasing force of the assist spring 383 without receiving the sliding resistance as in the eighth embodiment mentioned above.

[Power Assist Brake Control (Half-Open state, FIG. 26)]

When pressure increase control for increasing wheel cylinder pressure to enhance wheel braking force is carried out upon depression of the brake pedal 1, since the brake pedal 1 is depressed, both the main valve body 377 and the auxiliary valve body 378 are brought into a state where they are applied with hydraulic pressure load (absolute pressure Pa).

At this occasion, when the solenoid 370 is supplied with the drive current, the attracting force (Fcoil) applied on the auxiliary valve body 378 becomes larger than a value produced by adding the set load (Fsp1) of the return spring 382 to the biasing force (A2·Pa) which is caused in the arrow mark A direction by the brake hydraulic pressure (Pa) and is applied on the auxiliary valve body 378. Therefore, only the auxiliary valve body 378 is moved in the arrow mark B direction, whereby the restricted communication path 376 is opened (auxiliary valve is opened).

In this case, at the end side operating portion 381, the biasing force (A3·Pa, where notation A3 designates pressure receiving area of an upper face of the end side operating portion 381) applied thereon in the downward direction (arrow mark A direction) by the brake hydraulic pressure (Pa), overcomes the set load (Fsp2) of the assist spring 383. Therefore, the engaging portion 389 is moved in the A direction to engage with the lower portion 377c of the main valve body 377. As a result, the main valve body 377 stays seated on the valve seat 374.

In this ninth embodiment, not only effects similar to those of the eighth embodiment is achieved, but also there is achieved an advantage in which the sliding resistance of the main valve body 377 is almost nullified by the end side operating portion 381. Accordingly, the assist spring 383, other springs and so on can be downsized.

(Tenth Embodiment)

Next, an explanation will be given of a tenth embodiment in reference to FIG. 27. However, an explanation of portions similar to those in the ninth embodiment will be omitted or simplified.

Figure 27:
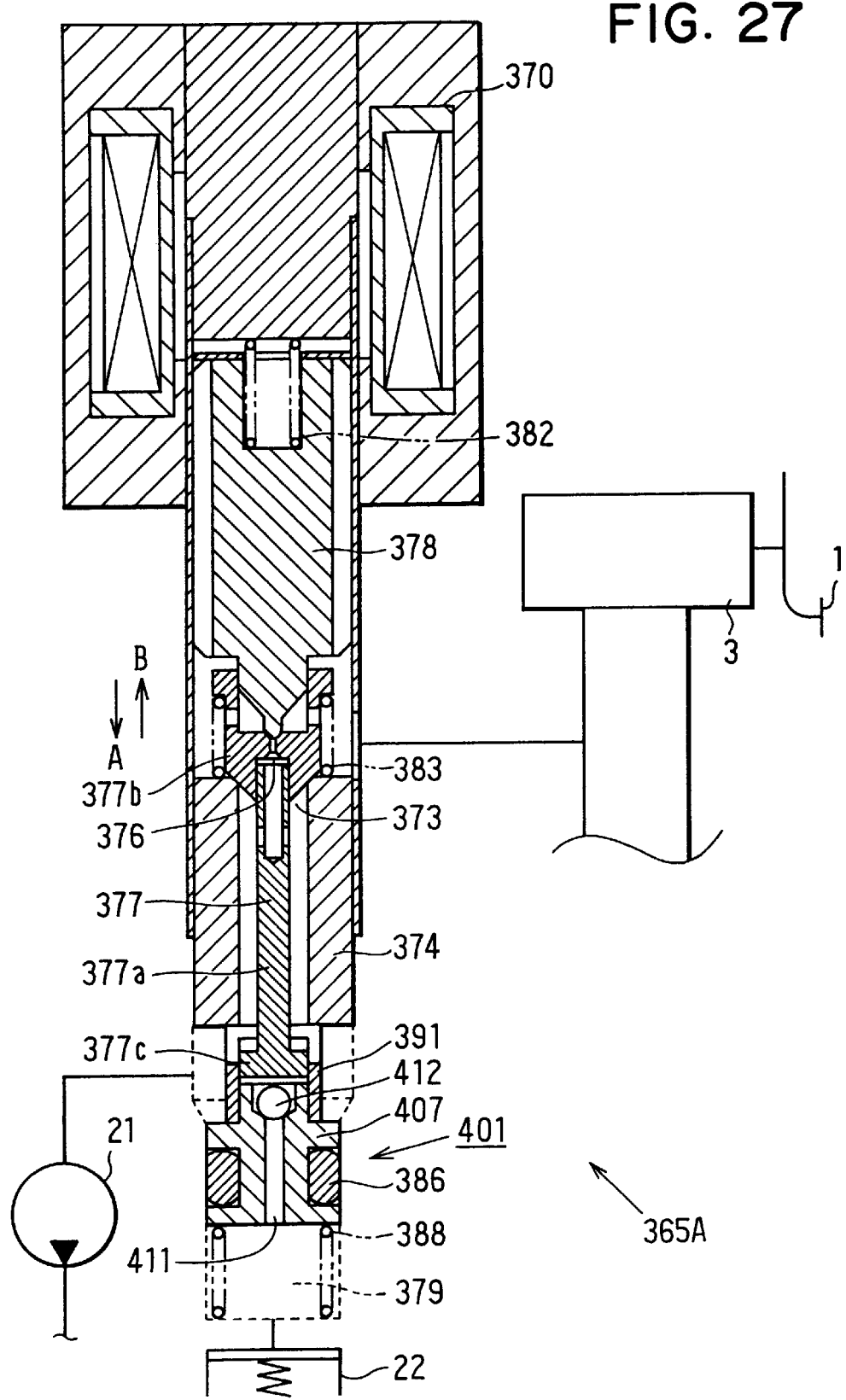
FIG. 27 is a cross-sectional view illustrating a full-closed state of an electromagnetic valve according to a tenth embodiment.

FIG. 27 is a sectional view showing an outline constitution of an electromagnetic valve (SR valve) in which a fully-closed state of the SR valve is illustrated.

First, an explanation will be given of the structure of the SR valve 365A.

According to the SR valve 365A of the tenth embodiment, a second opening 379 is connected to a reservoir 22 and a check valve is installed at an end side operating portion 401 to stabilize the operation of the end side operating portion 401.

An end side operating portion 401 is formed by a movable portion 407 which is sealed (in oil tight) by the seal portion 386 and is slidable in the up and down direction in the drawing, the second assist spring 388 for biasing the movable portion 407 in the upward direction (B direction), the engaging portion 391 extending upward from the movable portion 407 for engaging with the lower portion 377c of the main valve body 377, an end side communication path 411 penetrating the movable portion 407 and communicating the inside of the SR valve 365A with the reservoir 22 and a ball-like valve body 412 arranged between the lower portion 377c of the main valve body 377 and the movable portion 407 for alternatively opening and closing the end side communication path 411. That is, a check valve is formed by the end side communication path 411 and the ball-like valve body 412.

In this tenth embodiment, the second opening 379 is connected to the reservoir 22. Accordingly, the reservoir pressure is applied on the lower face of the end side operating portion 401.

Next, an explanation will be given of operation at an inside of the SR valve 365A accompanied by operation of brake control.

In this tenth embodiment, operation in the fully closed state which is attained in the normal brake operation or antiskid control, operation in the fully-open state (however, brake pedal is not depressed) which is attained in traction control or turn trace control (vehicle yaw control) and operation in the half-open state (however, brake pedal is depressed) which is attained in power assist brake control are the same as those in the ninth embodiment. Therefore, an explanation will given of operation of the check valve which is a characteristic portion of the tenth embodiment.

The check valve permits a flow from the reservoir 22 to the intake side of the pump 21 regardless of whether the brake pedal 1 is depressed or not depressed or regardless of the fully-closed state, the half-open state or the fully-open state. Further, in respect of a flow from the inner side of the SR valve 365A (that is, from a side of master cylinder 3) to the reservoir 22, the ball-like valve body 412 is closed by receiving the brake hydraulic pressure, whereby such a brake fluid flow is prohibited.

Therefore, various kinds of brake control can be preferably carried out while an intake operation in which the pump 21 takes in brake fluid from the reservoir 22 during antiskid control and a prevention operation in which brake fluid is prevented from flowing from the inner side of the SR valve 365A to the reservoir 22 during PAB control or the like are effectively carried out.

That is, according to the tenth embodiment, not only the effects of the ninth embodiment can be achieved but also there is achieved an advantage in which because the check valve is installed in the end side operating portion 401, functions necessary in view of a hydraulic pressure circuit can be realized with the electromagnetic valve having a simple structure and thereby the brake control system can be downsized as a whole.

(Eleventh Embodiment)

Next, an explanation will be given of an eleventh embodiment in reference to FIG. 28. However, an explanation of portions similar to those in the tenth embodiment will be omitted or simplified.

Figure 28:
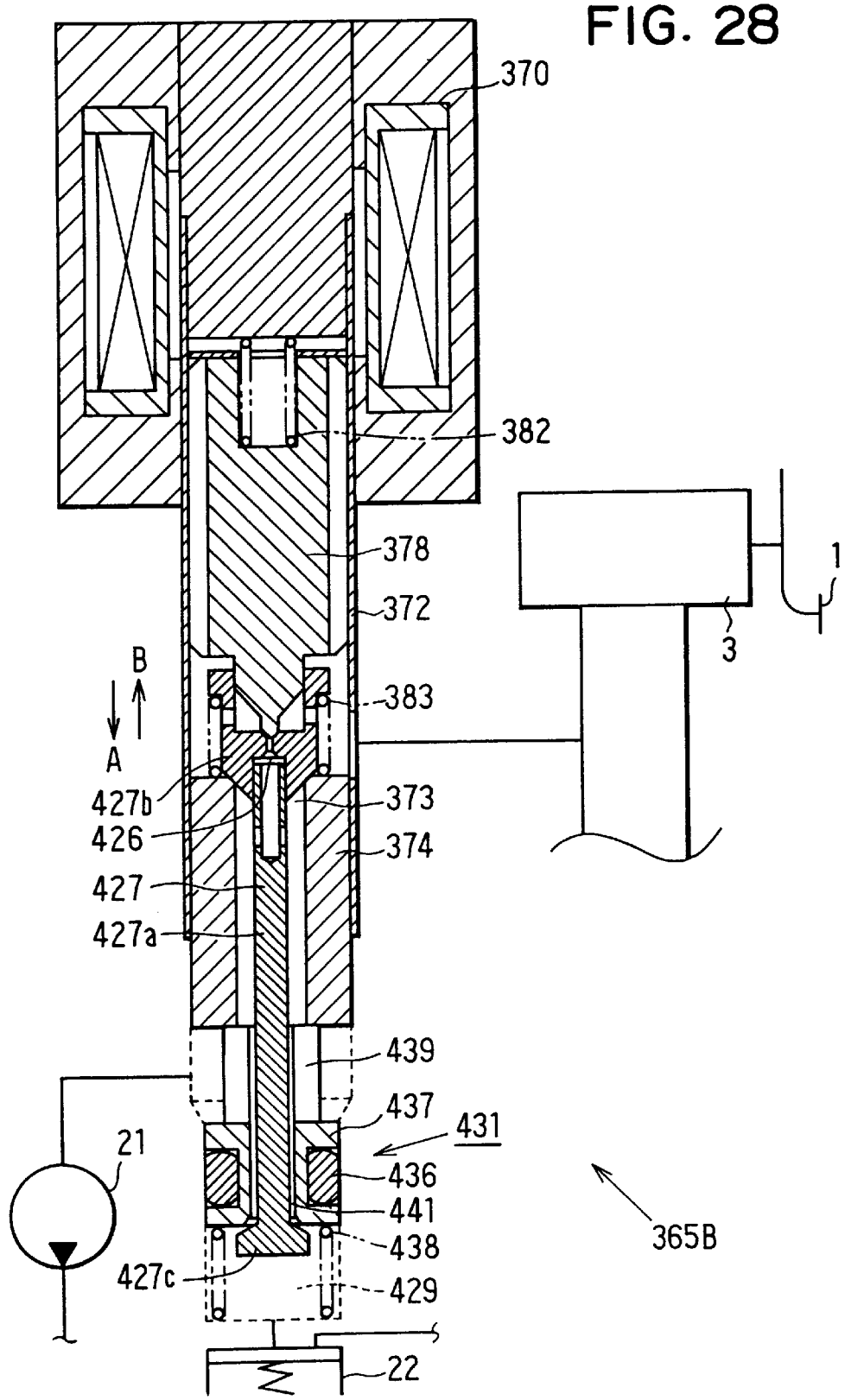
FIG. 28 is a cross-sectional view illustrating a full-closed state of an electromagnetic valve according to an eleventh embodiment.

FIG. 28 is a sectional view showing an outline constitution of an electromagnetic valve (SR valve) in which a fully-closed state of the SR valve is illustrated.

First, an explanation will be given of the structure of the SR valve 365B.

According to the SR valve 365B of the eleventh embodiment, a second opening 429 is connected to the reservoir 22 and a check valve is installed at an end side operating portion 431 to stabilize operation of the end side operating portion 431.

As shown in FIG. 28, the auxiliary valve body 378 has a shape similar to that in the tenth embodiment and is biased in the downward direction which is a direction of closing the auxiliary valve by the return spring 382.

Meanwhile, a main valve body 427 has a shape longer than that in the tenth embodiment. That is, the main valve body 427 is formed by a central portion 427a, an upper portion 427b and a lower portion 427c both having diameters larger than that of the central portion 427a. The main valve body 427 is biased in the upward direction which is a direction of opening the main valve by the assist spring 383.

An end side operating portion 431 is formed by a movable portion 437 which is sealed (in oil tight) by a seal portion 436 and is slidable in the up and down direction in the drawing, a second assist spring 438 for biasing the movable portion 437 in the upward direction (B direction), a restraining portion 439 extending upwardly from the movable portion 437 for restraining movement of the movable portion 437 in the upward direction more than a predetermined distance and an end side communication path 441 penetrating both the restraining portion 439 and the movable portion 437 for communicating the inside of the SR valve 365B with the reservoir 22.

The main valve body 427 is extended so that the lower portion 427c thereof projects from the end side communication path 441. Therefore, the lower portion 427c of the main valve body 427 alternatively opens and closes the end side communication path 441. That is, a check valve is formed by the lower portion 427c of the main valve body 427 and the end side communication path 441.

In this eleventh embodiment, a second opening portion 429 is connected to the reservoir 22. Accordingly, the reservoir pressure is applied on the lower face of the end side operating portion 431.

Next, an explanation will be given of the operation in the SR valve 365B accompanied by operation of brake control.

In this eleventh embodiment, operation in the fully-closed state which is attained in the normal brake operation or antiskid control, operation in the fully-open state (however, brake pedal is not depressed) which is attained in traction control and turn trace control (vehicle yaw control) and operation in the half-open state (however, brake pedal is depressed) which is attained in power assist control are the same as those in the tenth embodiment. Accordingly, an explanation will be given of operation of the check valve which is a characteristic portion of the eleventh embodiment.

The check valve opens the end side communication path 441 communicating the reservoir 22 with the intake side of the pump 21 when the drive current is not supplied to the solenoid 370 and the fully closed state is maintained.

When the solenoid 370 is supplied with the drive current, the brake pedal 1 is depressed and the half-open state is brought about, the end side operating portion 431 is moved in the downward direction (A direction) by receiving the brake hydraulic pressure. At this time, the check valve is closed and the communication between the reservoir 22 and the intake side of the pump 21 is cut off.

In the fully-open state in which the brake pedal 1 is not depressed and the drive current is supplied to the solenoid 370, the main valve body 427 is moved in the upward direction (B direction) by the assist spring 383. Therefore, the lower portion 427c of the main valve body 427 is brought into contact with the movable portion 437. The communication between the reservoir 22 and the intake side of the pump 21 is cut off.

Therefore, various kinds of brake control can be preferably carried out while an intake operation in which the pump 21 takes in brake fluid from the reservoir 22 during antiskid control and a prevention operation in which brake fluid is prevented from flowing from the inner side of the SR valve 365A to the reservoir 22 during PAB control or the like are effectively carried out.

That is, according to the eleventh embodiment, not only the effects of the ninth embodiment is achieved but also there is achieved an advantage in which because the check valve is installed at the end side operating portion 431, functions necessary in view of a hydraulic pressure circuit can be realized with the electromagnetic valve having a simple constitution, whereby a brake control system can be downsized as a whole. Further, there is achieved also an effect in which the structure of the check valve and its surrounding is more simple than that in the tenth embodiment.

(Twelfth Embodiment)

Next, an explanation will be given of a twelfth embodiment in reference to FIG. 29. However, an explanation of portions similar to those in the tenth embodiment will be omitted or simplified.

Figure 29:
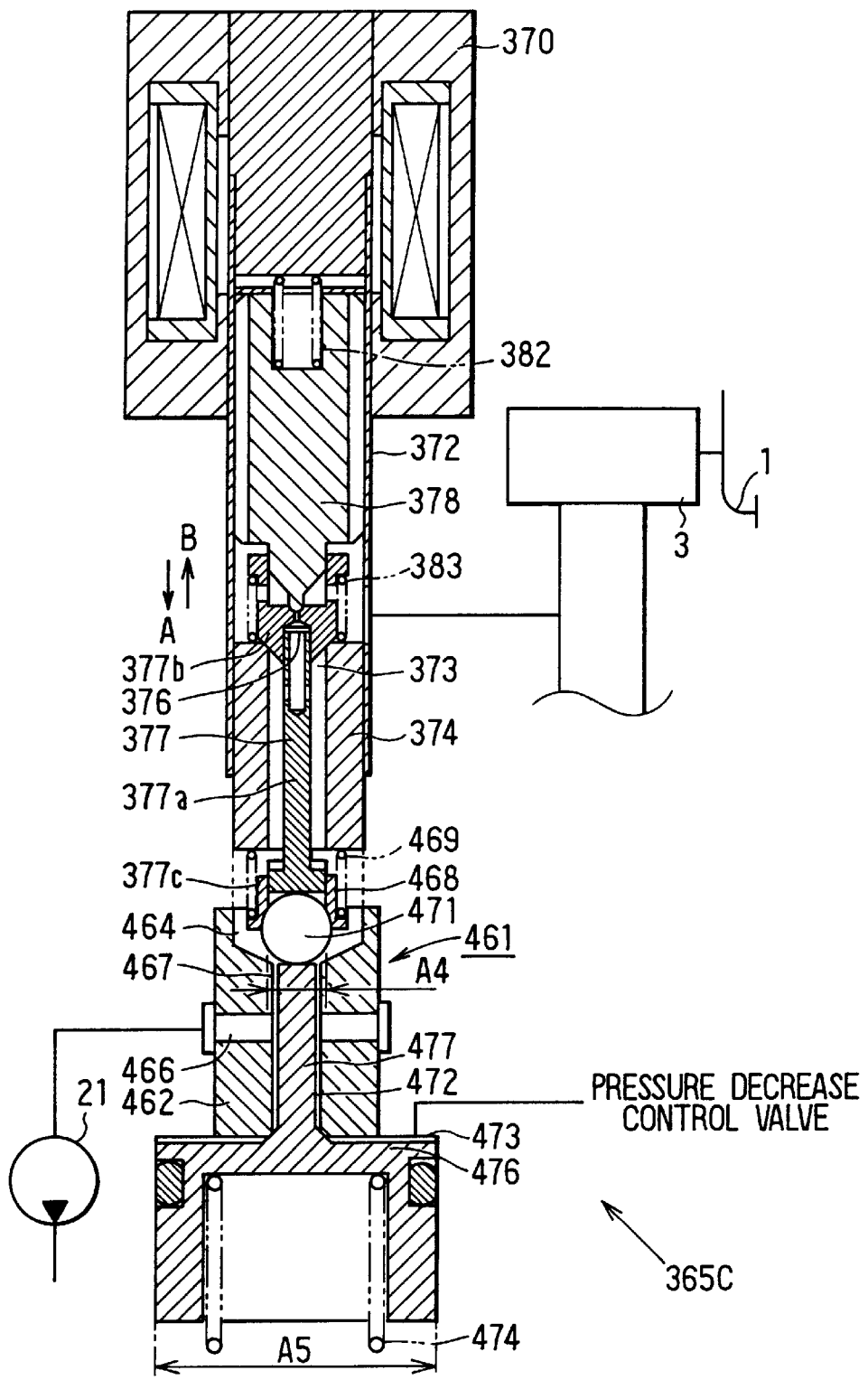
FIG. 29 is a cross-sectional view illustrating a full-closed state of an electromagnetic valve according to a twelfth embodiment.

FIG. 29 is a sectional view showing an outline constitution of an electromagnetic valve (SR valve) which shows a fully-closed state of the SR valve.

First, an explanation will be given of the structure of the SR valve 365C.

The SR valve 365C according to the twelfth embodiment is provided with a pressure regulating valve for restraining pressure on the intake side of the pump 21 within several barometric pressures.

As shown in FIG. 29, a pressure regulating valve 461 alternatively opens and closes a first communication path 467 communicating a first space 464 at an inside of the SR valve 365C with a third opening 466 connected to the intake side of the pump 21 to adjust pressure on the intake side of the pump 21.

The pressure regulating valve 461 is formed by an engaging portion 468 in a shape of a cup for engaging the lower portion 377c of the valve main body 377, a third assist spring 469 for biasing the engaging portion 468 in the downward direction (A direction), a ball-like valve body 471 which is supported by the engaging portion 468 and a base 462 in which the first communication path 467 is formed. A second communication path 472 having a diameter the same as a diameter of the first communication path 467 is branched from the first communication path 467. A third communication path 473 having a diameter larger than the diameter of the second communication path 472 is connected to the second communication path 472. The third communication path 473 is connected to a pressure decreasing control valve. Further, a piston 476 biased in the upward direction by a fourth assist spring 474 is arranged in the third communication path 473. A rod 477 erected on the upper face of the piston 476 is brought into contact with the ball-like valve body 471 by passing through the first and the second communication paths 467 and 472.

The piston 476 functions as a reservoir for temporarily storing brake fluid when pressure of the wheel cylinder is decreased during antiskid control.

Next, an explanation will be given of the operation at an inside of the SR valve 365C accompanied by operation of brake control.

In this twelfth embodiment, operation in the fully-closed state which is attained in the normal brake operation or antiskid control, operation in the fully-open state (however, brake pedal is not depressed) which is attained in traction control or turn trace control (vehicle yaw control) and operation in the half-open state (however, brake pedal is depressed) which is attained in power assist brake control are the same as those in the tenth embodiment. Accordingly, an explanation will be given of operation of the pressure regulating valve 461 which is a characteristic portion of the twelfth embodiment.

In the pressure regulating valve 461, biasing force of the third assist spring 469, biasing force of the fourth assist spring 474, a seat area A4 on which the ball-like valve body 471 is seated and a pressure receiving area A5 of the piston 476 are set such that the pressure regulating valve 461 is alternatively opened and closed in response to the biasing forces of the respective springs 469 and 474 and pressure difference between pressure in the first space 464 and pressure on the intake side of the pump 21.

When there is no pressure difference between pressure in the first space 464 and pressure on the intake side of the pump 21 (that is, when no antiskid control is performed and brake fluid is not stored in the reservoir), the piston 476 is biased in the allow mark B direction by the fourth assist spring 474. Therefore, the rod 477 pushes up the ball-like valve body 471 against the biasing force of the third assist spring 469. Thereby, the first communication path 467 is opened.

When the first communication path 467 is opened, communication between the second communication path 472 and the third communication path 473 is cut off by the piston 476 making contact with the base 462. The intake side of the pump 21 and the side of the pressure reduction control valve are brought into a cut-off state.

When the pressure on the intake side of the pump 21 is equal to or higher than a predetermined value, the ball-like valve body 471 is moved in the downward direction by the brake fluid pressure applied on the upper face of the piston 476 and the biasing force of the third assist spring 469. That is, the rod 477 and the piston 476 are moved in the downward direction against the biasing force of the fourth assist spring 474, whereby the first communication path 467 is closed.

When the first communication path 467 is closed, the intake side of the pump 21 and the side of the pressure reduction control valve are brought into a flow-through state via the second communication path 472 and the third communication path 473.

That is, when pressure on the intake side of the pump 21 is equal to or larger than the predetermined value, the pressure regulating valve 461 is closed. Accordingly, the pressure on the intake side of the pump 21 can be adjusted within a predetermined value (for example, several barometric pressures). By this pressure adjustment, there is achieved an advantage of capable of protecting, for example, a rotary seal portion or the like which is weak at high pressure on the intake side of the pump 21.

(Thirteenth Embodiment)

Figure 30:
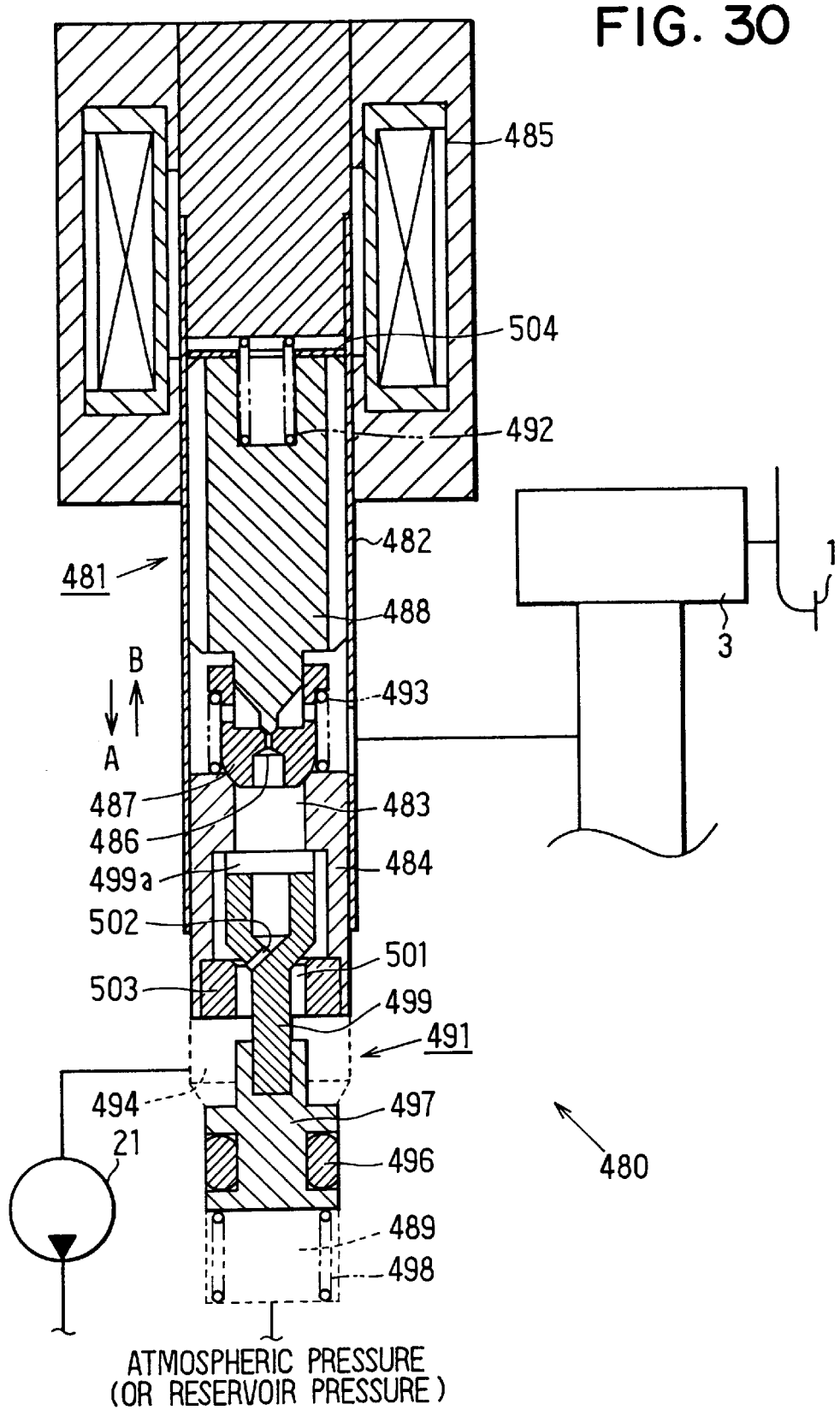
FIG. 30 is a cross-sectional view illustrating a full-closed state of an electromagnetic valve according to a thirteenth embodiment.

Next, an explanation will be given of a thirteenth embodiment in reference to FIG. 30. However, an explanation of portions similar to those in the eighth embodiment will be omitted or simplified. FIG. 30 is a sectional view showing an outline constitution of an electromagnetic valve (SR valve) which shows a fully-closed state of the SR valve.

First, an explanation will be given of the structure of the SR valve 480.

According to the SR valve 480 of the thirteenth embodiment, a constitution of a main valve body on a downstream side therein is devised to reduce sliding resistance of the main valve body in the eighth embodiment. Specifically, two of main valves are arranged in series.

As shown in FIG. 30, the SR valve 480 is formed by a solenoid 485 and a valve mechanism 481 arranged in the solenoid 485 and a housing (not illustrated).

The valve mechanism 481 is formed by a sleeve 482 constituting an outer periphery thereof, a valve seat 484 fixedly fitted to the lower end of the sleeve 482 and having a main communication path 483 and a second main communication path 501 therein, a main valve body 487 arranged on an upper side of the valve seat 484 (arrow mark B direction) and having a restricted communication path 486, an auxiliary valve body 488 arranged on an upper side of the main valve body 487 (arrow mark B direction) and an end side operating portion 491 slidably fitted in the up and down direction in a second opening portion 489 on a lower side of the valve seat 484 (arrow mark A direction).

The auxiliary valve body 488 has a shape similar to that in the eighth embodiment and is biased in the downward direction which is a direction of closing the auxiliary valve by a return spring 492.

Meanwhile, the main valve body 487 is biased in the upward direction which is a direction of opening the main valve by an assist spring 493 one end of which is supported by the valve seat 484. The restricted communication path 486 is formed at an axis center of the main valve body 487.

The end side operating portion 491 is formed by a movable portion 497 which is sealed (in oil tight) by a seal portion 496 and is slidable in the up and down direction in the drawing, a second assist spring 498 for biasing the movable portion 497 in the upward direction and a valve portion 499 extending upward from the movable portion 497 and is seated on a second valve seat 503 coupled to the valve seat 494 when the movable portion 497 moves downward (in the arrow mark A direction. The valve portion 499 and the second valve seat 503 play a role of a second main valve.

The valve portion 499 is formed substantially in a shape of a circular column in which a large diameter portion is provided in a space between the valve seat 484 and the second vale seat 503 and the diameter of the valve portion on the side of the movable portion 497 is reduced via a tapered portion. A second restricted communication path 502 for communicating the main communication path 483 with the intake side of the pump 21 is formed in the valve portion 499. Further, a communication groove portion 499a is formed on an upper face of the valve portion 499. It is to be noted that the valve portion 499 is coupled to the upper end of the movable portion 497.

The atmospheric pressure is applied on the lower face of the end side operating portion 491 when the second opening 489 is exposed to the atmosphere, and the reservoir pressure is applied thereon when it is connected to the reservoir 22 (refer to FIG. 1). However, a description will be given of the case in which the atmospheric pressure is applied on the lower face of the end side operating portion 491, hereinafter.

Next, an explanation will be given of the operation at an inside of the SR valve 480 accompanied by operation of brake control.

[Normal Brake Operation and Antiskid Control (Fully Closed State: FIG. 30)]

In the case of the normal brake operation or antiskid control, as shown in FIG. 30, since the drive current is not supplied to the solenoid 485, the auxiliary valve body 488 is biased to move in the downward direction (arrow mark A direction) by the return spring 492. Therefore, the restricted communication path 486 is closed.

Along with movement of the auxiliary valve body 488, the assist spring 493 is brought into a compressed state. That is, the main valve body 487 is also moved downwardly and closes the main communication path 483. Thereby, the fully-closed state is maintained.

At this occasion, the end side operating portion 491 is biased in the upward direction (B direction) by the second assist spring 498. Therefore, the valve portion 499 is brought into a state where it is not seated on the second valve seat 503.

[Traction Control and Turn Trace Control (Fully-Open State)]

When traction control or turn trace control (vehicle yaw control) is carried out, the drive current is supplied to the solenoid 485. At this occasion, since the brake pedal 1 is not depressed, both the main valve body 487 and the auxiliary valve body 488 are brought into a state in which they are not applied with biasing force by hydraulic pressure load (brake hydraulic pressure).

The draw force (Fcoil) applied on the auxiliary valve body 488 by the solenoid 485 overcomes the biasing force of the return spring 492 so that the auxiliary valve body 488 is moved in the arrow mark B direction. Thereby, force for compressing the assist spring 493 is removed. The main valve body 487 is also moved in the valve opening direction (arrow mark B direction) by the biasing force of the assist spring 493, whereby the main communication path 483 is opened and the fully-open state is brought about.

In this case, the end side operating portion 491 is biased in the upward direction by the second assist spring 498 since the hydraulic pressure load is not applied. Therefore, the valve portion 499 is not seated on the second seat valve 503 and the second main communication path 501 is maintained to an open state. That is, the fully-open state in which both the main communication path 483 and the second main communication path 501 are opened is achieved. Therefore, in this state, the main valve body 487 can be smoothly moved in the upward direction only by weak biasing force of the assist spring 493 without receiving sliding resistance as in the eighth embodiment.

Further, in the fully-open state, the conduit KD from the master cylinder 3 to the pump 21 is maximally opened. Accordingly, a sufficient flow rate of brake fluid is ensured. Pressure increasing operation of the wheel cylinder pressure can be carried out swiftly and sufficiently by driving the pump 21.

[Power Assist Brake Control (Half-Open State)]

When pressure increase control for increasing the wheel cylinder pressure to enhance wheel braking force is carried out upon depression of the brake pedal 1, since the brake pedal 1 is depressed, the hydraulic pressure load is applied on both the main valve body 487 and the auxiliary valve body 488.

At this occasion, when the drive current is supplied to the solenoid 485, the attracting force (Fcoil) applied on the auxiliary valve body 488 becomes larger than a value produced by adding set load (Fsp1) of the return spring 492 and biasing force (A2·Pa) caused in respect to the auxiliary valve body 488 in the arrow mark A direction by brake hydraulic pressure (Pa). As a result, only the auxiliary valve body 488 is moved in the arrow mark B direction. The restricted communication path 486 is opened (auxiliary valve is opened).

A large or small relation between the biasing force (A1·ΔPa) caused in respect to the main valve body 487 in the arrow mark A direction by pressure difference (ΔPa) depending on a flow rate of the pump 21 and the biasing force of the assist spring 493, is not stabilized by a variation in the flow rate of the pump 21. Therefore, the main valve body 487 is seated on or separated from the valve seat 484, so that the main communication path 483 (accordingly, main valve) cannot be stably closed by the main valve body 487.

However, the end side operating portion 491 is moved in the A direction by biasing force (A3·Pa, where notation A3 designates a pressure receiving area of an upper face of the end side operating portion 491) caused in the arrow mark A direction by the brake pressure (Pa) which overcomes the set load (Fsp2) of the assist spring 493. As a result, the valve portion 499 is seated on the second seat valve 503. The second main communication path 501 is closed by the valve portion 499.

At this time, the half-open state is realized by the second reduced communication path 502 formed in the valve portion 499 regardless of opening or closing states of the main valve and the auxiliary valve.

According to this thirteenth embodiment, not only effects similar to those in the eighth embodiment are achieved but also there is achieved an advantage in which since almost no sliding resistance of the main valve body 487 is present, the assist spring 493 can be downsized and accordingly, other springs and the like can be also downsized.

Further, in the thirteenth embodiment, since a movable member (auxiliary valve body 488 and so on) of the electromagnetic valve and the end side operating portion 491 are separated from each other, there is also achieved an advantage in which flexibility in arrangement of structural parts is promoted.

Figure 31:
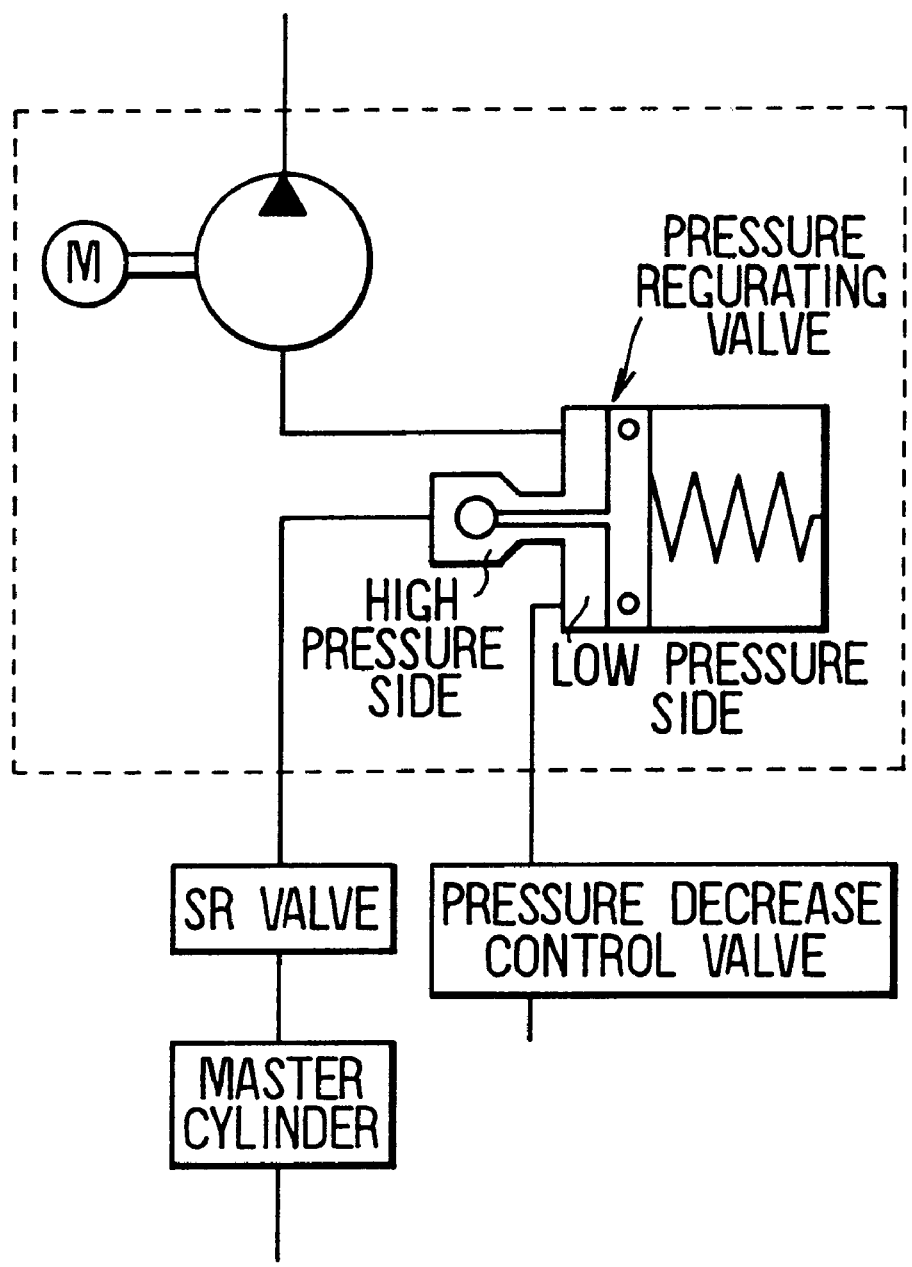
FIG. 31 is a view illustrating a modification of a pressure regulating valve.

Although according to the twelfth embodiment, the pressure regulating valve is provided integrally with the SR valve on the lower side of the SR valve, for example, as shown in FIG. 31, a pressure regulating valve having a similar function may be installed in a brake conduit separately from the SR valve.

(Fourteenth Embodiment)

Next, a detailed explanation will be given of constitution and operation of an SR valve according to a fourteenth embodiment in reference to FIG. 32 through FIG. 38.

First, an explanation will be given of the structure of the SR valve 600.

Figure 32:
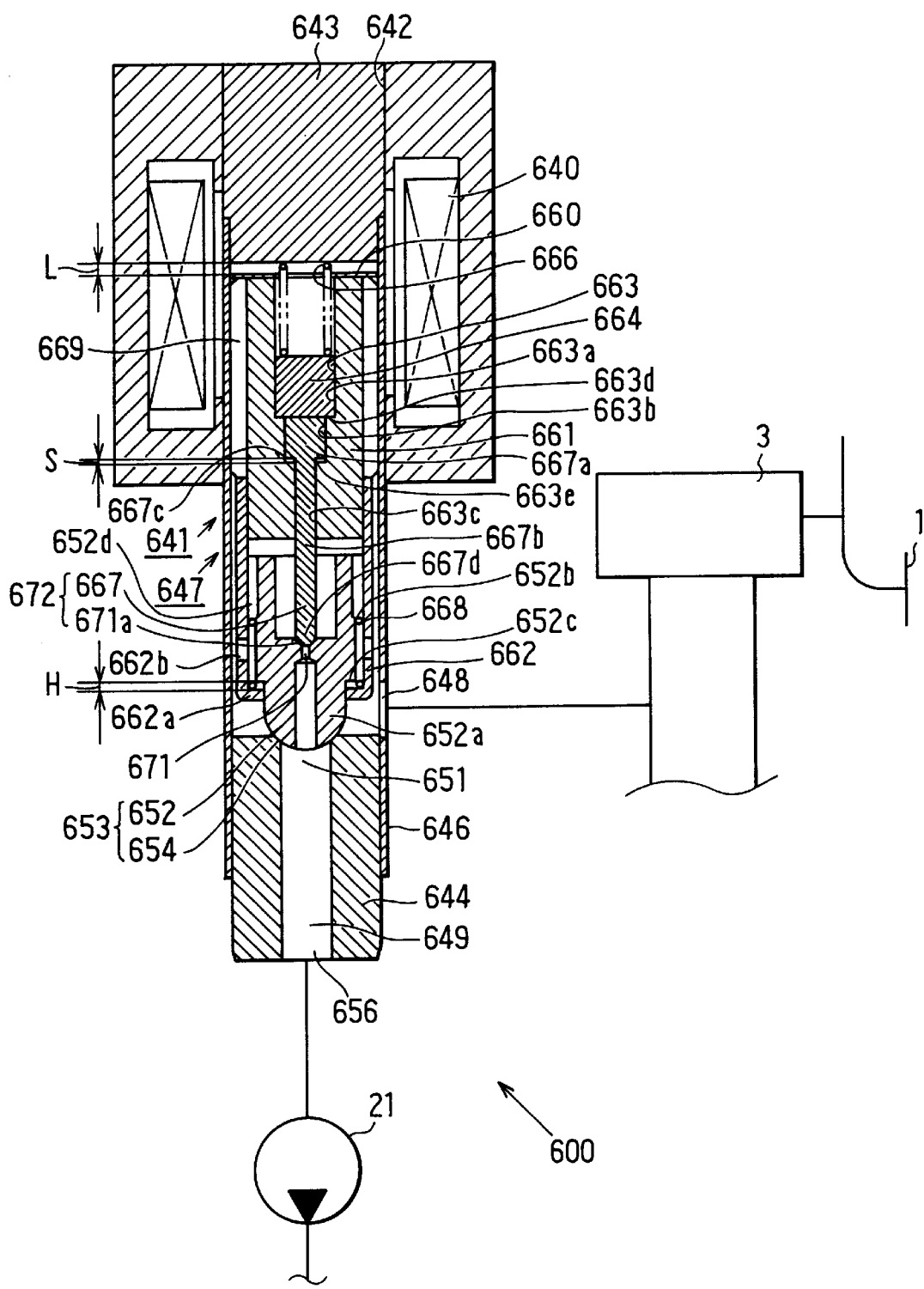
FIG. 32 is a cross-sectional view illustrating a full-closed state of an electromagnetic valve according to a fourteenth embodiment.

As shown in FIG. 32, the SR valve 600 is formed by a solenoid 640 and a valve mechanism 641 arranged in the solenoid 640 and a housing (not illustrated).

A hollow portion 642 in a cylindrical shape is formed at a center of the solenoid 640. An upper end of the hollow portion 642 is closed by a stopper 643.

The valve mechanism 641 is formed by a valve seat 644 in a cylindrical shape, a sleeve 646 extending from the valve seat 644 and constituting an outer periphery of the valve mechanism 641 and a valve composite body 647 arranged in the sleeve 646 and movable in the up and down direction in the drawing.

The sleeve 646 is made of a nonmagnetic body. The lower end of the sleeve 646 is fixedly fitted to the upper portion of the valve seat 644 and the upper end of the sleeve 646 is fixedly fitted to the stopper 643. A first opening 648 communicating with the side of the master cylinder 3 is formed in the sleeve 646.

A main communication path 649 is formed in the valve seat 644 along the axial direction of the SR valve 600. A valve main body 652 alternatively opens and closes a second opening 651 on the upper end side (hereinafter, "upper" designates upper side of respective drawings) of the main communication path 649. A main valve 653 is formed by the main valve body 652 and an upper end portion (main valve seat) 654 of the valve seat 644 on which the main valve body 652 is seated.

On the lower end side (hereinafter, "lower" designates lower side of respective drawings) of the valve seat 644, a third opening 656 for communicating the main communication path 649 to the intake side of the pump 21 is formed.

Thereby, the brake fluid which is supplied from the side of the master cylinder 3, that is, which flows from the first opening 648 of the sleeve 646 via the main communication path 649 (and a restricted communication path 671) is supplied to the intake side of the pump 21. The pump 21 discharges pressurized brake fluid to increase pressure of the wheel cylinders 5 and 6.

The valve composite body 647 is formed by a plunger 661 made of a magnetic body, an engaging member 662 integrally fixed with the plunger 661, a movable member 664 arranged in a through hole 663 penetrating the axis center of the plunger 661, a return spring 666 for biasing the movable member 664 in the downward direction of the drawing, an auxiliary valve body 667 arranged at the axis center of the plunger 661 to penetrating the plunger 661, the main valve body 652 for alternatively opening and closing the main communication path 649, an assist spring 668 for biasing the main valve body 652 in the upward direction. Members other than the plunger 661 are made of nonmagnetic bodies.

The plunger 661, the engaging member 662, the movable member 664, the auxiliary valve body 667 and the main valve body 652 are movable in the up and down direction in the drawing. The return spring 666 and the assist spring 668 can expand and contract in the up and down direction of the drawing.

The plunger 661 has a cylindrical shape. The diameter of the through hole 663 formed at the axis center of the plunger 661 is stepwisely reduced from an upper side thereof to constitute a large diameter portion 663*a*, a middle diameter portion 663*b* and a small diameter portion 663*c* via respective level difference portions 663*d* and 663*e*. Side communication paths 669 in a groove shape are formed at an outer side wall of the plunger 661 in the axial direction to connect the spaces at the upper side and the lower side of the plunger 661. When the drive current is supplied to the solenoid 640, the plunger 661 is attracted and moved in the upward direction (valve opening direction) by electromagnetic force of the solenoid 640.

A plate 660 is interposed between the stopper 643 and the plunger 661 for avoiding direct contact therebetween and preventing magnetic shortcircuit.

The engaging member 662 has a cylindrical shape and its upper end is externally fitted to the lower portion of the plunger 661 to be fixed integrally to the plunger 661. At the lower end of the engaging member 662, an engaging portion 662*a* in a ring-like shape extending toward the axis center of the main valve body 652 is provided to be able to engage with the main valve body 652 from below. A fourth opening 662*b* for communicating inside and outside of the engaging member 662 is formed at the side wall of the engaging member 662.

The movable member 664 has a cylindrical shape and is arranged in the large diameter portion 663*a* of the through hole 663. The movable member 664 is biased in the downward direction by the return spring 666. The movable member 664 biases the plunger 661 in the downward direction as the result of being biased by the return spring 666. At this time, the movable member 664 is seated on the level difference portion 663*d*.

The return spring 666 is arranged between the lower face of the stopper 643 and the upper face of the movable member 664 in the large diameter portion 663*a* of the through hole 663. The return spring 666 indirectly biases both the auxiliary valve body 667 and the main valve body 652 in the valve closing direction by biasing the movable member 664 in the downward direction.

The auxiliary valve body 667 has a shape of a circular column having an upper portion 667*a* with a large diameter and a lower portion 667*b* with a small diameter. The upper portion 667*a* is arranged inside of the middle diameter portion 663*b* of the through hole 663 and the lower portion 667*b* is arranged inside of the small diameter portion 663*c* thereof. Further, a lower portion 667*b* of the auxiliary valve body 667 is projected downward from the plunger 661. A lower end 667*d* of the lower portion 667*b* has a hemispherical shape. The lower end 667*d* alternatively opens and closes the restricted communication path 671 formed in the main valve body 652. That is, when the lower end 667*d* of the auxiliary valve 667 is seated on upper opening portion (auxiliary valve seat) 671*a* of the restricted communication path 671, the restricted communication path 671 is closed. That is, an auxiliary valve 672 is formed by the auxiliary valve body 667 and the auxiliary valve seat 671*a*.

The main valve body 652 has a cylindrical shape. The restricted communication path 671 for communicating the upper end side and the lower end side (main communication path 649) of the main valve body 652 is formed in the main valve body 652 along its axis center. A lower end 652*a* of the main valve body 652 is projected in the downward direction in a hemispherical shape. When the lower end 652*a* is seated on the main valve seat 654 defined at the upper end of the valve seat 644, the main communication path 649 is closed. The diameter of an outer side wall of the main valve body 652 is reduced from its upper end via level difference portions 652*b* and 652*c*. Side communication paths 652*d* in a groove shape for connecting the spaces at the upper side and the lower side of the main valve body 652 are formed on the upper portion of the outer side wall of the upper portion having the large diameter along the axial direction of the SR valve 600.

The engaging portion 662*a* of the engaging member 662 engages with the level difference portion 652*c* of the main valve body 652. Thereby, the main valve body 652 can be moved in the upward direction.

An assist spring 668 is arranged between the level difference portion 652*b* of the main valve body 652 and the engaging portion 662*a* of the engaging member 662 and biases the main valve body 652 in the upward direction (that is, valve opening direction).

Particularly, in this fourteenth embodiment, in a state in which the drive current is not supplied to the solenoid 640 as shown in FIG. 32, when an interval (L interval) between the lower face of the stopper 643 and the upper face of the plate 660 is designated by notation "L", an interval (S interval) between the lower face 667*c* of the upper portion 667*a* of the auxiliary valve body 667 and the level difference portion 663*e* in the through hole 663 of the plunger 661 is designated by notation "S" and an interval (H interval) between the level difference portion 652*c* of the main valve body 652 and the upper face of the engaging portion 662*a* is designated by notation "H", the intervals are set to establish a relationship of L>H>S.

Figure 33:
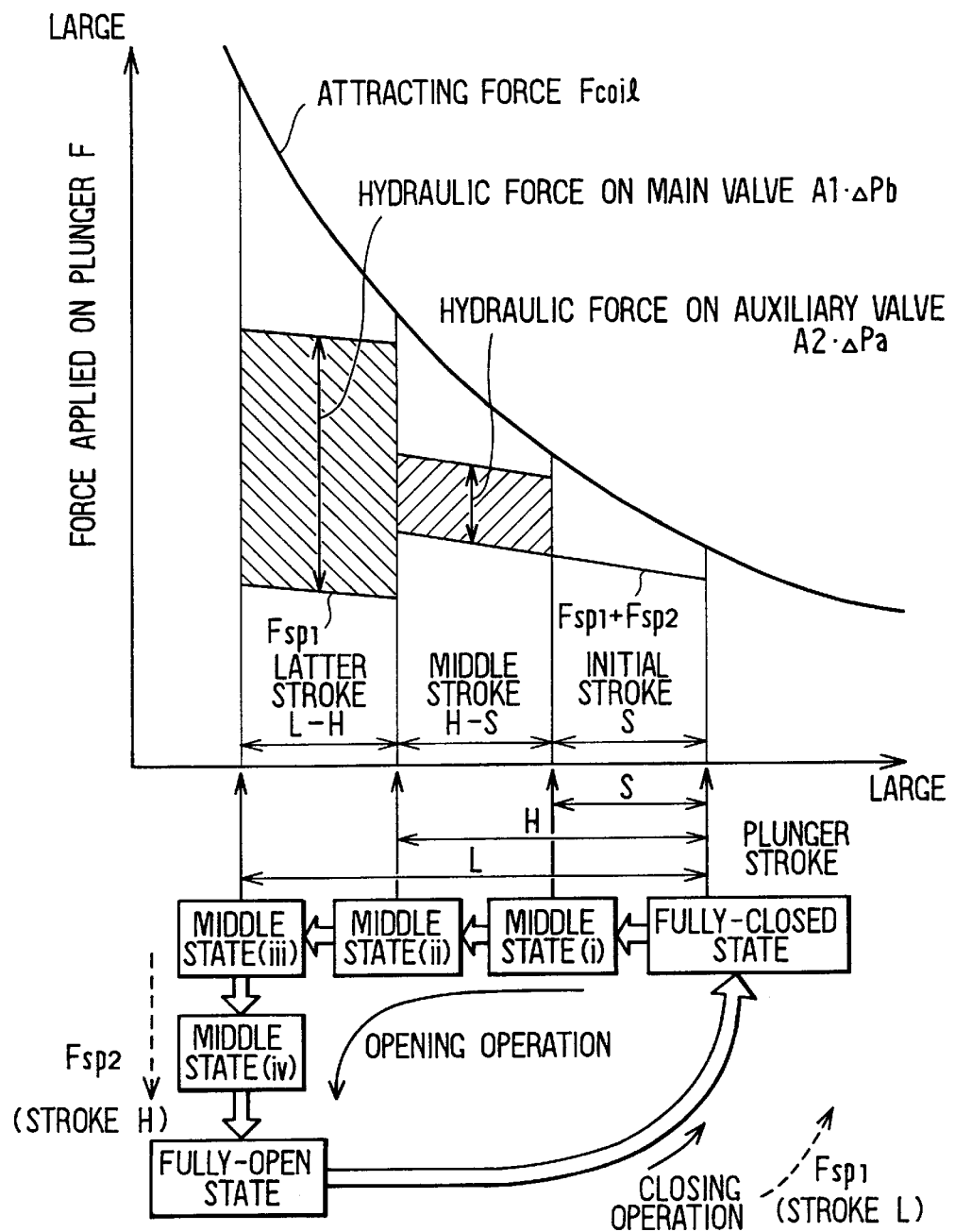
FIG. 33 is a graph illustrating a relation between force applied onto a plunger and a stroke thereof in the fourteenth embodiment.

Next, an explanation will be given of relationship among forces applied on respective structural elements in the SR valve 600 in reference to FIG. 33. FIG. 33 is a graph showing the relationship between force and stroke during operation of the SR valve 600.

As shown in FIG. 33, the larger the electromagnetic force (attracting force) applied on the plunger 661 of the solenoid 640, the smaller the stroke X of the plunger 661. In this fourteenth embodiment, a stroke range of the plunger 661 is divided in three, and relationship between stroke and force is set such that the plunger 661, the auxiliary valve 672 and the main valve 653 can be reliably operated in respective stroke ranges (initial stroke, middle stroke, latter stroke). That is, when the stroke of the plunger 661 changes, the attracting force applied on the plunger 661 also changes. The relationship of force and stroke is set by taking into account change of the attracting force so that the operation of opening the auxiliary valve 672 and the main valve 653 (realizing fully-open state) can be carried out. A specific explanation will be given as follows.

The initial stroke is established by the S interval.

During the initial stroke, as shown by the following equation, the attracting force Fcoil applied on the plunger 661 by the solenoid 640 is set to be always larger than force produced by adding the biasing force Fsp1 of the return spring 666 and the biasing force Fsp2 of the assist spring 668.

$Fcoil > Fsp1 + Fsp2$

During the initial stroke, because the interval between the solenoid 640 and the plunger 661 is large, the attracting force Fcoil is relatively small. However, the counteracting force is force produced by adding the biasing force Fsp1 of the return spring 666 and the biasing force Fsp2 of the assist spring 668 and an object to be moved is only the plunger 661 and the movable member 664. Therefore, the plunger 661 can be moved easily by the interval S (that is, an amount of dead stroke).

As a result, because the plunger 661 moves in the upward direction of FIG. 32 by the amount of the interval S, the fully-closed state is changed into a middle state (i).

Figure 34:
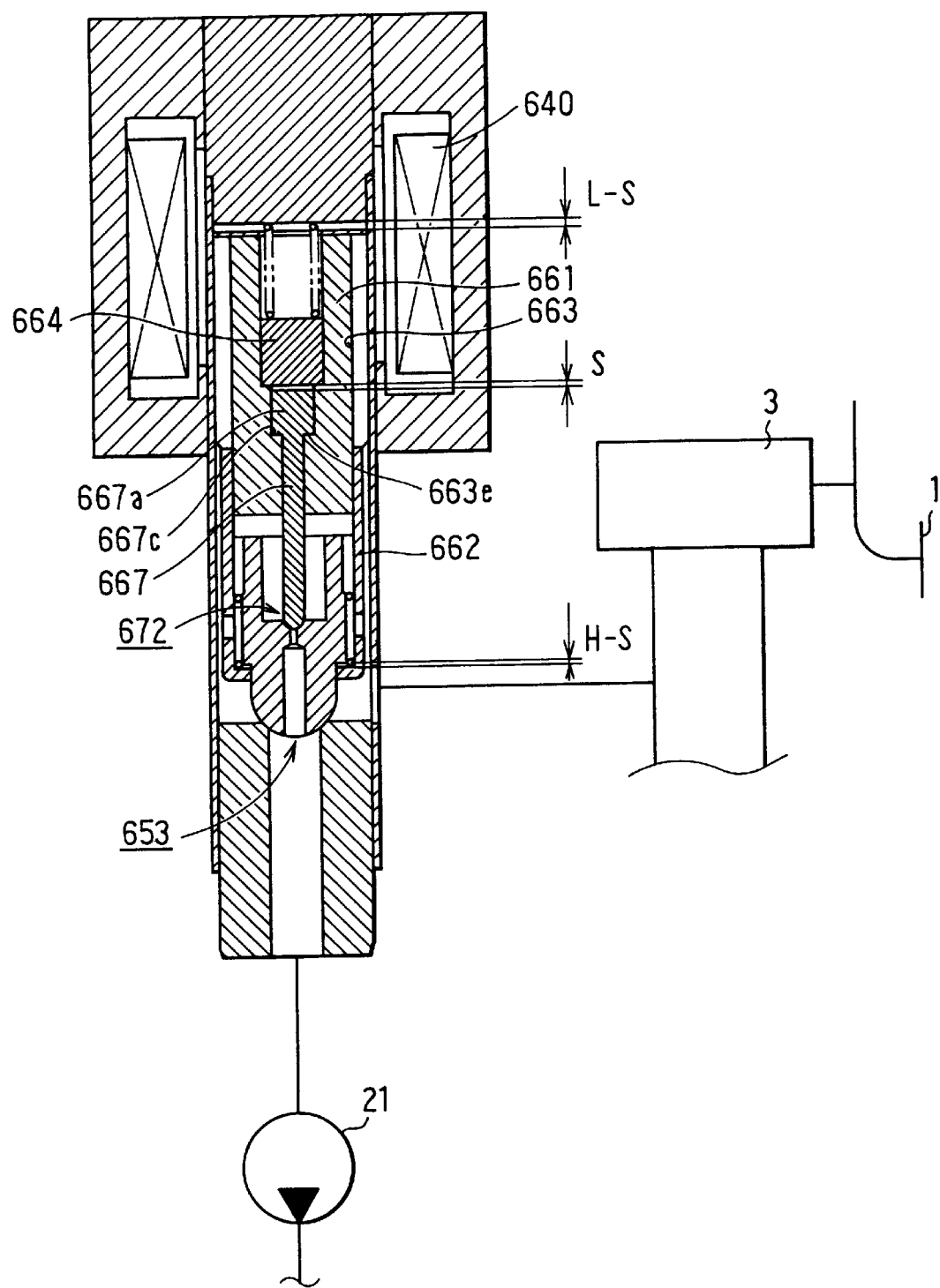
FIG. 34 is a cross-sectional view illustrating a middle state (i) of an electromagnetic valve according to the fourteenth embodiment.

The middle state (i) is a state in which the plunger 661, the engaging member 662 and the movable member 664 move in the upward direction of FIG. 34 by the interval S. A detailed description of the middle state (i) will be given later in reference to FIG. 34.

The middle stroke is defined as a difference between the H interval and the S interval.

During the middle stroke, as shown by the following equation, the attracting force Fcoil of the solenoid 640 is set to be always larger than force (middle resultant force) produced by adding the biasing force Fsp1 of the return spring 666, the biasing force Fsp2 of the assist spring 668 and hydraulic pressure force (oil pressure force) A2·ΔPa acting on the auxiliary valve 672.

$Fcoil > Fsp1 + Fsp2 + A2 \cdot \Delta Pa$ wherein A2 is a seat area of the auxiliary valve (i.e., pressure receiving area of auxiliary valve seat) and ΔPa is a pressure difference applied on the auxiliary valve (for example, 200 kgf/cm²).

During the middle stroke, the plunger 661 engages with the auxiliary valve body 667 by the level difference portion 663*e* and is moved in the upward direction of FIG. 34 along therewith. Accordingly, in order to move the plunger 661 and the auxiliary valve 667, the attracting force Fcoil larger than that during the initial stroke s is needed. That is, the attracting force Fcoil overcoming not only the resultant force of the biasing force Fsp1 of the return spring 666 and the biasing force Fsp2 of the assist spring 668 but also the hydraulic pressure force A2·ΔPa caused by the pressure difference at the auxiliary valve 672 is needed. In this respect, during the middle stroke, the plunger 661 is more adjacent to the solenoid 640 than in the case of the initial stroke. Therefore, the sufficient attracting force Fcoil exceeding the middle resultant force (Fsp1+Fsp2+A2·ΔPa) can be achieved.

Thereby, the plunger 661 is moved in the upward direction of FIG. 34 by the amount of the middle stroke (H−S). Therefore, the middle state (i) is changed into a middle state (ii).

Figure 35:
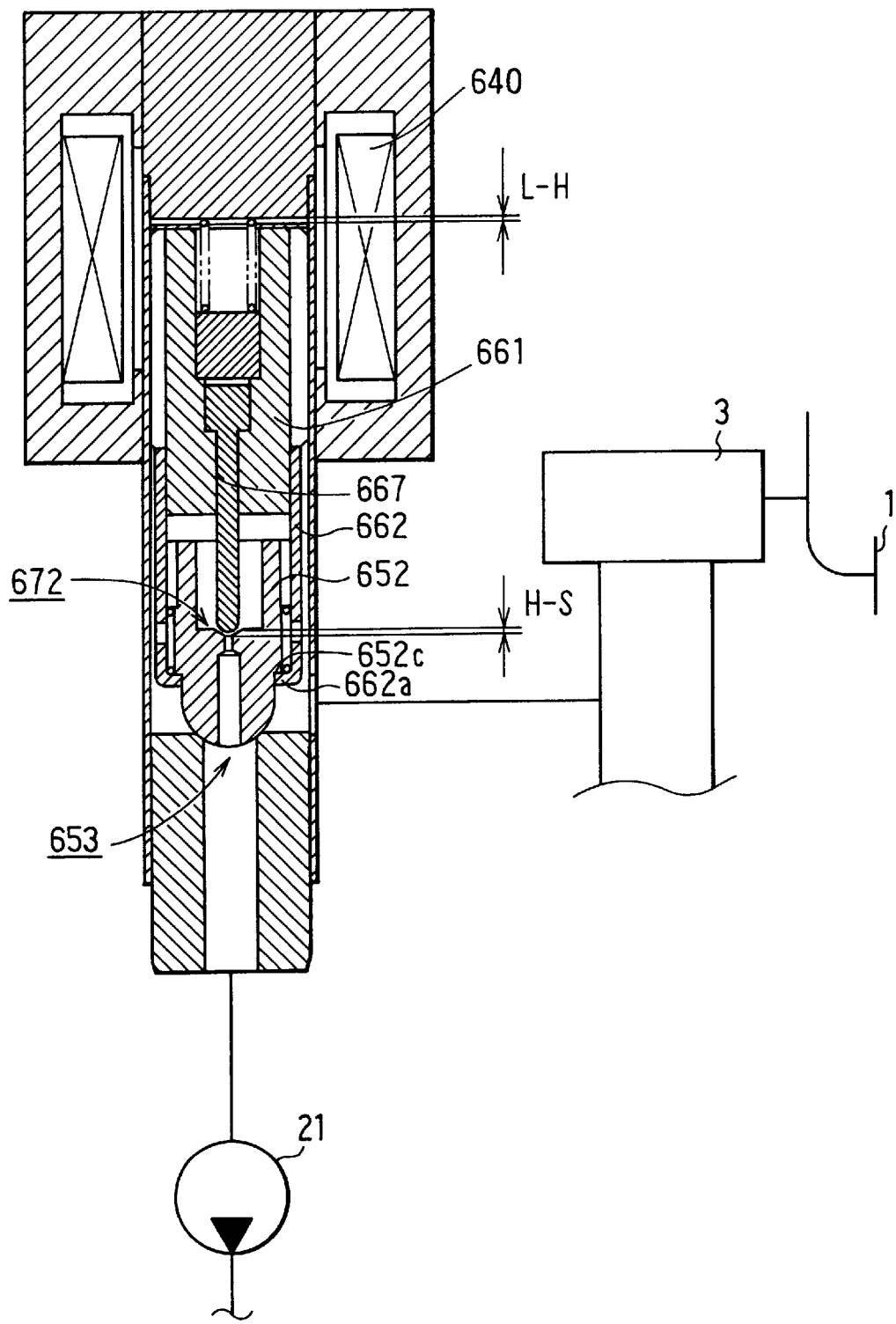
FIG. 35 is a cross-sectional view illustrating a middle state (ii) of the electromagnetic valve according to the fourteenth embodiment.

The middle state (ii) is a state in which the plunger 661, the engaging member 662, the movable member 664 and the auxiliary valve body 667 are moved in the upward direction of FIG. 35 by the amount of the middle stroke (H−S) further from the middle state (i). A detailed description of the middle state (ii) will be given later in reference to FIG. 35.

The latter stroke is defined as a difference between the L interval and the H interval.

During the latter stroke, as shown by the following equation, the attracting force Fcoil of the solenoid 640 is set to be always larger than a value (latter resultant force) produced by adding the biasing force Fsp1 of the return spring 666 and hydraulic pressure force (oil pressure force) A1·ΔPb applied on the main valve 653.

$Fcoil > Fsp1 + A1 \cdot \Delta Pb$ wherein A1 is a seat area of the main valve (pressure receiving area of the main valve seat), and ΔPb is a pressure difference applied on the main valve (for example, 10 kgf/cm$^2$).

During the latter stroke, the plunger 661 engages with the main valve body 652 via the engaging member 662 and moved in the upward direction of FIG. 35 along therewith. Therefore, in order to move the plunger 661 and the main valve body 652, the attracting force Fcoil larger than that in the middle stroke is needed. That is, the attracting force Fcoil overcoming not only the biasing force Fsp1 of the return spring 666 but also hydraulic pressure force A1·ΔPb caused by pressure difference at the main valve 653 is needed. In this respect, during the latter stroke, the plunger 661 is more adjacent to the solenoid 640 than in the case of the middle stroke. Therefore, the sufficient attracting force Fcoil exceeding the latter resultant force (Fsp1+A1·ΔPb) can be achieved.

Thereby, the plunger 661 is moved in the upward direction of FIG. 35 by the amount of the latter stroke (L–H). Accordingly, the middle state (ii) is changed into a middle state (iii).

Figure 36:
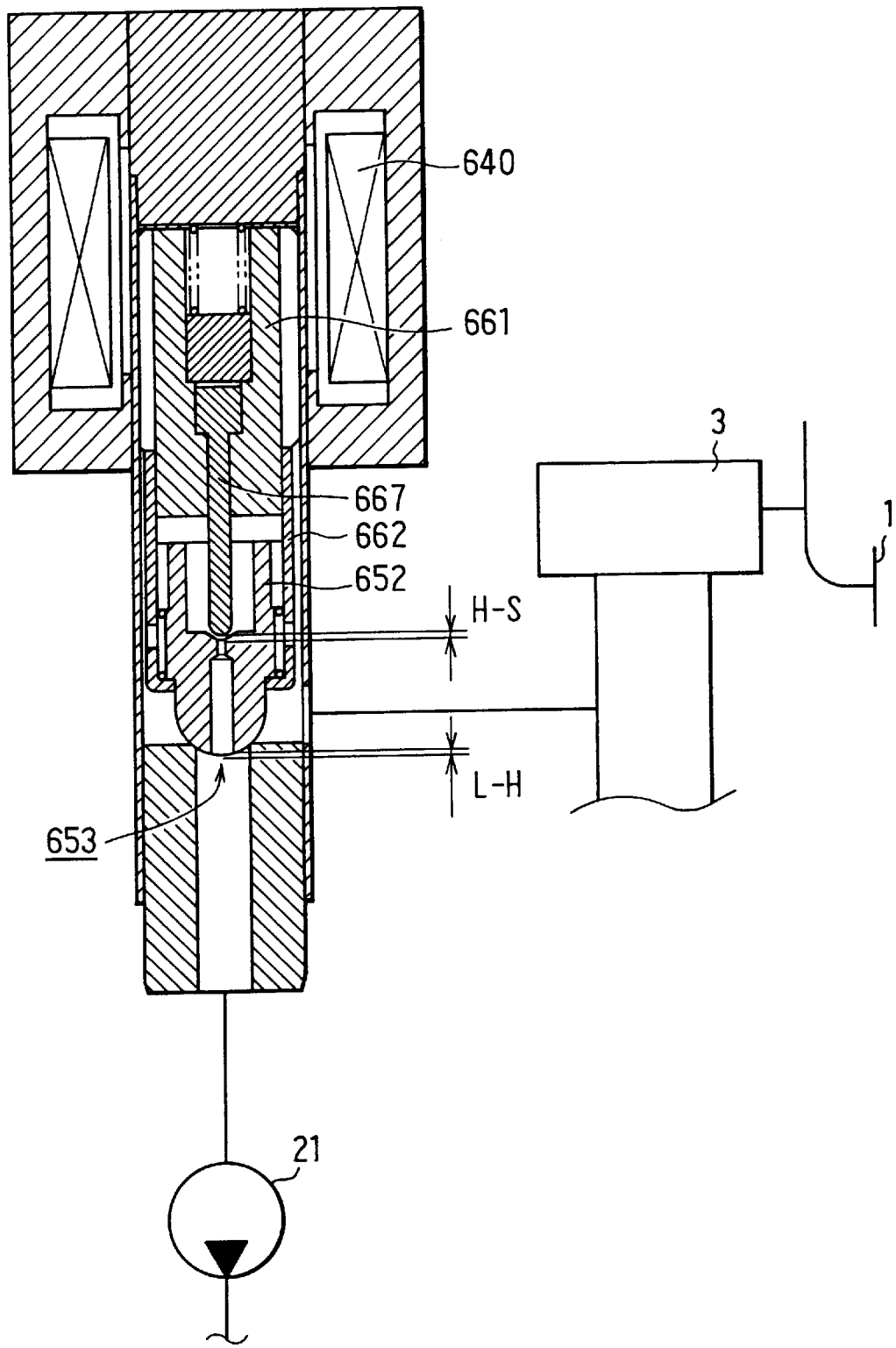
FIG. 36 is a cross-sectional view illustrating a middle state (iii) of the electromagnetic valve according to the fourteenth embodiment.

The middle state (iii) is a state in which the plunger 661, the engaging member 662, the movable member 664, the main valve body 652 and the auxiliary valve body 667 are moved in the upward direction of FIG. 36 by the amount of the latter stroke (L–H) further from the middle state (ii). A detailed description of the middle state (iii) will be given later in reference to FIG. 36.

It is to be noted that, the biasing force Fsp2 of the assist spring 668 is not taken into account during the latter stroke because, after the engaging portion 662a once engages with the main valve body 652, the assist spring 668 is apparently integrated with the main valve body 652 and the influence of the biasing force Fsp2 is regarded not to effect.

The movement of the plunger 661 is stopped by a total of the strokes mentioned above, that is, moving operation of initial stroke (S)+middle stroke (H–S)+latter stroke (L–H)=L to nullify the L interval.

Thereafter, the main valve body 652 is moved by the biasing force Fsp2 of the assist spring 668 in the valve opening direction and a middle state (iv) is brought about.

Figure 37:
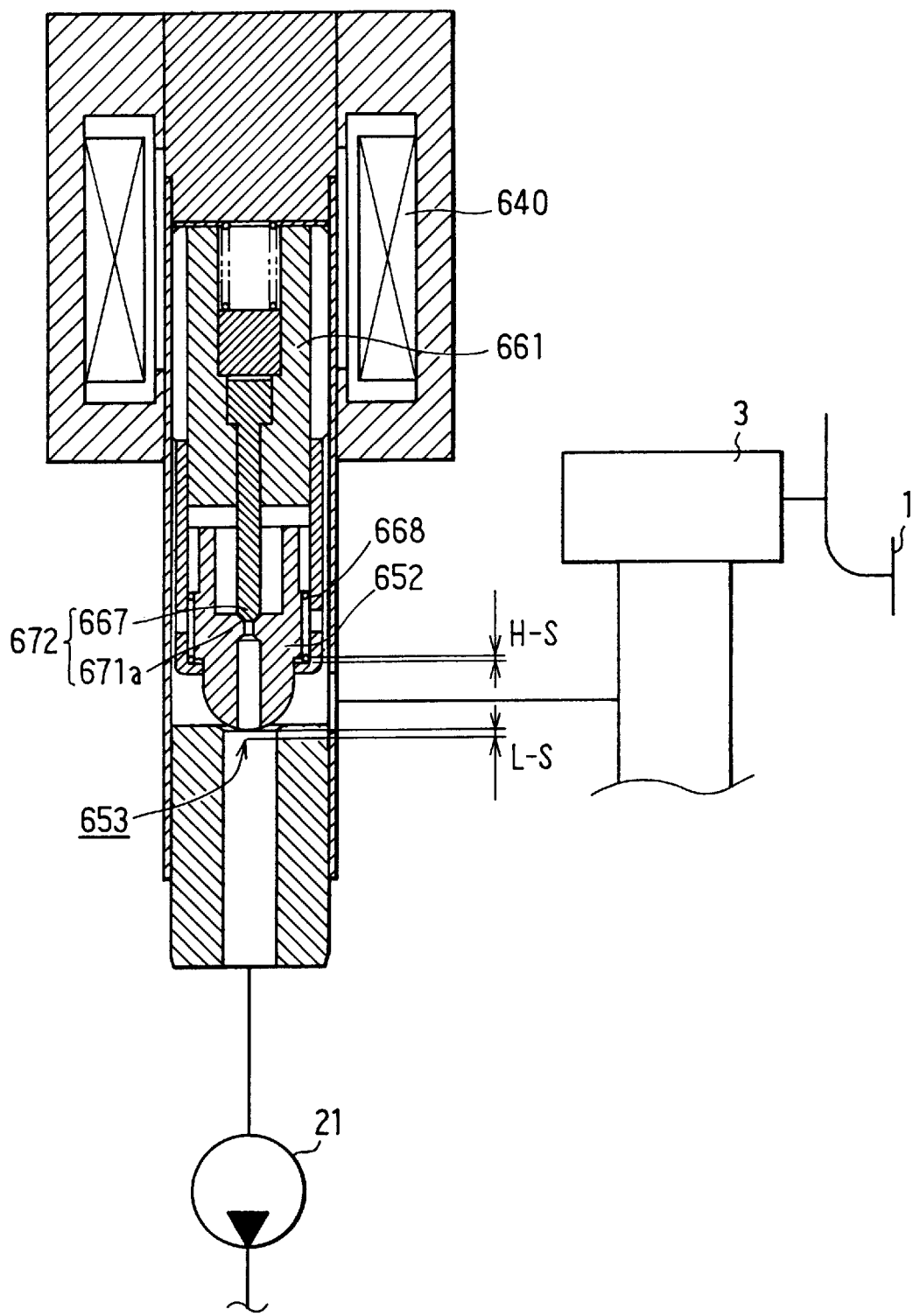
FIG. 37 is a cross-sectional view illustrating a middle state (iv) of the electromagnetic valve according to the fourteenth embodiment.

The middle state (iv) is a state in which only the main valve body 652 moves in the upward direction of FIG. 37 by a distance of (H–S) further from the middle state (iii). A description of the middle state (iv) will be given later in reference to FIG. 37.

Further, by the biasing force Fsp2 of the assist spring 668, the main valve body 652 and the auxiliary valve body 667 are moved in the upward direction. As a result, the SR valve 600 is brought into the fully-open state.

Figure 38:
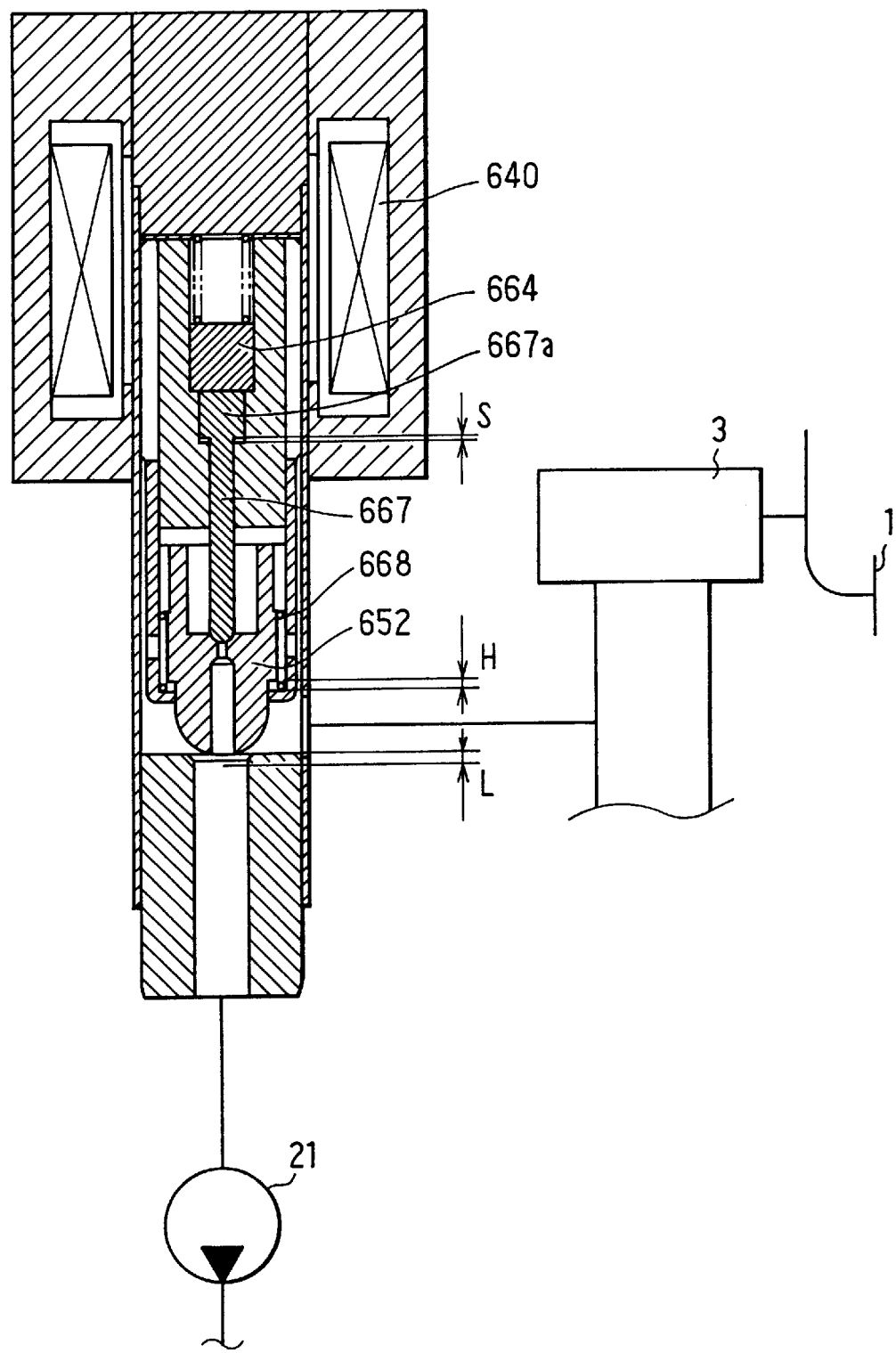
FIG. 38 is a cross-sectional view illustrating a full-open state of the electromagnetic valve according to the fourteenth embodiment.

The fully-open state is a state in which the main valve body 652 and the auxiliary valve body 667 are moved in the upward direction of FIG. 38 by the interval S further from the middle state (iv). A detailed description of the fully-open state will be given later in reference to FIG. 38.

As described above, the SR valve 600 is brought into the fully-open state via the middle state (iv) from the middle state (iii) by the biasing force Fsp2 of the assist spring 668. The main valve body 52 is moved by a distance of (H–S)+S=H from the middle state (iii) to the fully opened state.

When the supply of current to the solenoid 640 is stopped (OFF), the plunger 661 is moved (returned) in the downward direction of FIG. 32 by the total stroke L corresponding to the L interval by the biasing force Fsp1 of the return spring 666. As a result, the fully-closed state shown in FIG. 32 is restored.

Next, an explanation will be given of respective states mentioned above in reference to FIG. 32 and FIG. 34 through FIG. 38 showing positions or the like of respective parts.

[Fully-Closed State (FIG. 32)]

As shown in FIG. 32, when the current is not supplied to the solenoid 640, the SR valve 600 is brought into the fully-closed state. In the following, consider a case in which the brake pedal 1 is depressed and the pump 21 is driven.

By the biasing force Fsp1 of the return spring 666 in the downward direction (valve closing direction), the movable member, 664 is biased downwardly. By the movable member 664, the plunger 661 and the auxiliary valve body 667 are biased in the downward direction. Further, by the auxiliary valve body 667, the main valve body 652 is biased in the downward direction. Thereby, the auxiliary valve 672 and the main valve 653 are closed to thereby bring about the fully-closed state.

In this case, although the main valve body 652 is biased in the upward direction (direction of opening main valve 653) by the assist spring 668 and the auxiliary valve body 667 is biased in the upward direction via the main valve 652, the biasing force Fsp2 of the assist spring 668 is smaller than the biasing force Fsp1 of the return spring 666. Therefore, the above-described fully-closed state is maintained.

[Middle State (i) (FIG. 34)]

As shown in FIG. 34, when the current is supplied to the solenoid 640, the plunger 661 and the engaging member 662 integral therewith are moved in the upward direction by the attracting force Fcoil from the solenoid 640.

That is, the plunger 661 and the engaging member 662 are lifted by the distance of the S interval mentioned above. As a result, the lower face 667c of the upper portion 667a of the auxiliary valve body 667 is brought into contact with the level difference portion 663e of the through hole 663 formed in the plunger 661.

By that movement, the value of the L interval is reduced by the initial stroke S to (L–S). Further, in accordance with the lift of the plunger 661, the S interval is nullified and a clearance corresponding to the initial stroke S is produced between the lower face of the movable member 664 and the upper face of the auxiliary valve body 667. The value of the H interval is reduced by the initial stroke S to (H–S).

In this way, when the plunger 661 and the engaging member 662 are lifted by the initial stroke S by the attracting force Fcoil of the solenoid 640, the fully-closed state shown in FIG. 32 is changed into the middle state (i) shown in FIG. 34.

The movement of the initial stroke S does not directly contribute to opening of the auxiliary valve 672 and opening of the main valve 653 but is a movement of so-to-speak dead stroke in which only the plunger 661 is moved. Accordingly, the plunger 661 can be reliably moved even by weak attracting force. Further, because the plunger 661 can be made adjacent to the solenoid 640 by the initial stroke S by the weak attracting force Fcoil, the attracting force Fcoil generated by the solenoid 640 is made larger.

[Middle State (ii) (FIG. 35)]

As shown in FIG. 35, when the current supply to the solenoid 640 is maintained, the plunger 661, the engaging member 662 and the auxiliary valve body 667 are moved further in the upward direction.

That is, the plunger 661, the engaging member 662 and the auxiliary valve body 667 engaged with the plunger 661 are moved by the distance of the middle stroke (H–S) mentioned above. As a result, the engaging member 662 is brought into contact with the level difference portion 652c of the main valve body 652.

By that movement, the L interval is further reduced by the middle stroke (H–S) to (L–H). Further, in accordance with the lift of the plunger 661, the auxiliary valve body 667 is also lifted by the distance (H–S). Accordingly, the auxiliary valve 672 is opened by that distance (H–S). That is, the middle stroke (H–S) is an amount of lift for ensuring brake fluid flow through the auxiliary valve 672.

During the middle state (ii), by lifting the auxiliary valve body 667, only the auxiliary valve 672 is opened. As a result, since pressure difference at the main valve 653 is reduced, hydraulic pressure force for biasing the main valve body 652 in the valve closing direction is reduced. Accordingly, the main valve 653 is easy to be opened.

In this way, by the attracting force Fcoil of the solenoid 640, the plunger 661, the engaging member 662 and the auxiliary valve body 667 are moved by the middle stroke (H–S). As a result, the middle state (i) shown in FIG. 34 is changed into the middle state (ii) shown in FIG. 35.

By the movement of the plunger 661 during the middle stroke (H–S), the auxiliary valve 672 is opened. In addition, because the plunger 661 is made more adjacent to the stopper 643 (solenoid 640), the attracting force Fcoil applied on the plunger 661 is made larger.

[Middle State (iii) (FIG. 36)]

As shown in FIG. 36, when the current supply to the solenoid 640 is maintained, the plunger 661, the engaging member 662, the auxiliary valve body 667 and the main valve body 652 are further moved in the upward direction.

That is, the plunger 661, the engaging member 662, the auxiliary valve body 667 and the main valve body 652 engaged with the engaging member 662 are lifted by a distance of the latter stroke (L–H) mentioned above and a state in which both of the auxiliary valve 672 and the main valve 653 are opened is brought about.

By this movement, the L interval is further reduced by the latter stroke (L–H) to null. That is, the plunger 661 reaches its upper limit position. Further, in accordance with the lift of the plunger 661, the main valve body 652 is also lifted by (L–H). Therefore, the main valve 653 is opened by that distance. That is, the latter stroke (L–H) is an amount of lift sufficient for prohibiting the main valve 653 from being closed by hydraulic force (not spontaneously closed).

In this way, when the plunger 661, the engaging member 662, the auxiliary valve body 667 and the main valve 652 are moved by the latter stroke (L–H) by the attracting force Fcoil of the solenoid 640, the middle state (ii) shown in FIG. 35 is changed into the middle state (iii) shown in FIG. 36.

By the movement of the plunger 661 during the latter stroke (L–H), the plunger 661 can be made more adjacent to the solenoid 640. As a result, the attracting force Fcoil applied on the plunger 661 is made larger than that during the middle state (ii).

[Middle State (iv) (FIG. 37)]

As shown in FIG. 36, the plunger 661 has already reached its upper limit and therefore, even when the current supply to the solenoid 640 is maintained, it is not lifted further.

Thereafter, by the biasing force Fsp2 of the assist spring 668 in the valve opening direction, the main valve body 652 is lifted by a distance (H–S). As a result, the auxiliary valve body 667 is seated on the auxiliary valve seat 671a of the main valve body 652 so that the auxiliary valve 672 is closed.

Further, by the movement of the main valve body 652, the lift amount of the main valve body 652 is increased to (L–S) so that the main valve 653 is further opened.

That is, the middle state (iv) shown in FIG. 37 is produced only by the biasing force Fsp2 of the assist spring 668.

Thereby, the sufficient flow rate flowing through the main valve 653 can be ensured.

[Fully-Open State (FIG. 38)]

When the current supply to the solenoid 640 is further maintained, the main valve body 652 and the auxiliary valve body 667 are further moved by the biasing force Fsp2 of the assist spring 668 so that the SR valve 600 is brought into the fully-open state.

That is, by the biasing force Fsp2 of the assist spring 668, the main valve body 652 is lifted. As a result, the H interval has an interval of a distance H similar to the fully-closed state. Further, by the further lift of the main valve body 652, the lift amount of the main valve body 652 becomes equal to the value L of the L interval in the fully-closed state. That is, the value L is the final lift amount of the main valve body 652. At this time, the auxiliary valve body 667 is pushed up by the main valve body 652 and the upper face of the upper portion 667a of the auxiliary valve body 667 is brought into contact with the lower face of the movable member 664. Thereby, the value of the S interval becomes the interval S similar to the fully-closed state.

In this way, the fully-open state of the SR valve 600 is realized. In the state shown in FIG. 38, the fully-open state can be maintained by a relatively large attracting force Fcoil.

Next, an explanation will be given of the operation in the SR valve 600 accompanied by operation of brake control.

[Normal Brake Operation and Antiskid Control (Fully-Closed State; FIG. 32)]

In the case of a normal brake operation or antiskid control, as shown in FIG. 32, since the current is not supplied to the solenoid 640, the restricted communication path 671 is cut off by the auxiliary valve body 667 biased in the downward direction by the return spring 666. The main communication path 649 is also cut off by the main valve body 652 biased in the downward direction by the auxiliary valve body 667. Therefore, the fully-closed state is maintained in the SR valve 600.

[Traction Control and Turn Trace Control (Fully Opened State; FIG. 38)]

When traction control or turn trace control is carried out, the solenoid 640 of the SR valve 600 is supplied with drive current. At this occasion, since the brake pedal 1 is not depressed, both the main valve body 652 and the auxiliary valve body 667 are brought into a state in which they are not applied with hydraulic pressure load (absolute pressure by brake hydraulic pressure).

Therefore, when the attracting force Fcoil of the solenoid 640 (which varies in accordance with stroke of plunger 661) is applied on the plunger 661, it overcomes the biasing force Fsp1 of the return spring 666. As a result, the auxiliary valve body 667 and the main valve body 652 are moved in the attracting direction (upward direction). Further, after the movement of the plunger 661 has been finished, by the biasing force Fsp2 of the assist spring 668, the auxiliary valve body 667 and the main valve body 652 are further lifted so that the fully-closed state is brought about.

[Power Assist Brake Control (Fully-Open State; FIG. 38)]

Consider a state in which the brake pedal 1 is depressed while the SR valve 600 is turned on, when power assist brake control is to be carried out. At this occasion, both the main valve body 652 and the auxiliary valve body 667 are brought into a state in which they are applied with hydraulic pressure load.

The attracting force Fcoil applied on the plunger 661 is set to be larger than a resultant force of the biasing force Fsp1 of the return spring 666 and biasing force generated based on the hydraulic pressure load (oil pressure). Accordingly, the auxiliary valve body 667 and the main valve body 652 are moved in the attracting direction (upward direction). When the movement of the plunger 661 has been finished, by the biasing force Fsp2 of the assist spring 668, the auxiliary valve body 667 and the main valve body 652 are further lifted so that the fully-open state is brought about.

Under the fully-open state, the conduit KD from the master cylinder 3 to the pump 21 is maximally opened. Therefore, a sufficient flow rate flowing through the main valve 653 can be ensured. Accordingly, by operating the pump 21 during the fully-open state, pressure increasing operation of the wheel cylinder pressure can be carried out swiftly and sufficiently. Further, there is no drawback accompanied by cavitation as the result of occurrence of negative pressure on the intake side of the pump.

For example, when the wheel cylinder pressure is increased in traction control, turn trace control (vehicle yaw control) or power assist brake control, the conduit KD is opened by supplying the current to the solenoid 640 of the SR valve 600. In this case, by operating the pump 21, the wheel cylinder pressure can be increased by drawing the brake fluid from the side of the master cylinder 3 and supplying to the side of the wheel cylinders 5 and 6 regardless of presence or absence of depression of the brake pedal 1.

In this way, according to the fourteenth embodiment, the state of the SR valve 600 can be reliably switched between the fully-closed state and the fully-open state. Therefore, various kinds of control mentioned above can preferably be carried out.

In this fourteenth embodiment, during the respective stroke ranges of the plunger 661, the attracting force Fcoil of the solenoid 640 is set to be always larger than force for moving the plunger 661 in the downward direction. Specifically, the attracting force Fcoil is set to be always larger than the biasing force (Fsp1+Fsp2) of the both springs 666 and 668 during the initial stroke S, the middle resultant force (Fsp1+Fsp2+A2·ΔPa) for closing the auxiliary valve 672 during the middle stroke (H–S), and the latter resultant force (Fsp1+A1·ΔPb) for closing the main valve 653 during the latter stroke (L–H). Thereby, in the respective stroke ranges, the plunger 661 can be reliably lifted up.

The force for moving the plunger 661 in the downward direction is increased when brake hydraulic pressure is increased. However, in this fourteenth embodiment, by utilizing the characteristic in which the smaller the stroke of the plunger 661, the larger the attracting force Fcoil of the solenoid 640, as shown in FIG. 33, the attracting force Fcoil of the solenoid 640 is set to be always larger than the force for moving the plunger 661 in the downward direction during the respective stroke ranges. Therefore, the plunger 661 can be reliably lifted up to realize the fully-opened state.

In addition thereto, at moments in which members such as the plunger 661, auxiliary valve body 667, main valve body 652 and so on are brought into contact with each other and engaged states thereof are established in respective middle states, dynamic force (kinetic energy, inertia force, and collision energy of movable portions) is applied on a static-side member. Therefore, such dynamic force works in a direction of assisting the electromagnetic force for opening the auxiliary valve and the main valve.

Further, after the plunger 661 has once reached an upper limit position, the plunger 661 is maintained at that position by the relatively large attracting force and the main valve body 652 is lifted up and maintained at the lifted-up position by the assist spring 668. Thereby, the fully-open state can be maintained and, even when the brake pedal 1 is depressed so that the brake hydraulic pressure is increased, the fully-open state can be reliably realized.

Further, according to the fourteenth embodiment, the fully-open state can be maintained by the above-described constitution. Therefore, the constitution of the SR valve 600 can be simplified and downsizing thereof can be realized.

(Fifteenth Embodiment)

Next, an explanation will be given of a fifteenth embodiment in reference to FIG. 39. However, an explanation of portions similar to those in the fourteenth embodiment will be omitted or simplified.

First, an explanation will be given of the structure of an SR valve 680 according to the fifteenth embodiment.

In the SR valve 680, a main valve body 696 is not moved by an engaging member as in the fourteenth embodiment but is moved by an auxiliary valve body 694. FIG. 39 is a sectional view showing an outline constitution of the SR valve 680 which shows a fully-closed state thereof.

Figure 39:
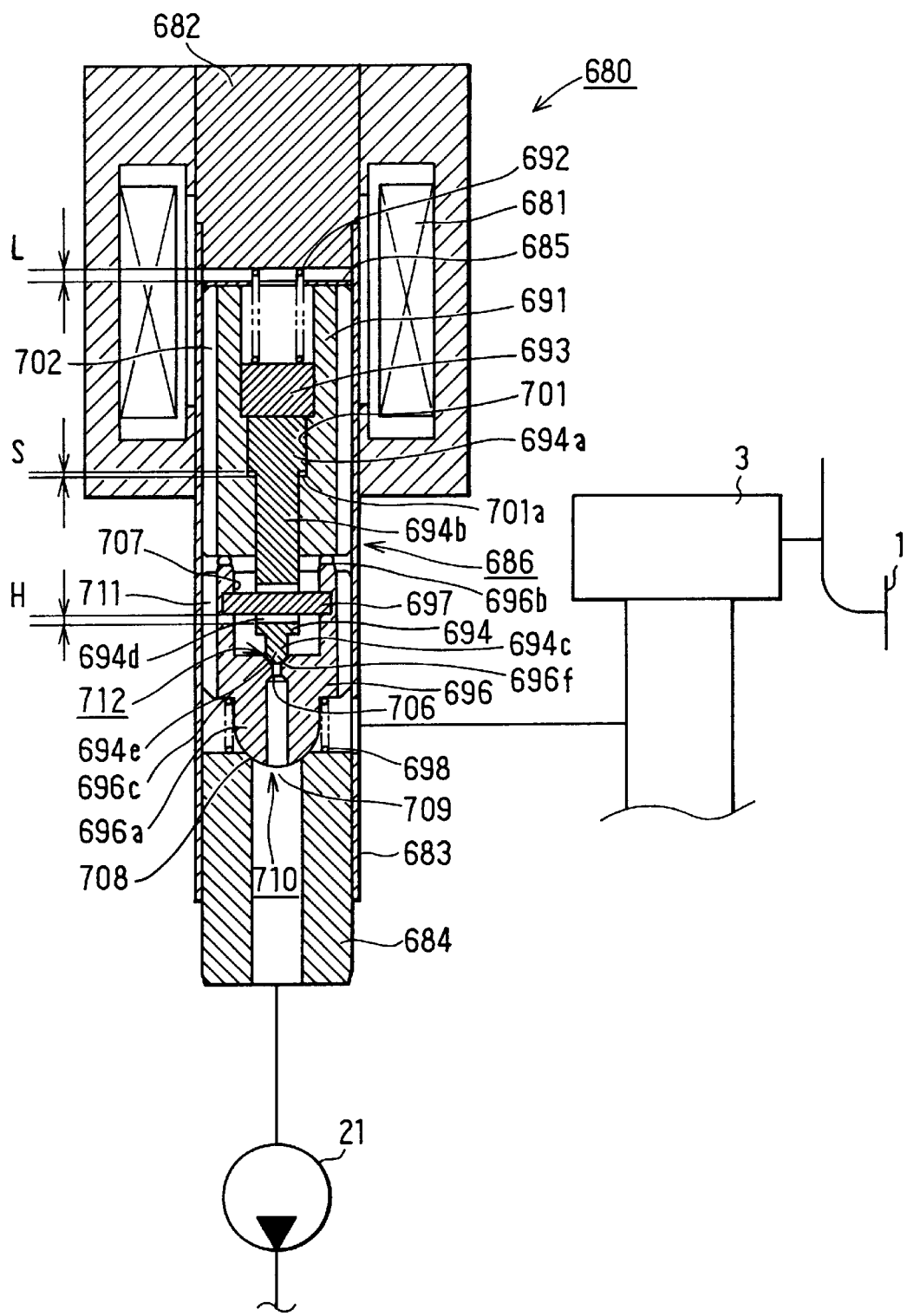
FIG. 39 is a cross-sectional view illustrating a full-closed state of an electromagnetic valve according to a fifteenth embodiment.

As shown in FIG. 39, similar to the fourteenth embodiment, the SR valve 680 includes a solenoid 681, a stopper 682, a sleeve 683, a valve seat 684 and a valve composite body 686.

The valve composite body 686 is formed by a plate 685, a plunger 691, a return spring 692, a movable member 693, an auxiliary valve body 694, a main valve body 696, an engaging member 697 (integral with the main valve body 696) and an assist spring 698. Further, members other than the plunger 691 are made of nonmagnetic bodies.

The plunger 691, the return spring 692 and the movable member 693 are substantially similar to those in the fourteenth embodiment. For example, the plunger 691 is provided with a through hole 701 and side communication paths 702 therein.

The auxiliary valve body 694 has an upper portion 694a with a large diameter, a middle portion 694b with a middle diameter and a lower portion 694c with a small diameter. Particularly, a through hole 694d is laterally formed on the lower portion of the middle portion 694b. The engaging member 697 is arranged to penetrate the through hole 694d while maintaining a predetermined interval H from the lower face of the inner wall of the through hole 694d. A restricted communication path 706 formed in the main valve body 696 is alternatively opened and closed by a lower end 694e of the lower portion 694c.

A hollow portion 707 having a large diameter and the restricted communication path 706 are formed at an axis center of the main valve body 696. Further, a main communication path 709 formed in the valve seat 684 is closed when a lower end 696a of the main valve body 696 is seated on a main valve seat 708. Side communication paths 711 are formed on an outer side wall of the main valve body 796. A projected portion 696b is formed at the upper end of the main valve body 696 to maintain an interval between the main valve body 696 and the auxiliary valve body 694.

Particularly, in the main valve body 696, the engaging member 697 is fixedly arranged to cross the axis center of the main valve body 696 and to connect both side walls of the hollow portion 707. When the auxiliary valve body 694 is moved in the upward direction, the engaging member 697 moves the same direction by engaging with the auxiliary valve body 694, thereby opening a main valve 710.

The assist spring 698 is arranged between a level difference portion 696c of the main valve body 696 and the valve seat 684 and biases the main valve body 696 in the upward direction, that is, in the valve opening direction.

In this fifteenth embodiment, when the current is not supplied to the solenoid 681, an interval (L interval) between the lower face of the stopper 682 to the upper face of the plate 685 is designated by notation L, an interval (S interval) between the lower face of the upper portion 694*a* of the auxiliary valve body 694 and a level difference portion 701*a* of the through hole 701 in the plunger 691 is designated by notation S and an interval (H interval) between the lower face of the through hole 694*d* of the auxiliary valve body 694 and the lower side of the engaging member 697 is designated by notation H. In this SR valve 680, the members in the SR valve 680 are arranged to establish relation of L>H>S.

Next, an explanation will be given of the operation in the SR valve 680 according to the fifteenth embodiment.

[Fully-Closed State]

When the current is not supplied to the solenoid 681, the SR valve 680 is brought into the fully-closed state. In the following, consider a case in which the pedal 1 is depressed and the pump 21 is driven.

The movable member 693 is biased in the downward direction by biasing force Fsp1 of the return spring 692 in the downward direction. The plunger 691 and the auxiliary valve body 694 are biased in the downward direction by the movable member 693. Further, the main valve body 696 is biased in the downward direction by the auxiliary valve body 694. Thereby, the auxiliary valve 712 and the main valve 710 are both closed and accordingly, the fully-closed state is brought about.

[Middle State (i)]

When the current is supplied to the solenoid 681, the plunger 691 and the movable member 693 are moved in the upward direction by a distance of an initial stroke (dead stroke) S.

[Middle State (ii)]

When current supply to the solenoid 681 is maintained, the plunger 691, the movable member 693 and the auxiliary valve body 694 are moved further in the upward direction.

That is, the plunger 691, the movable member 693 and the auxiliary valve body 694 engaged with the plunger 691 are moved by a distance of a middle stroke (H−S). The lower face of the through hole 694*d* formed in the auxiliary valve body 694 is brought into contact with the lower side of the engaging member 697.

In accordance with the movement of the plunger 691, the auxiliary valve body 694 is also lifted up by the distance of (H−S). Accordingly, the auxiliary valve 712 is opened by that movement of the auxiliary valve body 694.

[Middle State (iii)]

When the current supply to the solenoid 681 is maintained, the plunger 691, the movable member 693, the auxiliary valve body 694 and the main valve body 696 are further moved in the upward direction.

That is, the plunger 691, the movable member 693 and the auxiliary valve body 694 are lifted up by a distance of a latter stroke (L−H). At this occasion, the engaging member 697 engages with the through hole 694*d* in the auxiliary valve body 694. Therefore, along with the auxiliary valve body 694, the main valve body 696 is also lifted up so that both the auxiliary valve 712 and the main valve 710 are opened.

[Middle State (iv)]

By the operation of the above-described middle state (iii), the plunger 691 has already reached its upper limit position. Therefore, even when the current supply to the solenoid 681 is maintained, the plunger 691 is not lifted up further.

However, by biasing force Fsp2 of the assist spring 698, the main valve body 696 is lifted up by a distance of (H−S). As a result, the auxiliary valve body 694 is seated on an auxiliary valve seat 696*f* so that an auxiliary valve 712 is closed.

[Fully-Open State]

When the current supply to the solenoid 681 is further maintained, by the biasing force Fsp2 of the assist spring 698, the main valve body 696 and the auxiliary valve body 694 are further lifted up so that the SR valve 680 is brought into the fully-open state.

In this way, according to the fifteenth embodiment, the L interval, the S interval and the H interval are set to establish the relation of L>H>S. Therefore, by supplying the current to the solenoid 681, firstly, the plunger 691 is lifted up by the dead stroke S. Thereafter, by further lifting up the plunger 691, the auxiliary valve body 694 (engaged with the plunger 691) is also lifted. Along with the auxiliary valve body 694, the main valve body 696 (engaged therewith by the engaging member 697) is also lifted. Thereby, similar to the fourteenth embodiment, even when the pump 21 is driven and the brake pedal 1 is depressed so that the brake hydraulic pressure applied on the main valve body 696 is increased, by supplying the current to the solenoid 681, the fully-open state of the SR valve 680 can be reliably realized.

(Sixteenth Embodiment)

Next, an explanation will be given of a sixteenth embodiment in reference to FIG. 40. However, an explanation of portions similar to those in the above-described embodiment will be omitted or simplified.

First, an explanation will be given of the structure of an electromagnetic valve (SR valve) according to the sixteenth embodiment.

According to the SR valve 720 of the sixteenth embodiment, the constitution of a main valve 744 is substantially similar to that in the fifteenth embodiment. A main valve body 736 is moved by a plunger 732 via an engaging member 737. FIG. 40 is a sectional view showing an outline constitution of the SR valve 720 which shows a fully-closed state thereof.

Figure 40:
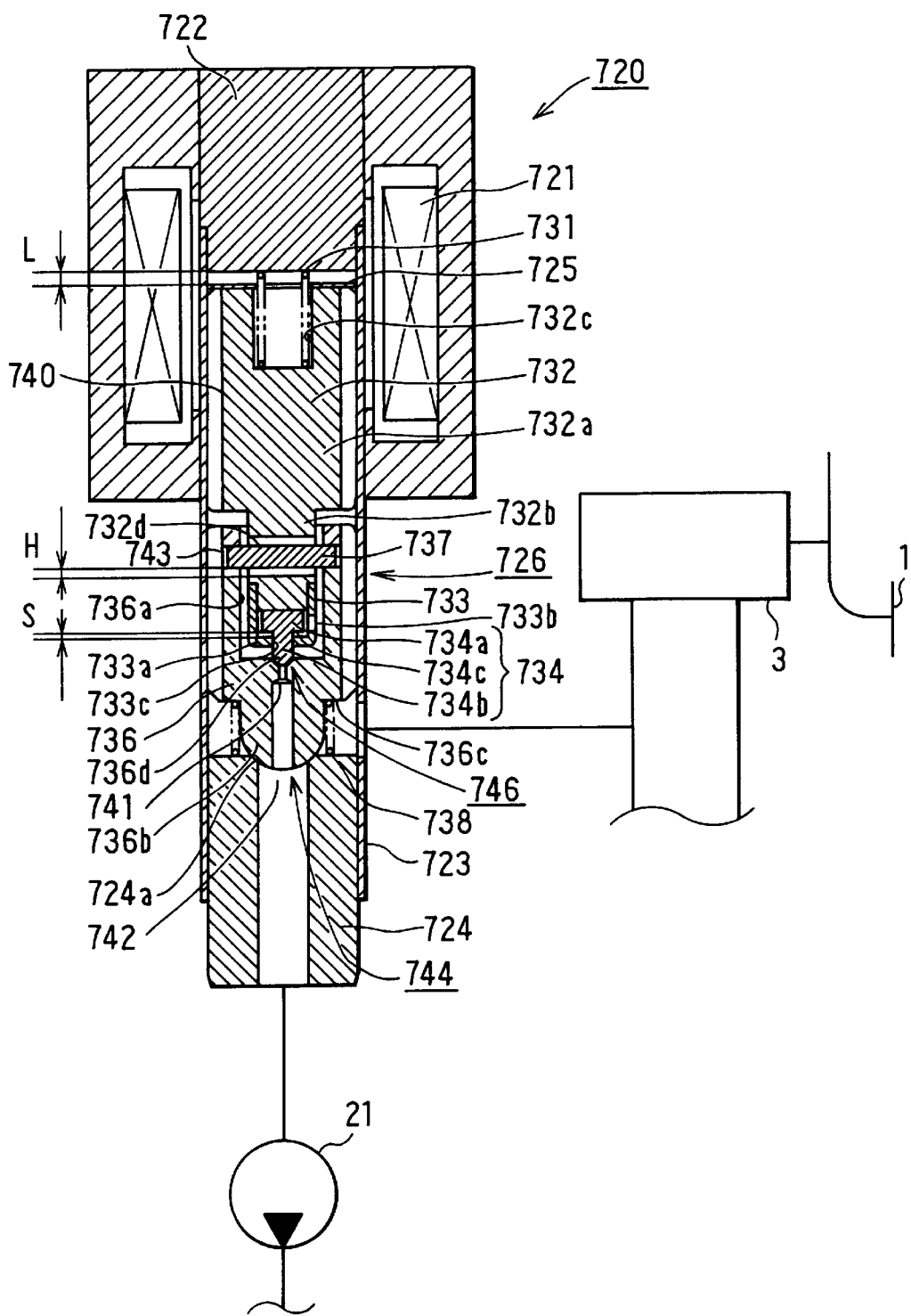
FIG. 40 is a cross-sectional view illustrating a full-closed state of an electromagnetic valve according to a sixteenth embodiment.

As shown in FIG. 40, the SR valve 720 has a solenoid 721, a stopper 722, a sleeve 723, a valve seat 724 and a valve composite body 726.

The valve composite body 726 is formed by a plate 725, a return spring 731, a plunger 732, a first engaging member 733 (integral with the plunger 732), an auxiliary valve body 734, a main valve body 736, a second engaging member 737 (integral with the main valve body 736) and an assist spring 738. Members other than the plunger 732 are made of nonmagnetic bodies.

The plunger 732 comprises a large diameter portion 732*a* and a small diameter portion 732*b*. Side communication paths 740 are formed on a side face of the large diameter portion 732*a*. The return spring 731 is arranged in a recess portion 732*c* formed on the upper side of the large diameter portion 732*a*.

A through hole 732*d* is formed in the small diameter portion 732*b* in left and right direction of the drawing. The second engaging member 737 is arranged to penetrate the through hole 732*d* while maintaining a predetermined interval (H interval) from the lower face of the through hole 732*d*. Further, the first engaging member 733 in a cylindrical shape is integrally fixed to the plunger 732 by being mounted onto the lower portion of the small diameter portion 732*b*. An engaging portion 733*a* is formed at the lower end of the first engaging member 733 to extend in a ring-like shape toward an axis center of the SR valve 720. A side opening 733*b* for communicating inside and outside of the engaging member 733 is formed at a side wall thereof.

The auxiliary valve body 734 has a cylindrical shape. In the auxiliary valve body 734, an upper portion 734*a* having a large diameter is connected with a lower portion 734*b* having a small diameter. There is a level difference portion 734c between the upper portion 734a and the lower portion 734b. The upper portion 734a of the auxiliary valve body 734 is arranged between the lower face of the small diameter portion 732b of the plunger 732 and the engaging portion 733a. The lower portion 734b of the auxiliary valve body 734 is projected downward from a communication hole 733c on the engaging portion 733a of the first engaging member 733. The restricted communication path 741 is formed in the main valve body 736 and is alternatively opened and closed by the lower portion 734b of the auxiliary valve body 734.

A hollow portion 736a having a large diameter and the restricted communication path 741 are formed at the axis center of the main valve body 736. A main communication path 742 is closed by the lower end 736b of the main valve body 736 seated on a main valve seat 724a. Further, side communication paths 743 are formed at an outer side wall of the main valve body 736. The second engaging member 737 is fixedly arranged in the main valve body 736 to cross the hollow portion 736a and to penetrate the through hole 732d.

When the plunger 732 moves in the upward direction, the second engaging member 737 causes the main valve body 736 to move in the same direction by engaging with the lower face of the through hole 732d. As a result, the main valve 744 is opened.

The assist spring 738 is arranged between a level difference portion 736c of the main valve body 736 and the valve seat 724 and biases the main valve body 736 in the upward direction, that is, in the valve opening direction.

According to the sixteenth embodiment, when the current is not supplied to the solenoid 721, an interval (L interval) between the lower face of the stopper 722 and the upper face of the plate 725 is designated by notation L, an interval (S interval) between the level difference portion 734c of the auxiliary valve body 734 and the upper face of the engaging portion 733a of the first engaging member 733 is designated by notation S and an interval (H interval) between the lower face of the through hole 732d in the plunger 732 and the lower side of the second engaging member 737 is designated by notation H. The members in the SR valve 720 are arranged to establish relation of L>H>S.

Next, an explanation will be given of the operation of the SR valve 720 according to the sixteenth embodiment.
[Fully Closed State]
When the current is not supplied to the solenoid 721, the SR valve 720 is brought into the fully-closed state. In the following, consider a case in which the brake pedal is depressed and the pump 21 is driven.

By biasing force Fsp1 of the return spring 731 in the downward direction, the plunger 732 (integral with the first engaging member 733) is biased in the downward direction. The auxiliary valve body 734 is biased in the downward direction by the plunger 732. Further, the main valve body 736 is biased in the downward direction by the auxiliary valve body 734. Thereby, the auxiliary valve 746 and the main valve 744 are both closed so that fully-closed state is brought about.
[Middle State (i)]
When the current is supplied to the solenoid 721, the plunger 732 is attracted in the upward direction by a distance of an initial stroke (dead stroke) S.
[Middle State (ii)]
When current supply to the solenoid 721 is maintained, the plunger 732 and the auxiliary valve body 734 (engaged with the first engaging member 733) are further moved in the upward direction.

That is, the plunger 732, the first engaging member 733 and the auxiliary valve body 734 engaged with the first engaging member 733 are moved by a distance of a middle stroke (H−S). As a result, the lower face of the through hole 732d in the plunger 732 is brought into contact with the lower side of the second engaging member 737.

In accordance with the movement of the plunger 732, the auxiliary valve body 734 is also lifted up by the distance of (H−S). Therefore, the auxiliary valve 746 is opened by that distance.
[Middle State (iii)]
When the current supply to the solenoid 721 is further maintained, the plunger 732, the first engaging member 733, the auxiliary valve body 734 and the main valve body 736 are moved further in the upward direction.

That is, the plunger 732, the first engaging member 733 and the auxiliary valve body 734 are lifted up by a distance of a latter stroke (L−H). In this case, the second engaging member 737 is engaged with the lower face of the through hole 732d of the plunger 732. Accordingly, with the movement of the plunger 732, the main valve body 736 (engaged with the second engaging member 737) is also lifted up so that both the auxiliary valve 746 and the main valve 744 are opened.
[Middle State (iv)]
By the operation in the middle state (iii), the plunger 732 has already reached its upper limit position. Accordingly, even when the current supply to the solenoid 721 is maintained, the plunger 732 is not lifted further.

Thereafter, the main valve body 736 is lifted up by a distance of (H−S) by the biasing force Fsp2 of the assist spring 738. As a result, the auxiliary valve body 734 is seated on the auxiliary valve seat 736d formed on the main valve body 736 so that the auxiliary valve 746 is closed.
[Fully-Open State]
When the current supply to the solenoid 721 is still maintained, the main valve body 736 and the auxiliary valve body 734 are further lifted up by the biasing force Fsp2 of the assist spring 738 so that the SR valve 720 is brought into the fully-open state.

In this way, according to the sixteenth embodiment, the L interval, the S interval and the H interval are set to establish the relation of L>H>S. Therefore, by supplying the current to the solenoid 721, the plunger 732 is attracted by the dead stroke S. Thereafter, by lifting of the plunger 732, the auxiliary valve body 734 (engaged with first engaging member 733) and the main valve body 736 (engaged with second engaging member 737) are also lifted up. Thereby, similar to the fourteenth embodiment, even when the brake pedal 1 is depressed and the brake hydraulic pressure applied on the main valve body 736 is increased while the pump 21 is driven, by supplying the current to the solenoid 721, the SR valve 720 can be reliably brought into the fully-open state.
(Seventeenth Embodiment)
Next, an explanation will be given of a seventeenth embodiment in reference to FIGS. 41 and 42. However, an explanation of portions similar to those in the above-described embodiment will be omitted or simplified.

First, an explanation will be given of the structure of an SR valve according to the Seventeenth embodiment.

Figure 41:
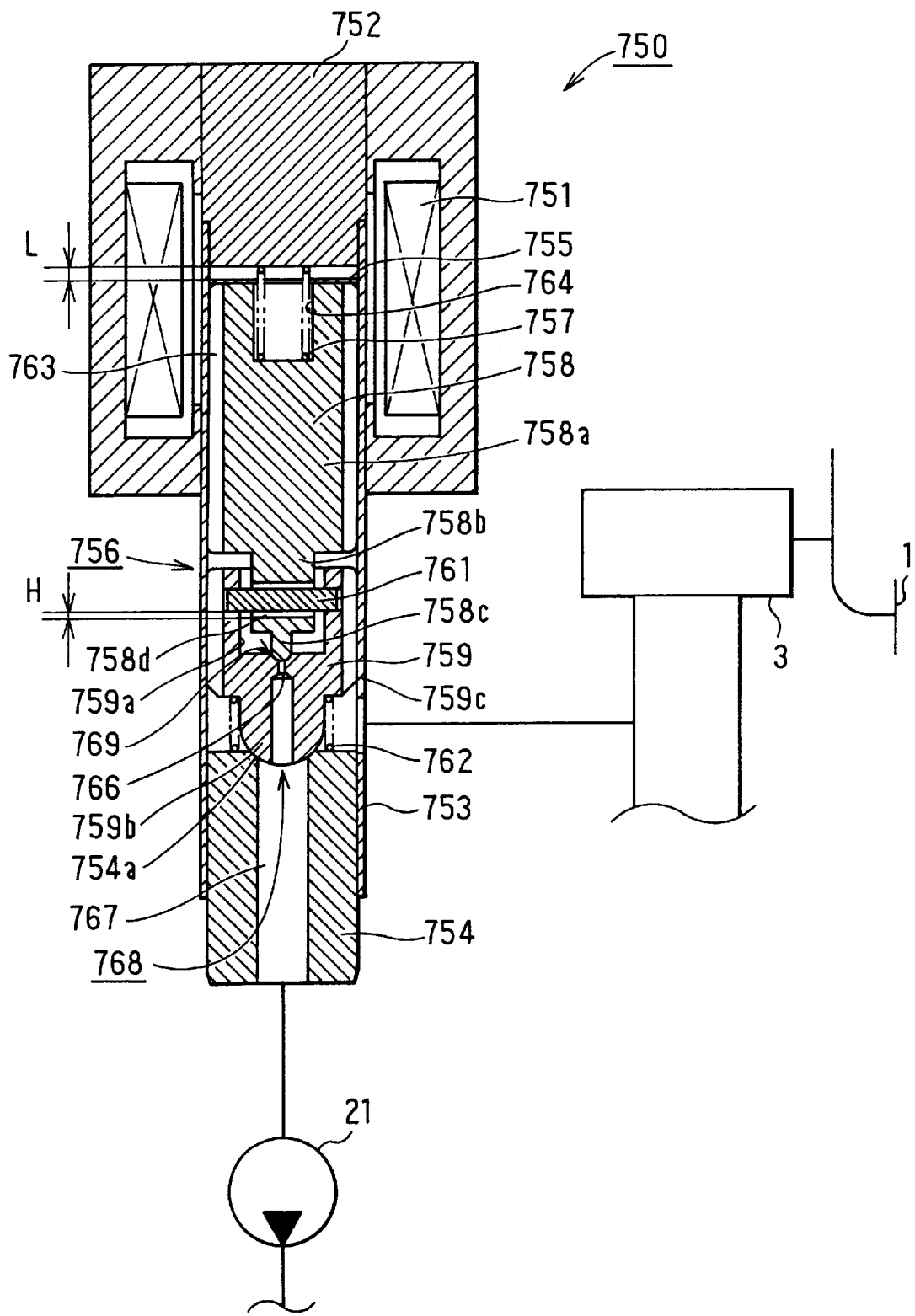
FIG. 41 is a cross-sectional view illustrating a full-closed state of an electromagnetic valve according to a seventeenth embodiment.

According to the SR valve 750 of the seventeenth embodiment, the constitution of a main valve 768 is substantially similar to that in the sixteenth embodiment. However, a main valve body 759 is moved by a plunger 758 which also serves as an auxiliary valve body. FIG. 41 is a sectional view showing an outline constitution of the SR valve 750 which shows a fully-closed state thereof.

As shown in FIG. 41, similar to the sixteenth embodiment, an SR valve 750 has a solenoid 751, a stopper 752, a sleeve 753, a valve seat 754 and a valve composite body 756.

The valve composite body 756 is formed by a plate 755, a return spring 757, an auxiliary valve body 758 which also serves as a plunger, a main valve body 759, an engaging member 761 (integral with the main valve body 759) and an assist spring 762. Members other than the auxiliary valve body 758 are made of nonmagnetic bodies.

The auxiliary valve body 758 comprises an upper portion 758a having a large diameter, a middle portion 758b having an intermediate diameter and a lower portion 758c having a small diameter. Side communication paths 763 are formed on a side wall of the upper portion 758a. The return spring 757 is arranged at a recess portion 764 formed on the upper side of the upper portion 758a.

A through hole 758d is formed at the middle portion 758b in a left and right direction in the drawing. An engaging member 761 is arranged to penetrate the through hole 758d while maintaining a predetermined interval (H interval) from a lower face of the through hole 758d. A restricted communication path 766 formed in the main valve body 759 is alternatively opened and closed by the lower portion 758c.

A hollow portion 759a having a relatively large diameter and the restricted communication path 766 are formed at the axis center of the main valve body 759. The main communication path 767 is closed by a lower portion 759b of the main valve body 759 seated on a main valve seat 754a. Side communication paths 759c are formed on an outer side wall of the main valve body 759. The engaging member 761 is fixedly arranged at the main valve body 759 to cross the hollow portion 759a and to penetrates the through hole 758d in the auxiliary valve body 758.

When the auxiliary valve body 758 moves in the upward direction, the engaging member 761 causes the main valve body 759 to move in the same direction by engaging with the lower face of the through hole 758d. As a result, the main valve 768 is opened. It is to be noted that the assist spring 762 is the same as that in the sixteenth embodiment.

According to the seventeenth embodiment, when current is not supplied to the solenoid 751, an interval (L interval) between the lower face of the stopper 752 and the upper face of the plate 755 is designated by notation L and an interval (H interval) between the lower face of the through hole 758d of the auxiliary valve body 758 and the lower side of the engaging member 761 is designated by notation H. Members in the SR valve 750 are arranged to establish relation of L>H. In this seventeenth embodiment, unlike the above-described fourteenth through sixteenth embodiments, dead stroke is not set. Accordingly, the above-described S interval is not provided.

Next, an explanation will be given of operation of the SR valve 750 according to the seventeenth embodiment in reference to a graph of FIG. 42.

[Fully-Closed State]

When current is not supplied to the solenoid 751, the SR valve 750 is brought into the fully-closed state. In the following, consider a case in which the brake pedal 1 is depressed and the pump 21 is driven.

The plunger (auxiliary valve body) 758 is biased in the downward direction by the biasing force Fsp1 of the return spring 757. The main valve body 759 is biased in the downward direction by the auxiliary valve body 758. Thereby, the auxiliary valve 769 and the main valve 768 are both closed so that the fully-closed state is brought about.

[Middle (Half-Open) State]

When the current is supplied to the solenoid 751, the auxiliary valve body 758 is attracted in the upward direction. That is, the auxiliary valve body 758 is moved by a distance H corresponding to the H interval (first stroke). At this time, the lower face of the through hole 758d in the auxiliary valve body 758 is brought into contact with the lower side of the engaging member 761. In accordance with the movement of the auxiliary valve body 758, the auxiliary valve 769 is opened by that distance.

Figure 42:
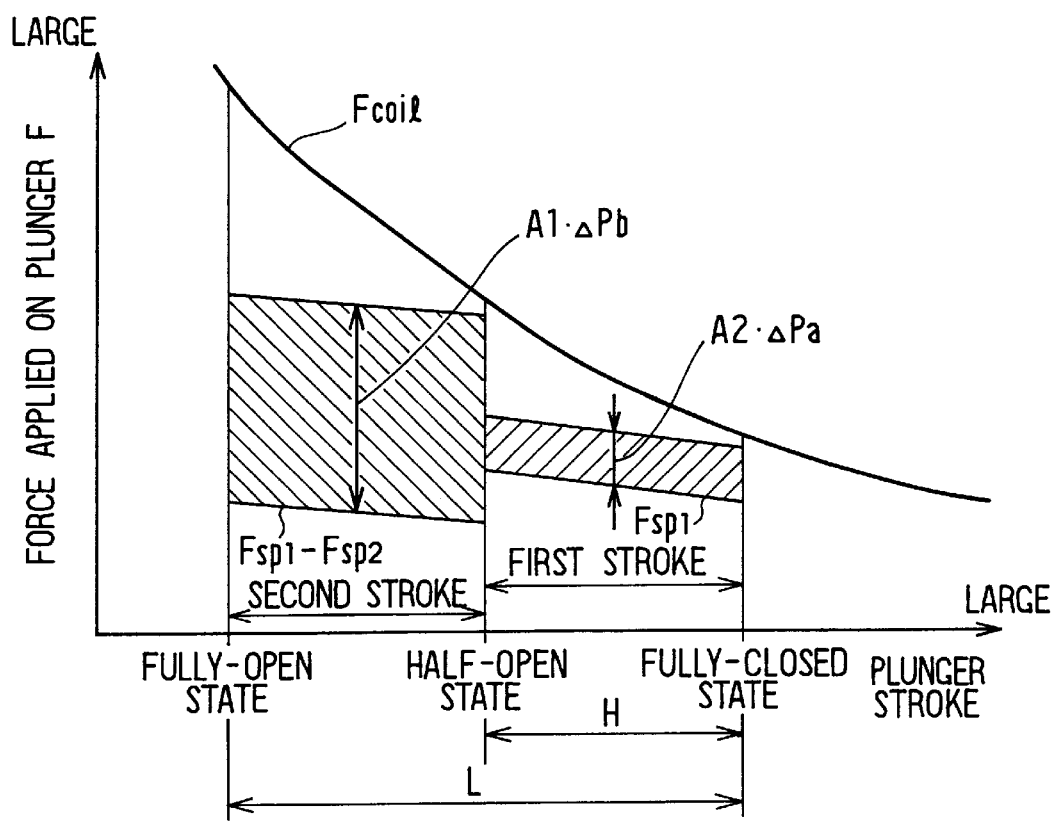
FIG. 42 is a graph illustrating a relation between force applied onto a plunger and a stroke thereof in the seventeenth embodiment.

Relation among forces in transition from the fully-closed state to the middle state is shown by the following equation and FIG. 42.

$$Fcoil > Fsp1 + A2 \cdot \Delta Pa$$

wherein A2 is a seat area of the auxiliary valve (pressure receiving area of an auxiliary valve seat), and ΔPa is a pressure difference applied on the auxiliary valve.

That is, when the H interval is reduced in transition from the fully-closed state to the middle state, the attracting force Fcoil of the solenoid 751 is set to always exceed the resultant force of the biasing force Fsp1 of the return spring 757 and the hydraulic pressure force A2·ΔPa applied on the auxiliary valve body 758.

[Fully-Open State]

When the current supply to the solenoid 751 is maintained, the auxiliary valve body 758, the engaging member 761 and the main valve body 759 are further moved in the upward direction until the auxiliary valve body 758 reaches its upper limit position.

That is, the auxiliary valve body 758 is lifted up by a distance of a second stroke (L–H). At this occasion, the engaging member 761 is engaged with the through hole 758d of the auxiliary valve body 758. Accordingly, with the further movement of the auxiliary valve body 758, the main valve body 759 (integral with engaging member 761) is also lifted up so that the fully-open state in which both the auxiliary valve 769 and the main valve 768 are opened is brought about.

Relation among forces from the middle state to the fully-open state is shown by the following equation and FIG. 42.

$$Fcoil > Fsp1 - Fsp2 + A1 \cdot \Delta Pb$$

wherein A1 is a seat area of the main valve (pressure receiving area of a main seat valve), and ΔPb is a pressure difference applied on the main valve.

That is, during the second stroke (L–H), the attracting force Fcoil of the solenoid 751 is set to always exceed a value produced by adding a difference between the biasing force Fsp1 of the return spring 757 and the biasing force Fsp2 of the assist spring 762 and the hydraulic pressure force A1·ΔPb applied on the main valve body 759.

In this way, according to the seventeenth embodiment, the L interval and the H interval are set to establish the relation of L>H. Accordingly, by supplying current to the solenoid 751, the auxiliary valve body 758 is attracted by the solenoid 751. Along with the movement of the auxiliary valve body 758, the main valve body 759 (engaged with engaging member 761) is moved in the same direction. Thereby, similar to the fourteenth embodiment, according to the SR valve 750, even when the brake pedal 1 is depressed so that the brake hydraulic pressure applied on the main valve body 759 is increased during operation of the pump 21, by supplying the current to the solenoid 751, the fully-open state can be reliably realized.

(Eighteenth Embodiment)

Next, an explanation will be given of an eighteenth embodiment in reference to FIGS. 43 and 44. However, an explanation of portions similar to those in the above-described embodiments will be omitted or simplified.

First, an explanation will be given of the structure of an SR valve 770 according to the eighteenth embodiment in reference to FIG. 43.

The structure of the SR valve 770 is substantially similar to that in the seventeenth embodiment and differs therefrom only in that an assist spring is not provided.

Figure 43:
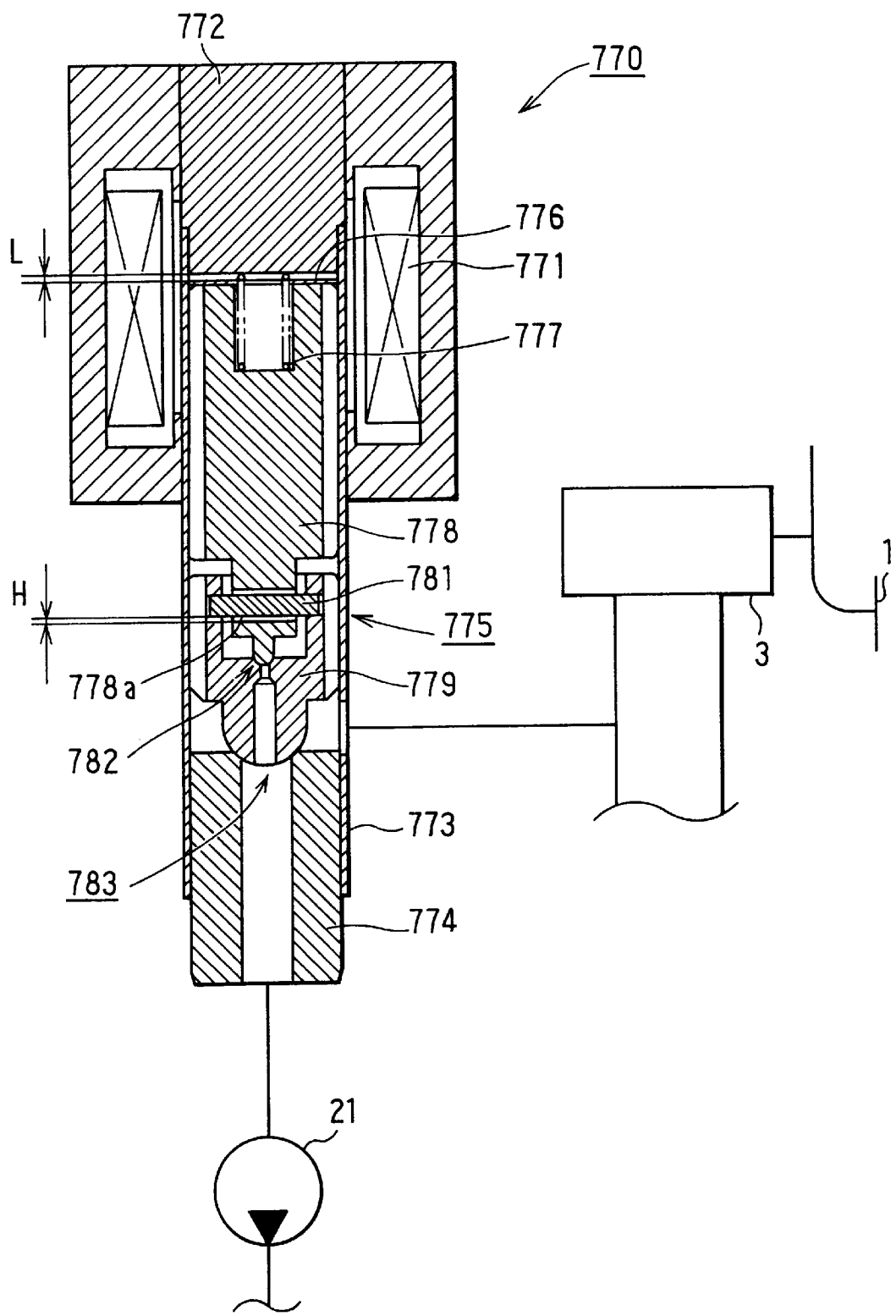
FIG. 43 is a cross-sectional view illustrating a full-closed state of an electromagnetic valve according to an eighteenth embodiment.

That is, as shown in FIG. 43, similar to the seventeenth embodiment, the SR valve 770 has a solenoid 771, a stopper 772, a sleeve 773, a valve seat 774 and a valve composite body 775. The valve composite body 775 is formed by a plate 776, a return spring 777, an auxiliary valve body 778 which also serves as a plunger, a main valve body 779 and an engaging member 781 (integral with the main valve body 779). However, an assist spring is omitted.

Further, similar to the seventeenth embodiment, when current is not supplied to the solenoid 771, an interval (L interval) between the lower face of the stopper 772 and the upper face of the plate 776 is designated by notation L and an interval (H interval) between the lower face of a through hole 778a formed in the auxiliary valve body 778 and the lower side of the engaging member 781 is designated by notation H. Members in the SR valve 770 are arranged to establish relation of L>H.

Next, an explanation will be given of operation of the SR valve 770 in reference to a graph of FIG. 44.

[Fully-Closed State]

When current is not supplied to the solenoid 771, the SR valve 770 is brought into a fully-closed state. In the following, consider a case in which the brake pedal 1 is depressed and the pump 21 is driven.

In this case, by biasing force Fsp1 of the return spring 777 in the downward direction, the plunger (auxiliary valve body) 778 is biased in the downward direction. By the auxiliary valve body 778, the main valve body 779 is also biased in the downward direction. Thereby, the auxiliary valve 782 and the main valve 783 are both closed so that the fully-closed state is brought about.

[Middle (Half Opened) State]

When the current is supplied to the solenoid 771, the auxiliary valve body 778 is attracted in the upward direction by the electromagnetic force generated by the solenoid 771.

That is, the auxiliary valve body 778 is moved by a distance of the H interval (first stroke H). The lower face of the through hole 778a in the auxiliary valve body 778 is brought into contact with the lower side of the engaging member 781. In accordance with the lift of the auxiliary valve body 778, the auxiliary valve 782 is opened by that distance.

Figure 44:
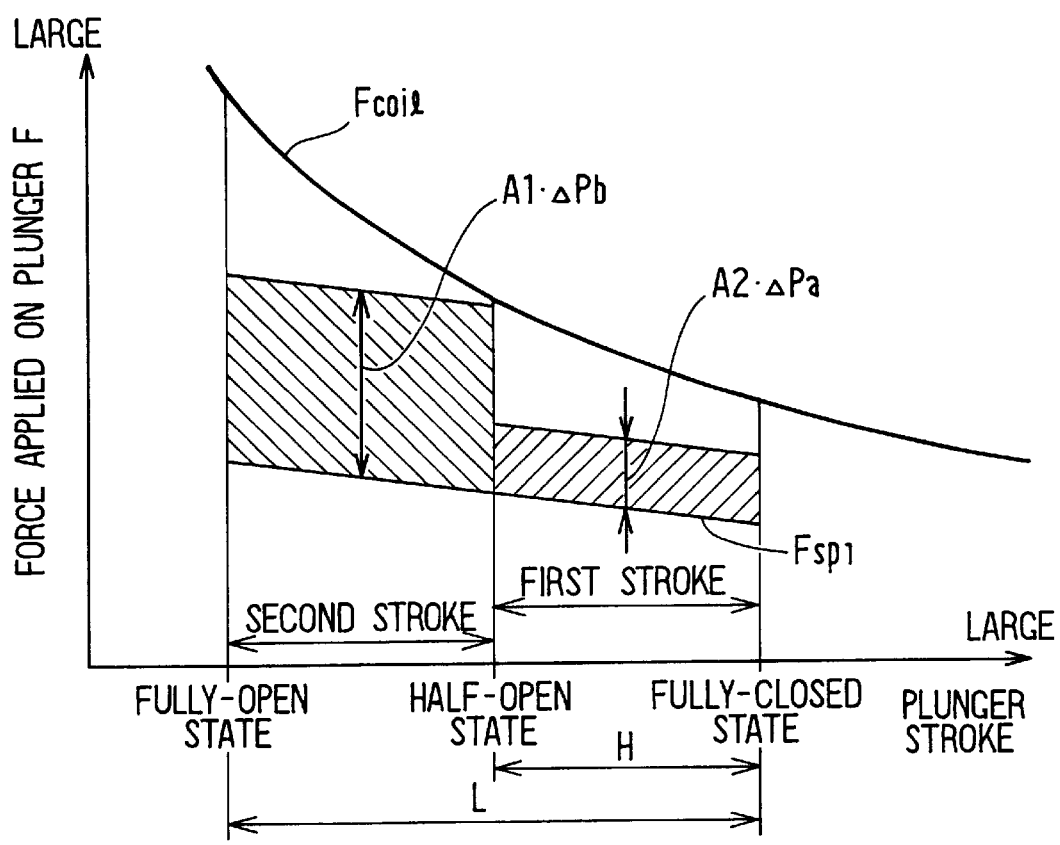
FIG. 44 is a graph illustrating a relation between force applied onto a plunger and a stroke thereof in the eighteenth embodiment.

Relation among forces from the fully-closed state to the middle state is shown by the following equation and FIG. 44.

$$Fcoil > Fsp1 + A2 \cdot \Delta Pa$$

wherein A2 is a seat area of the auxiliary valve (pressure receiving area of an auxiliary valve seat), and ΔPa is a pressure difference applied on the auxiliary valve.

That is, during the first stroke in which the H interval is reduced, attracting force Fcoil of the solenoid 771 is set to always exceed the resultant force of the biasing force Fsp1 of the return spring 777 and the hydraulic pressure force A2·ΔPa applied on the auxiliary valve body 778.

[Fully-Open State]

When current supply to the solenoid 771 is maintained, the auxiliary valve body 778, the engaging member 781 and the main valve body 779 are further attracted in the upward direction. As a result, the auxiliary valve body 778 reaches its upper limit position.

While the auxiliary valve body 778 is lifted up by a distance of a second stroke (L−H), because the engaging member 781 engages with the through hole 778a in the auxiliary valve body 778, the main valve body 779 (integral with the engaging member 781) is also lifted up so that a fully-open state in which both the auxiliary valve 782 and the main valve 783 are opened is brought about, in accordance with the movement of the auxiliary valve body 778.

Relation among forces from the middle state to the fully-open state is shown by the following equation and FIG. 44.

$$Fcoil > Fsp1 + A1 \cdot \Delta Pb$$

wherein A1 is a seat area of the main valve (pressure receiving area of a main valve seat), and ΔPb is a pressure difference applied on the main valve.

That is, during the second stroke (L−H), attracting force Fcoil of the solenoid 771 is set to always exceed the resultant force of the biasing force Fsp1 of the return spring 777 and the hydraulic pressure force A1·ΔPb applied on the main valve body 779.

In this way, according to the eighteenth embodiment, the L interval and the H interval are set to establish the relation of L>H. Therefore, by supplying current to the solenoid 771, the auxiliary valve body 778 is first lifted up. Then, by the lift of the auxiliary valve body 778, the main valve body 779 (engaged with the engaging member 781) is also lifted up. Thereby, similar to the fourteenth embodiment, even when the brake pedal 1 is depressed and brake hydraulic pressure is increased during operation of the pump 21, the fully-open state of the SR valve 770 can be realized.

In the eighteenth embodiment, not only effects substantially similar to those in the seventeenth embodiment are achieved but also there is achieved an advantage in which the constitution of the SR valve 770 can be simplified since an assist spring is not used.

(Nineteenth Embodiment)

Next, an explanation will be given of a nineteenth embodiment in reference to FIG. 45 and FIG. 46. However, an explanation of portions similar to those in the above-described embodiments will be omitted or simplified.

First, an explanation will be given of the structure of an SR valve 790 according to the nineteenth embodiment.

In the SR valve 790, pressure difference applied on the main valve body 799 is adjusted to move the main valve body 799. FIG. 45 is a sectional view showing an outline constitution of the SR valve 790 which shows a fully-closed state thereof.

Figure 45:
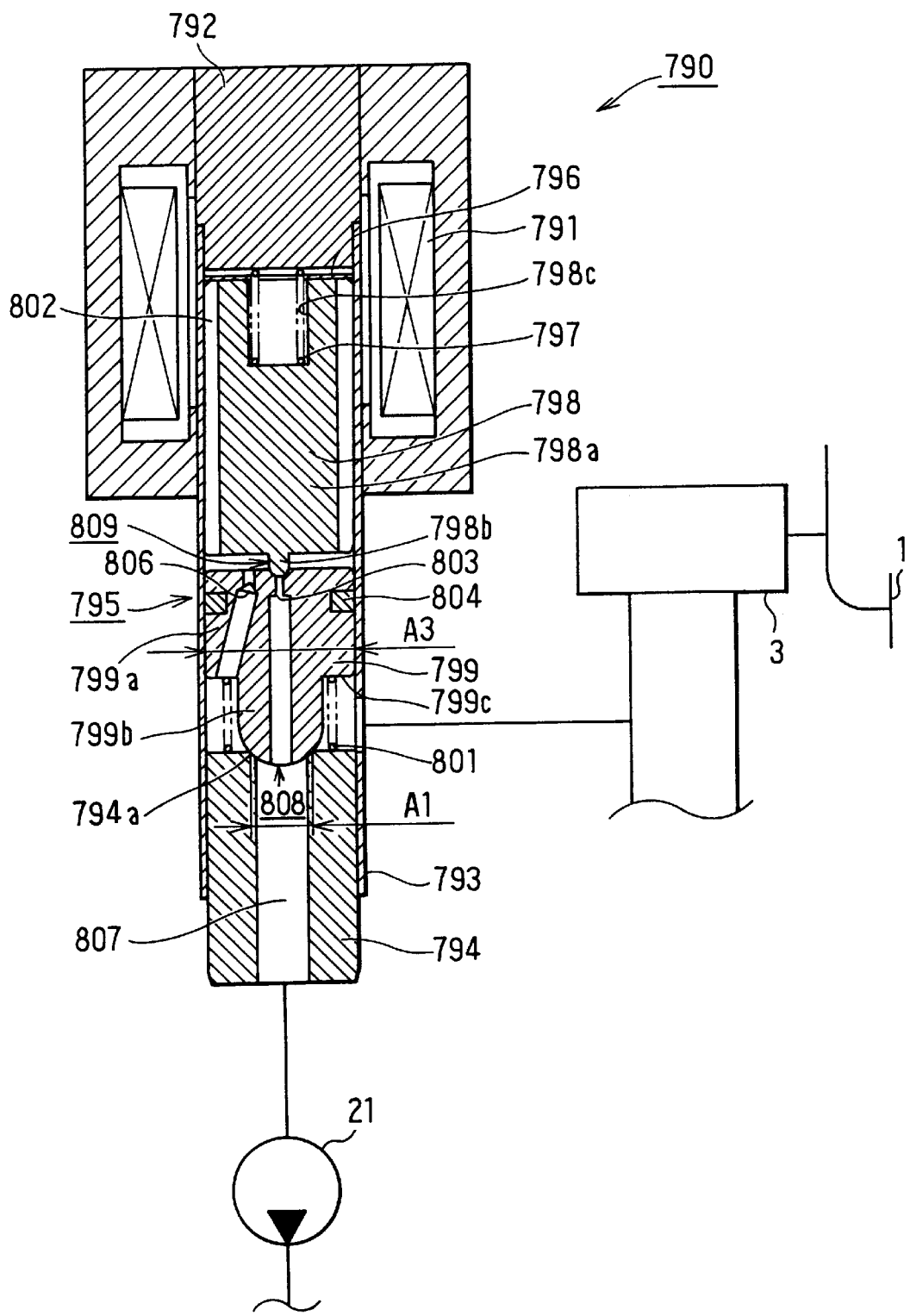
FIG. 45 is a cross-sectional view illustrating a full-closed state of an electromagnetic valve according to a nineteenth embodiment.

As shown in FIG. 45, similar to the eighteenth embodiment, the SR valve 790 has a solenoid 791, a stopper 792, a sleeve 793, a valve seat 794 and a valve composite body 795.

The valve composite body 795 is formed by a plate 796, a return spring 797, an auxiliary valve body 798 which also serves as a plunger, a main valve body 799 and an assist spring 801. Members other than the auxiliary valve body 798 are made of nonmagnetic bodies.

The plunger (auxiliary valve body) 798 comprises an upper portion 798a having a large diameter and a lower portion 798b having a small diameter. Side communication paths 802 are formed on the side wall of the upper portion 798a. The return spring 797 is arranged in a recess portion 798c formed on the upper side of the upper portion 798a. Further, a first restricted communication path 803 is formed in the main valve body 799 and is alternatively opened and closed by the lower portion 798b.

The main valve body 799 comprises an upper portion 799a having a large diameter and a lower portion 799b having a small diameter. A seal member 804 in a ring-like shape for sealing an outer side wall of the upper portion 799a in liquid tight (oil tight) is fitted onto the outer periphery of the upper portion 799a. The first restricted communication path 803 for communicating the pump 21 and the upper side of the main valve body 799 is formed at the axis center of the main valve body 799. A second restricted communication path 806 for communicating the master cylinder 3 and the upper side of the main valve body 799 is formed to deviate from the axis center of the main valve body 799. When the lower portion 799b of the main valve body 799 is seated on a main valve seat 794a, a main communication path 807 is closed (a main valve 808 is closed).

The assist spring 801 is arranged between a level difference portion 799c of the upper portion 799a of the main valve body 799 and the upper face of the valve seat 794 and biases the main valve body 799 in the upward direction.

Next, an explanation will be given of operation of the SR valve 790 in reference to a graph of FIG. 46.

Figure 46:
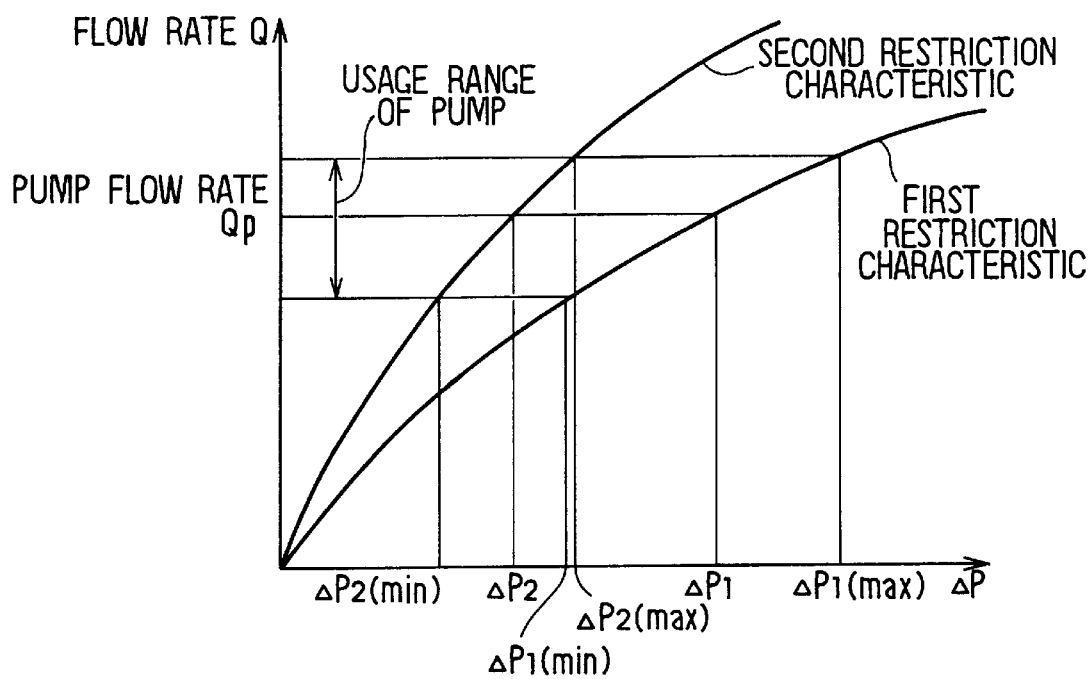
FIG. 46 is a graph illustrating a relation between pressure difference and flow rate in a main valve body of the nineteenth embodiment.

According to the nineteenth embodiment, a first restriction characteristic of the first restricted communication path 803 (depending on an inner diameter thereof) and a second restriction characteristic in the second restricted communication path 806 are set as shown in FIG. 46.

That is, although with increase in a flow rate Q (pump flow rate Qp), pressure differences ΔP caused across the first restricted communication path 803 and the second restricted communication path 806 are increased, pressure difference ΔP1 (minimum pressure difference ΔP1min, maximum pressure difference ΔP1max) caused across the first restricted communication path 803 is set to be always larger than pressure difference ΔP2 (minimum pressure difference ΔP2min, maximum pressure difference ΔP2max) caused across the second restricted communication path 806 for the same pump flow rate Qp.

Further, the first and the second restriction characteristics, a seat area A1 of the main valve and a pressure receiving area A3 of the upper portion 799a are set to establish the following equations.

$$\Delta P1 \cdot A1 = \text{about } \Delta P2 \cdot (A3-A1)$$

$$\Delta P1 \cdot A1 < \Delta P2 \cdot (A3-A1);$$

(however, small amount degree)

That is, the first and the second restriction characteristics, the seat area A1 and the pressure receiving area A3 are set such that the main valve body 799 can be operated by slight force. Thereby, the fully-open state can be realized reliably by biasing force Fsp2 of the assist spring 801.

An explanation will be given of the operation in the SR valve 790 step by step as follows.

[Fully-Closed State]

When current is not supplied to the solenoid 791, the SR valve 790 is brought into the fully-closed state. In the following, consider a case in which the brake pedal 1 is depressed and the pump 21 is driven.

In this case, by the biasing force Fsp1 of the return spring 797 in the downward direction, the plunger (auxiliary valve body) 798 is biased in the downward direction. By the auxiliary valve body 798, the main valve body 799 is also biased in the downward direction. Thereby, the auxiliary valve 809 and the main valve 808 are both closed so that the fully-closed state is brought about.

[Fully-Open State]

When current supply to the solenoid 791 is started and maintained, the auxiliary valve body 798 is attracted in the upward direction by the electromagnetic force from the solenoid 791. As a result, the auxiliary valve body 798 reaches its upper limit position.

At this occasion, by setting the first and the second restriction characteristics, the seat area A1 and the pressure receiving area A3 as mentioned above, for example, in the case of the pump flow rate Qp, $\Delta P1 \cdot A1 = \text{about } \Delta P2 \cdot (A3-A1)$ is established. That is, upper and lower side biasing forces applied on the main valve body 799 are substantially balanced. Therefore, the main valve body 799 is brought into the fully-open state by the biasing force Fsp2 of the assist spring 801 operating in the upward direction.

In this way, according to the nineteenth embodiment, not only the first restricted communication path 803 but also the second restricted communication path 806 are formed in the main valve body 799 so that adjustment of forces applied on the main valve body 799 is carried out. Accordingly, similar to the fourteenth embodiment, according to the SR valve 790, even when the brake pedal 1 is depressed so that brake hydraulic pressure applied on the main valve body 799 is increased during operation of the pump 21, by supplying current to the solenoid 791, the fully-open state can be realized.

(Twentieth Embodiment)

Next, an explanation will be given of a twentieth embodiment in reference to FIGS. 47A and 47B. However, an explanation of portions similar to those in the above-described embodiments will be omitted or simplified.

First, an explanation will be given of the structure of an SR valve 810 according to the twentieth embodiment.

Although the principle of operating the SR valve 810 in the twentieth embodiment is similar to that in the nineteenth embodiment, the position of the second restricted communication path differs therefrom. FIG. 47A is a longitudinal sectional view showing an outline constitution of the SR valve 810 which shows a fully-closed state thereof. FIG. 47B is a plane view of a main valve body.

As shown in FIG. 47A, similar to the nineteenth embodiment, the SR valve 810 has a solenoid 811, a stopper 812, a sleeve 813, a valve seat 814 and a valve composite body 815.

The valve composite body 815 is formed by a plate 816, a return spring 817, an auxiliary valve body 818 which also serves as a plunger, a main valve body 819 and an assist spring 821. Members other than the auxiliary valve body 818 are made of nonmagnetic bodies.

The plunger (auxiliary valve body) 818 comprises an upper portion 818a having a large diameter and a lower portion 818b having a small diameter. Side communication paths 822 are formed on a side wall of the upper portion 818a. The return spring 817 is arranged in a recess portion 818c formed on the upper side of the upper portion 818a.

The main valve body 819 comprises an upper portion 819a having a large diameter and a lower portion 819b having a small diameter. A first restricted communication path 823 for communicating the pump 21 and the upper side of the main valve body 819 is formed at the axis center of the main valve body 819. Further, a second restricted communication path 826 for communicating the master cylinder 3 and the upper side of the main valve body 819 is formed on an outer side wall of the upper portion 819a as a ring-shape clearance between the sleeve 813 and the upper portion 819a as shown in FIG. 47B.

Similar to the nineteenth embodiment, the assist spring 821 biases the main valve body 819 in the upward direction.

Although an explanation of the operation of the SR valve 810 will be omitted since it is similar to that in the nineteenth embodiment, in this twentieth embodiment, effects similar to those in the nineteenth embodiment can be achieved. Further, the second restricted communication path 826 is formed as a ring-like clearance between the outer side wall of the upper portion 819a and the sleeve 813. Accordingly, its formation is facilitated. Further, since a seal member is not used, sliding resistance of the main valve body 819 is small. Therefore, small-sized springs can be used as respective springs. Further, as a modified embodiment, the second restricted communication path 826 can be used as a restriction by forming it in a groove like shape in the axial direction at the outer side wall of the upper portion 819a.

What is claimed is:

1. An electromagnetic valve which is disposed in a conduit between a brake hydraulic pressure producing device for producing brake hydraulic pressure when a vehicle is braked and an intake side of a pump which supplies brake fluid to a wheel braking force generating device for generating wheel braking force upon receiving brake fluid and functions as a hydraulic pressure control valve, said electromagnetic valve comprising:
   a main valve provided with a main valve body in which a restricted communication path for restricting a flow area of said conduit is formed, said main valve body being disposed in said conduit in such a manner that a main communication path connecting said conduit on a side of said brake hydraulic pressure producing device to said conduit on a side of said pump except said restricted communication path is alternatively opened and closed in response to movement of said main valve body in a predetermined direction;
   an auxiliary valve provided with an auxiliary valve body which moves in said predetermined direction to alternatively open and close said restricted communication path formed in said main valve body;
   a main valve body biasing member for biasing said main valve body in a direction of closing said main communication path;
   an auxiliary valve body biasing member for biasing said auxiliary valve body in a direction of closing said restricted communication path;
   an electromagnetic force generating device for generating electromagnetic force which biases said auxiliary valve body in a direction of opening said restricted communication path and which overcomes biasing force of said auxiliary valve body biasing member; and
   an engaging member integrated with said auxiliary valve body, which engages with said main valve body and moves said main valve body in a direction of opening said main communication path along with movement of said auxiliary valve body after said auxiliary valve body moves in said predetermined direction to open said restricted communication path,
   wherein said electromagnetic force generating device changes a magnitude of electromagnetic force generated to open both said main valve and said auxiliary valve from a magnitude of electromagnetic force generated to open only said auxiliary valve.

2. An electromagnetic valve according to claim 1, wherein biasing force of said main valve body biasing member and said auxiliary valve body biasing member and electromagnetic force applied on said auxiliary valve body by said electromagnetic force generating device are set so that, when no electromagnetic force is generated by said electromagnetic force generating device, a state of said electromagnetic valve becomes a fully-closed state in which said main valve and said auxiliary valve are both closed, when relatively large electromagnetic force is applied on said auxiliary valve body, said state of said electromagnetic valve become a fully-open state in which said main valve is opened, and when relatively small electromagnetic force is applied on said auxiliary valve body, said state of said electromagnetic valve become a half-open state in which said main valve is closed and said auxiliary valve is opened.

3. An electromagnetic valve according to claim 1, wherein said engaging member extends from said auxiliary valve body toward said main valve body, and engages with said main valve body when said auxiliary valve body is apart from a valve seat therefor by a predetermined distance to move said main valve body in accordance with movement of said auxiliary valve body.

4. An electromagnetic valve according to claim 1, further comprising a stopper disposed with a predetermined interval from said auxiliary valve, wherein said auxiliary valve body biasing member is disposed between said stopper and said auxiliary valve body.

5. An electromagnetic valve which is disposed in a conduit between a brake hydraulic pressure producing device for producing brake hydraulic pressure when a vehicle is braked and an intake side of a pump which supplies brake fluid to a wheel braking force generating device for generating wheel braking force upon receiving brake fluid and functions as a hydraulic pressure control valve, said electromagnetic valve comprising:
   a main valve provided with a main valve body in which a restricted communication path for restricting a flow area of said conduit is formed, said main valve body being disposed in said conduit in such a manner that a main communication path connecting said conduit on a side of said brake hydraulic pressure producing device to said conduit on a side of said pump except said restricted communication path is alternatively opened and closed in response to movement of said main valve body in a predetermined direction;
   an auxiliary valve provided with an auxiliary valve body which moves in said predetermined direction to alternatively open and close said restricted communication path formed in said main valve body;
   a main valve body biasing member for biasing said main valve body in a direction of closing said main communication path;
   an auxiliary valve body biasing member for biasing said auxiliary valve body in a direction of closing said restricted communication path;
   an electromagnetic force generating device for generating electromagnetic force which biases said auxiliary valve body in a direction of opening said restricted communication path and which overcomes biasing force of said auxiliary valve body biasing member; and
   an engaging member integrated with said auxiliary valve body, which engages with said main valve body and moves said main valve body in a direction of opening said main communication path along with movement of said auxiliary valve body after said auxiliary valve body moves in said predetermined direction to open said restricted communication path;
   wherein said electromagnetic force generating device changes a magnitude of electromagnetic force generated to open both said main valve and said auxiliary valve from a magnitude of electromagnetic force generated to open only said auxiliary valve, wherein said main valve body biasing member is disposed between said main valve body and said auxiliary valve body.

6. An electromagnetic valve according to claim 5, wherein biasing force of said auxiliary valve body biasing member is set to be larger than an upper limit value of electromagnetic force applied on said auxiliary valve body when only said auxiliary valve is to be opened and to be smaller than a lower limit value of electromagnetic force applied on said auxiliary valve body when said main valve is to be opened.

7. An electromagnetic valve according to claim 6, wherein a resultant force by adding hydraulic pressure force acting on said main valve body due to negative pressure generated during operation of said pump to said biasing force of said auxiliary valve body biasing member is set to be lower than said lower limit value of electromagnetic force applied on said auxiliary valve body when said main valve is to be opened.

8. An electromagnetic valve according to claim 5, wherein a value obtained by subtracting biasing force of said main valve body biasing member from biasing force of said auxiliary valve body biasing member and adding, to a subtracted result, pressure difference biasing force applied on said auxiliary valve body based on brake hydraulic pressure generated by said brake hydraulic pressure generating device, is set to be smaller than a lower limit value of electromagnetic force applied on said auxiliary valve body when only said auxiliary valve is to be opened.

9. An electromagnetic valve according to claim 6, wherein the biasing force of said main valve body biasing member and said auxiliary valve body biasing member and the electromagnetic force applied on said auxiliary valve body by said electromagnetic force generating device are set so that, when no electromagnetic force is generated by said electromagnetic force generating device, a state of said electromagnetic valve becomes a fully-closed state in which said main valve and said auxiliary valve are both closed, when a relatively large electromagnetic force is applied on said auxiliary valve body, said state of said electromagnetic valve becomes a fully-open state in which said main valve is opened, and when relatively small electromagnetic force is applied on said auxiliary valve body, said state of said electromagnetic valve becomes a half-open state in which said main valve is closed and said auxiliary valve is opened.

10. An electromagnetic valve according to claim 6, wherein said engaging member extends from said auxiliary valve body toward said main valve body, and engages with said main valve body when said auxiliary valve body is apart from a valve seat therefor by a predetermined distance to move said main valve body in accordance with movement of said auxiliary valve body.

11. An electromagnetic valve according to claim 6, further comprising a stopper disposed with a predetermined interval from said auxiliary valve, wherein said auxiliary valve body biasing member is disposed between said stopper and said auxiliary valve body.

12. An electromagnetic valve according to claim 8, wherein the biasing force of said main valve body biasing member and said auxiliary valve body biasing member and the electromagnetic force applied on said auxiliary valve body by said electromagnetic force generating device are set so that, when no electromagnetic force is generated by said electromagnetic force generating device, a state of said electromagnetic valve becomes a fully-closed state in which said main valve and said auxiliary valve are both closed, when a relatively large electromagnetic force is applied on said auxiliary valve body, said state of said electromagnetic valve becomes a fully-open state in which said main valve is opened, and when relatively small electromagnetic force is applied on said auxiliary valve body, said state of said electromagnetic valve becomes a half-open state in which said main valve is closed and said auxiliary valve is opened.

13. An electromagnetic valve according to claim 8, wherein said engaging member extends from said auxiliary valve body toward said main valve body, and engages with said main valve body when said auxiliary valve body is apart from a valve seat therefor by a predetermined distance to move said main valve body in accordance with movement of said auxiliary valve body.

14. An electromagnetic valve according to claim 8, further comprising a stopper disposed with a predetermined interval from said auxiliary valve, wherein said auxiliary valve body biasing member is disposed between said stopper and said auxiliary valve body.

* * * * *